United States Patent
Sakarazawa et al.

(10) Patent No.: US 7,940,355 B2
(45) Date of Patent: May 10, 2011

(54) CELLULOSE ACYLATE FILM, AND POLARIZING PLATE AND LIQUID CRYSTAL DISPLAY DEVICE USING THE SAME

(75) Inventors: Mamoru Sakarazawa, Minami-Ashigara (JP); Yutaka Nozoe, Minami-Ashigara (JP); Tomohiro Ogawa, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 11/922,596

(22) PCT Filed: Jun. 23, 2006

(86) PCT No.: PCT/JP2006/313033
§ 371 (c)(1),
(2), (4) Date: Dec. 20, 2007

(87) PCT Pub. No.: WO2006/137593
PCT Pub. Date: Dec. 28, 2006

(65) Prior Publication Data
US 2009/0103014 A1 Apr. 23, 2009

(30) Foreign Application Priority Data
Jun. 24, 2005 (JP) .................................. 2005-185269

(51) Int. Cl.
*G02F 1/1335* (2006.01)
*F21V 9/04* (2006.01)
*G02B 1/08* (2006.01)

(52) U.S. Cl. ........................... 349/96; 252/587; 359/500

(58) Field of Classification Search .................. None
See application file for complete search history.

(56) References Cited

U.S. PATENT DOCUMENTS
2005/0208231 A1* 9/2005 Nimura et al. ................. 428/1.3

FOREIGN PATENT DOCUMENTS
| JP | 2001-194522 A | 7/2001 |
| JP | 2004-34481 A | 2/2004 |
| JP | 2004-325523 A | 11/2004 |
| JP | 2005-41911 A | 2/2005 |
| JP | 2005-154764 A | 6/2005 |

OTHER PUBLICATIONS

Partial machine translation for JP 2005-154764 A, [online], [retrieved on Jun. 3, 2009]. Retrieved from the Internet:<URL:http://dossier1.ipdl.inpit.go.jp/AIPN/odse_top_dn.ipdl?N0000=7400>.*
Partial machine translation for JP 2004-34481 A, [online], [retrieved on Jun. 4, 2009]. Retrieved from the Internet:<URL: http://dossier1.ipdl.inpit.go.jp/AIPN/odse_top_dn.ipdl?N0000=7400>.*
International Search Report for PCT/JP2006/313033 dated Oct. 17, 2006.

* cited by examiner

*Primary Examiner* — Omar Rojas
(74) *Attorney, Agent, or Firm* — Buchanan Ingersoll & Rooney PC

(57) ABSTRACT

A cellulose acylate film comprising: (A) at least one retardation regulator that has an absorbance, in terms of a 1.0 g/liter solution, of 0.1 or less for a 1 cm path length within a wavelength region of 450 nm or greater but not greater than 800 nm; and (B) at least one near infrared absorber that has at least one maximum absorption wavelength at 700 nm or greater but not greater than 1200 nm and has an absorbance, in terms of a 1.0 g/liter solution, of 30.0 or less for a 1 cm path length within a wavelength region of 450 nm or greater but not greater than 650 nm.

15 Claims, No Drawings

CELLULOSE ACYLATE FILM, AND POLARIZING PLATE AND LIQUID CRYSTAL DISPLAY DEVICE USING THE SAME

TECHNICAL FIELD

The present invention relates to a cellulose acylate film, and a polarizing plate and a liquid crystal display device using the film.

BACKGROUND ART

Cellulose acylate films have conventionally been used for photographic supports or various optical materials owing to their toughness and flame retardancy. In recent years, they are frequently used as an optical transparent film used for liquid crystal display devices. Cellulose acylate films are excellent as an optical material for devices treating polarized light such as liquid crystal display device because they have optically high transparency and optically high isotropy. They have therefore been used so far as a protective film of a polarizer or a support of an optically-compensatory film capable of improving (compensating a viewing angle of) the display viewed from a diagonal direction.

In recent liquid crystal display devices, there is a strong demand for the improvement of viewing angle characteristics. An optically transparent film such as a protective film of a polarizer or support of an optically-compensatory film is required to be optically isotropic. For optical isotropy, a small retardation value of an optical film expressed by the product of a birefringence and a thickness is important. Above all, in order to improve the display from a diagonal direction, it is necessary to reduce not only the in-plane retardation (Re) but also retardation (Rth) in a thickness-direction. More specifically, when the optical properties of an optically transparent film are evaluated, Re as measured from the frontal side of the film is required to be small and does not undergo a change even measured at varied angles.

In addition, recent liquid crystal display devices are required to have improved tint appearance. In order to satisfy it, not only the Re or Rth of an optically transparent film such as a protective film of a polarizer or support of an optically-compensatory film in a visible region ranging from a wavelength of from 400 to 800 nm must be reduced but also fluctuations in Re or Rth depending on wavelength, that is, chromatic dispersion must be reduced.

Although cellulose acylate films having a decreased in-plane Re have so far been known, it was difficult to manufacture cellulose acylate films undergoing small changes in the Re at varied angles, that is, cellulose acylate films having a reduced Rth. There is an eager demand for the development of an optically isotropic and optically transparent film made of cellulose acylate having an in-plane Re adjusted to almost zero, and undergoing small fluctuations in retardation at varied angles, which means having an Rth adjusted to almost zero.

When cellulose acylate films are prepared, a compound called plastizer is usually added in order to improve the film forming performance. As the plastizier, trimester phosphates such as triphenyl phosphate and biphenyldiphenyl phosphate and phthalate esters are disclosed (for example, refer to *Plastic Zairyo Koza*, Vol. 17, published by Nikkan Kogyoshinbun, "*Sen 'iso-kei Jushi*", p121 (1970)). Some of these plasticizers are known to have effects for lowering the optical anisotropy of cellulose acylate films, but the effects for reducing optical anisotropy of cellulose acylate films are not sufficient.

In JP-A-2005-41911, a cellulose acylate film which contains a phosphoric acid plasticizer having a specific structure is disclosed. This plastizier is also insufficient for lowering the optical anisotropy of cellulose acylate films.

Further, cellulose acylate films whose Rth has been reduced sufficiently by the addition thereto of a retardation controller or retardation regulator or cellulose acylate films having retardation reduced by using cellulose acylate having a high substitution degree are known, but effects for decreasing the chromatic dispersion of Rth are not sufficient.

In order to impart cellulose acylate films with various functions, various additives have been added thereto. One of the additives is an infrared absorber.

In JP-A-2001-194522, an optical film containing an infrared absorbing dye is disclosed and a technology capable of decreasing Re and Rth is proposed. In JP-2004-325523, proposed is a technology of using an infrared absorber and/or ultraviolet absorber as a retardation controller exhibiting dichroism and reducing, over a wide wavelength range, fluctuations of the Re of a film obtained by mixing the retardation controller in a resin having refractive index anisotropy. The conventional method using an infrared absorber has however a problem that when it is used for a liquid crystal display device, an effect of regulating the chromatic dispersion of the Rth is insufficient, or transparency is insufficient owing to unignorable coloring in a visible region.

DISCLOSURE OF THE INVENTION

An object of the invention is to provide an excellent cellulose acylate film having small optical anisotropy (especially, Rth), having small optical anitostropy (especially, Rth) over a wide wavelength range, and having small chromatic dispersion.

A further object of the invention is to provide an optical material such as polarizing plate manufactured using an excellent cellulose acylate film having small optical anisotropy, having small optical anisotropy over a wide wavelength range and having small chromatic dispersion, and to provide a liquid crystal display device using them and featuring high display quality over a wide viewing angle.

In view of the above-described problems, the present inventors have carried out an extensive investigation in order to reduce chromatic dispersion while reducing optical anisotropy. As a result, they have succeeded in lowering the retardation of a cellulose acylate film which is relatively large on a relatively long wavelength side and reducing chromatic dispersion of retardation within a wavelength range of a visible region by adding to the film a near infrared absorber exhibiting a negative refractive index on a longer wavelength side of a visible region. Thus, they have succeeded in efficiently attaining both low retardation and low chromatic dispersion.

They have also found that with regard to the problem that a film obtained by adding thereto an infrared absorber tends to cause coloring, a near infrared absorber whose absorbance in a visible region falls within a specific range can be used without any practical problem for applications of optical films which require both transparency and transmittance.

The objects of the invention are fulfilled by the cellulose acylate film as described below.

(1) A cellulose acylate film comprising:

(A) at least one retardation regulator that has an absorbance, in terms of a 1.0 g/liter solution, of 0.1 or less for a 1 cm path length within a wavelength region of 450 nm or greater but not greater than 800 nm; and (B) at least one near infrared absorber that has at least one maximum absorption wavelength at 700 nm or greater but not greater than 1200 nm and has an absorbance, in terms of a 1.0 g/liter solution, of 30.0 or less for a 1 cm path length within a wavelength region of 450 nm or greater but not greater than 650 nm.

(2) The cellulose acylate film as described in (1) above, wherein the at least one retardation regulator is at least one compound selected from compounds represented by formulas (1) to (6):

Formula (1)

wherein $R^{11}$ represents an aryl group; and $R^{12}$ and $R^{13}$ each independently represents an alkyl group or an aryl group provided that at least one of $R^{12}$ and $R^{13}$ is an aryl group, and the alkyl group or the aryl group may have a substituent,

Formula (2)

wherein $R^{21}$, $R^{22}$ and $R^{23}$ each independently represents an alkyl group which may have a substituent,

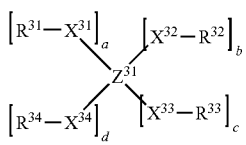

Formula (3)

wherein $R^{31}$, $R^{32}$, $R^{33}$ and $R^{34}$ each independently represents a hydrogen atom, a substituted or unsubstituted aliphatic group or a substituted or unsubstituted aromatic group;

$X^{31}$, $X^{32}$, $X^{33}$ and $X^{34}$ each independently represents a divalent linking group formed from at least one group selected from the group consisting of single bond, —CO— and $NR^{35}$— wherein $R^{35}$ represents a substituted or unsubstituted aliphatic group or a substituted or unsubstituted aromatic group;

a, b, c and d each independently represents an integer of 0 or greater provided that a+b+c+d is 2 or greater; and $Z^{31}$ represents an organic group having a valency of (a+b+c+d) except a cyclic organic group,

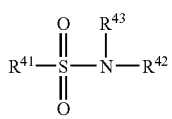

Formula (4)

wherein $R^{41}$ represents a substituted or unsubstituted alkyl group or a substituted or unsubstituted aryl group; and $R^{42}$ and $R^{43}$ each independently represents a hydrogen atom, a substituted or unsubstituted alkyl group or a substituted or unsubstituted aryl group,

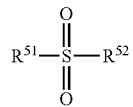

Formula (5)

wherein $R^{51}$ and $R^{52}$ each independently represents a substituted or unsubstituted alkyl group or a substituted or unsubstituted aryl group provided that a total number of carbon atoms of $R^{51}$ and $R^{52}$ is 10 or greater, and

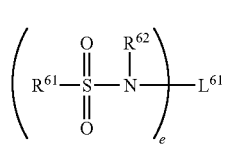

Formula (6)

wherein $R^{61}$ represents a substituted or unsubstituted aliphatic group or a substituted or unsubstituted aromatic group;

$R^{62}$ represents a hydrogen atom, a substituted or unsubstituted aliphatic group or a substituted or unsubstituted aromatic group;

$L^{61}$ represents a divalent to hexavalent linking group; and e represents an integer of from 2 to 6 which depends on a valency of $L^{61}$.

(3) The cellulose acylate film as described in (1) or (2) above, wherein the at least one retardation regulator is at least one compound selected from compounds represented by formulas (1) to (3).

(4) The cellulose acylate film as described in (1) above, wherein the at least one retardation regulator is a polymer of at least one ethylenic unsaturated monomer.

(5) The cellulose acylate film as described in any of (1) to (4) above, wherein the at least one near infrared absorber has an absorbance, in terms of a 1.0 g/liter solution, of 10.0 or less for a 1 cm path length within a wavelength region of 400 nm or greater but not greater than 650 nm.

(6) The cellulose acylate film as described in any of (1) to (5) above, wherein the at least one near infrared absorber has at least one maximum absorption wavelength at 800 nm or greater but not greater than 950 nm.

(7) The cellulose acylate film as described in any of (1) to (6) above, wherein Rth and Re of the cellulose acrylate film at a wavelength of 630 nm satisfy ranges of equations (1A) and (1B), respectively:

$$-50 \text{ nm} \leq Rth_{630} \leq 25 \text{ nm} \qquad \text{Equation (1A)}$$

$$0 \text{ nm} \leq Re_{630} \leq 10 \text{ nm}. \qquad \text{Equation (1B)}$$

(8) The cellulose acylate film as described in any of (1) to (7) above, wherein in a wavelength range of 400 nm or greater but not greater than 700 nm, a fluctuation of Rth of the cellulose acrylate film is 50 nm or less and a fluctuation of Re of the cellulose acrylate film is 10 nm or less.

(9) The cellulose acylate film as described in any of (1) to (8) above, wherein Re and Rth of the cellulose acrylate film at a wavelength of 630 nm satisfy a relation of equation (2):

$$0.5 \leq |Rth_{630}/Re_{630}| \leq 50 \text{ (provided that } Re_{630} \geq 1\text{).} \qquad \text{Equation (2):}$$

(10) The cellulose acylate film as described in any of (1) to (9) above, wherein Re and Rth of the cellulose acrylate film at a wavelength of 630 nm satisfy relations of equations (3A) and (3B), respectively:

$$|Re_{630(max)} - Re_{630(min)}| \leq 5 \qquad \text{Equation (3A):}$$

$$|Rth_{630(max)} - Rth_{630(min)}| \leq 10 \qquad \text{Equation (3B):}$$

wherein $Re_{630(max)}$ and $Rth_{630(max)}$ are the maximum retardation values at a wavelength of 630 nm of a 1-m square film which is cut out randomly from the cellulose acylate film; and $Re_{630}$(min) and $Rth_{630}$(min) are the minimum retardation values at a wavelength of 630 nm of the 1-m square film.

(11) The cellulose acylate film as described in any of (1) to (10) above, wherein a cellulose acylate constituting the cellulose acrylate film has an acyl substitution degree of from 2.50 to 3.00 and has an average polymerization degree of from 180 to 700.

(12) The cellulose acylate film as described in any of (1) to (11) above, wherein an acyl substituent of a cellulose acylate constituting the cellulose acylate film is substantially composed only of an acetyl group, and wherein the cellulose acylate has a total substitution degree of from 2.50 to 2.95 and has an average polymerization degree of from 180 to 550.

(13) The cellulose acrylate film as described in any of (1) to (12) above, which has a thickness of from 10 to 120 μm.

(14) The cellulose acrylate film as described in any of (1) to (13) above, which is obtained by stretching at a stretch ratio of 1% or greater but not greater than 100% in a direction vertical (width direction) to a machine direction.

(15) The cellulose acrylate film as described in (14) above, wherein the cellulose acrylate film obtained by stretching has Re satisfying a relation of equation (4):

$$|Re_{(n)} - Re_{(o)}|/n \leq 1.0 \qquad \text{Equation (4):}$$

wherein $Re_{(n)}$ represents Re at 630 nm of a film stretched by n(%); and $Re_{(O)}$ represents Re at 630 nm of an unstretched film.

(16) A polarizing plate comprising:

a polarizer; and at least two protective films laminated on both sides of the polarizer, wherein at least one of the at least two protective films is a cellulose acrylate film as described in any of (1) to (15) above.

(17) A liquid crystal display device comprising:

a liquid crystal cell; and at least two polarizing plates placed on both sides of the liquid crystal cell, wherein at least one of the at least two polarizing plates is a polarizing plate as described in (16) above.

(18) A liquid crystal display device as described in (17) above, which is an IPS mode.

BEST MODE FOR CARRYING OUT THE INVENTION

[Retardation of Cellulose Acylate Film]

Retardation Re and Rth will next be described specifically.

In the invention, $Re_\lambda$ and $Rth_\lambda$ (or described as Re (λ) and Rth (λ)) represent in-plane retardation and retardation in a thickness-direction at wavelength λ, respectively.

[Measurement of Retardation Values]

A measuring method of the retardation of the cellulose acylate film in the invention will next be described.

(In-plane Retardation Re, Retardation Rth in a Thickness-direction)

In the present specification, Re (λ) and Rth (λ) represent in-plane retardation and retardation in a thickness-direction, respectively at the wavelength of λ nm. Re (λ) is measured by incidence of light of the wavelength λ nm into a direction of normal line of film in KOBRA 21ADH or WR (manufactured by Oji Keisoku Kiki K. K.).

When the measured film is represented by uniaxial or biaxial refractive index ellipse, Rth (λ) is able to be calculated by the following method.

Thus, Rth (λ) is measured in such a manner that the above-mentioned Re (λ) is measured at six points in total by incidence of light of the wavelength λ nm from each of the inclined directions at intervals of 10° from the normal line direction to 50° at one side to the normal line direction of the film where an in-plane slow axis (judged by KOBRA 21ADH or by WR) is a tilt axis (rotation axis) (when there is no slow axis, any direction in the film face is adopted as a rotation axis) and Rth (λ) is calculated by KOBRA 21ADH or WR on the basis of the measured retardation values, presumed value of an average refractive index and film thickness value which is inputted.

In the case of the film where the value of retardation in a tilt angle is zero in which an in-plane slow axis from a normal line direction is a rotation axis in the above, the retardation value at the bigger tilt angle than the above tilt angle is calculated by KOBRA 21 ADH or WR after changing the sign to minus.

It is also possible that retardation values are measured from any inclined two directions using a slow axis as an tilt axis (rotation axis) (when there is no slow axis, any direction in the film face is adopted as a rotation axis) and Rth is calculated from the following mathematical formula (1) and formula (2) on the basis of such values, presumed value of an average refractive index and film thickness value which is inputted.

$$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \qquad \text{Mathematical Formula (1)}$$

Note: The above Re (θ) is a retardation value in a direction which is inclined to an extent of angle (θ) from the normal line direction.

In the mathematical formula (1), nx is a refractive index in the direction of in-plane slow axis; ny is refractive index in the direction at right angles to nx in the face; and nz is refractive index in the direction at right angles to nx and ny. In the mathematical formula (1), d represents a film thickness value.

$$Rth = ((nx+ny)/2 - nz) \times d \qquad \text{Mathematical Formula (2)}$$

When the film to be measured is unable to be expressed by uniaxial or biaxial refractive index ellipse or in the case of a film having no so-called optic axis, Rth (λ) is calculated by the following method.

Thus, Rth (λ) is measured in such a manner that the above-mentioned Re (λ) is measured at eleven points by incidence of light of the wavelength λ nm from each of the inclined directions at intervals of 10° from −50° to +50° to the normal line direction of the film where an in-plane slow axis (judged by KOBRA 21ADH or by WR) is a tilt axis (rotation axis) and Rth (λ) is calculated by KOBRA 21ADH or WR on the basis of the measured retardation values, presumed value of an average refractive index and film thickness value which is inputted.

In the above-mentioned measurements, the value in "Polymer Handbook" (John Wiley & Sons, Inc.) and in catalogs of various kinds of optical films may be used as the presumed value of an average refractive index. In case the value of an average refractive index is unknown, it is able to be measured by Abbe's refractometer. Values of average refractive index for main optical films will be exemplified as follows. Thus, they are 1.48 for cellulose acetate; 1.52 for cycloolefin polymer; 1.59 for polycarbonate; 1.49 for polymethyl methacrylate; and 1.59 for polystyrene. When presumed values of refractive index as such and film thickness are inputted, KOBRA 21ADH or WR calculates nx, ny and nz. From nx, ny and nz calculated as such, Nz=(nx−nz)/(nx−ny) is further calculated.

Compounds contained in the cellulose acylate film of the invention will be described one by one.

[Retardation Regulator]

The cellulose acylate film of the invention contains the following retardation regulator. Described specifically, the retardation regulator has an absorbance, in terms of a 1.0 g/liter solution in a good solvent, for example, dichloromethane, of 0.1 or less for 1 cm path length within a wavelength region of 450 nm or greater but not greater than 800 nm. When dichloromethane is a good solvent, an absorbance measured using dichloromethane as a solvent is employed.

The retardation regulator is a compound satisfying the following equations (I) and (II).

$$(Rth(A)-Rth(0))/A \leq -1.0 \quad \text{(I)}$$

$$0.01 \leq A \leq 30 \quad \text{(II)}$$

wherein,

Rth(A): Rth (nm) of a film containing A% of the retardation regulator,

Rth(0): Rth (nm) of a film not containing the retardation regulator,

A: mass (%) of the retardation regulator supposing that the mass of a polymer which is a raw material of a film is 100. (In this specification, mass ratio is equal to weight ratio.)

The above-described equations (I) and (II) preferably satisfy the following equations (Ia) and (IIa):

$$(Rth(A)-Rth(0))/A \leq -2.0 \quad \text{(Ia)}$$

$$0.01 \leq A \leq 15 \quad \text{(IIa)}$$

In these equations (I), (II), (Ia) and (IIa), the retardation is measured at a wavelength of 630 nm.

The retardation regulator of the invention is preferably at least one selected from the compounds represented by the above-described formulas (1) to (6). The retardation regulators represented by the formulas (1) to (6) and usable in the invention will next be described specifically.

First, the compound represented by the formula (1) will be described specifically.

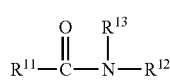

Formula (1)

In the formula (1), $R^{11}$ represents an aryl group. $R^{12}$ and $R^{13}$ each independently represents an alkyl or aryl group and at least one of them is an aryl group. When $R^{12}$ is an aryl group, $R^{13}$ may be either an alkyl group or an aryl group, but an alkyl group is more preferred. Here, the alkyl group may be linear, branched or cyclic. It may preferably have from 1 to 20 carbon atoms, more preferably from 1 to 15 carbon atoms, most preferably from 1 to 12 carbon atoms. The aryl group preferably has from 6 to 36 carbon atoms, more preferably from 6 to 24 carbon atoms.

The compound represented by the formula (2) will next be described specifically.

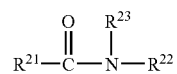

Formula (2)

In the formula (2), $R^{21}$, $R^{22}$ and $R^{23}$ each independently represents an alkyl group. The alkyl group may be linear, branched or cyclic, but $R^{21}$ is preferably a cyclic alkyl group. It is more preferred that at least one of $R^{22}$ and $R^{23}$ is a cyclic alkyl group. The alkyl group has preferably from 1 to 20 carbon atoms, more preferably from 1 to 15 carbon atoms, most preferably from 1 to 12 carbon atoms. As the cyclic alkyl group, a cyclohexyl group is especially preferred.

The alkyl and aryl groups in the formulas (1) and (2) may each have a substituent. As the substituent, halogen atoms (such as chlorine, bromine, fluorine and iodine), alkyl groups, aryl groups, alkoxy groups, aryloxy groups, acyl groups, alkoxycarbonyl groups, aryloxycarbonyl groups, acyloxy groups, sulfonylamino groups, hydroxy group, cyano group, amino groups, and acylamino groups are preferred, of which halogen atoms, alkyl groups, aryl groups, alkoxy groups, aryloxy groups, sulfonylamino groups and acylaminos group are more preferred and alkyl groups, aryl groups, sulfonylamino groups and acylamino groups are especially preferred.

Preferred examples of the compounds represented by the formula (1) or (2) will be shown below, but the invention is not limited to these specific examples.

Compounds indicated by (A-) are specific examples of the compound represented by the formula (1), while compounds indicated by (B-) are specific examples of the compound represented by the formula (2).

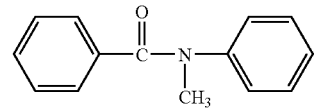

(A-1)

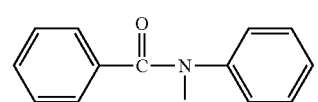

(A-2)

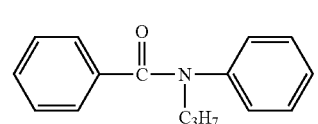

(A-3)

-continued
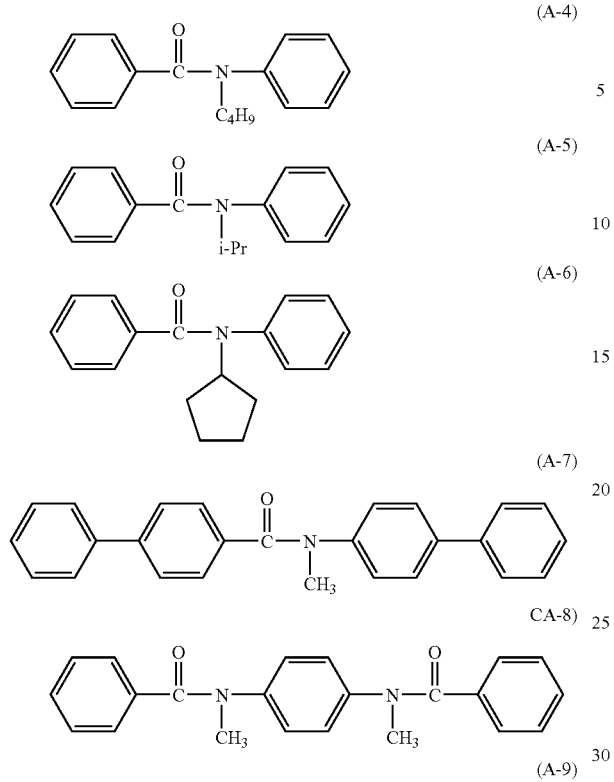
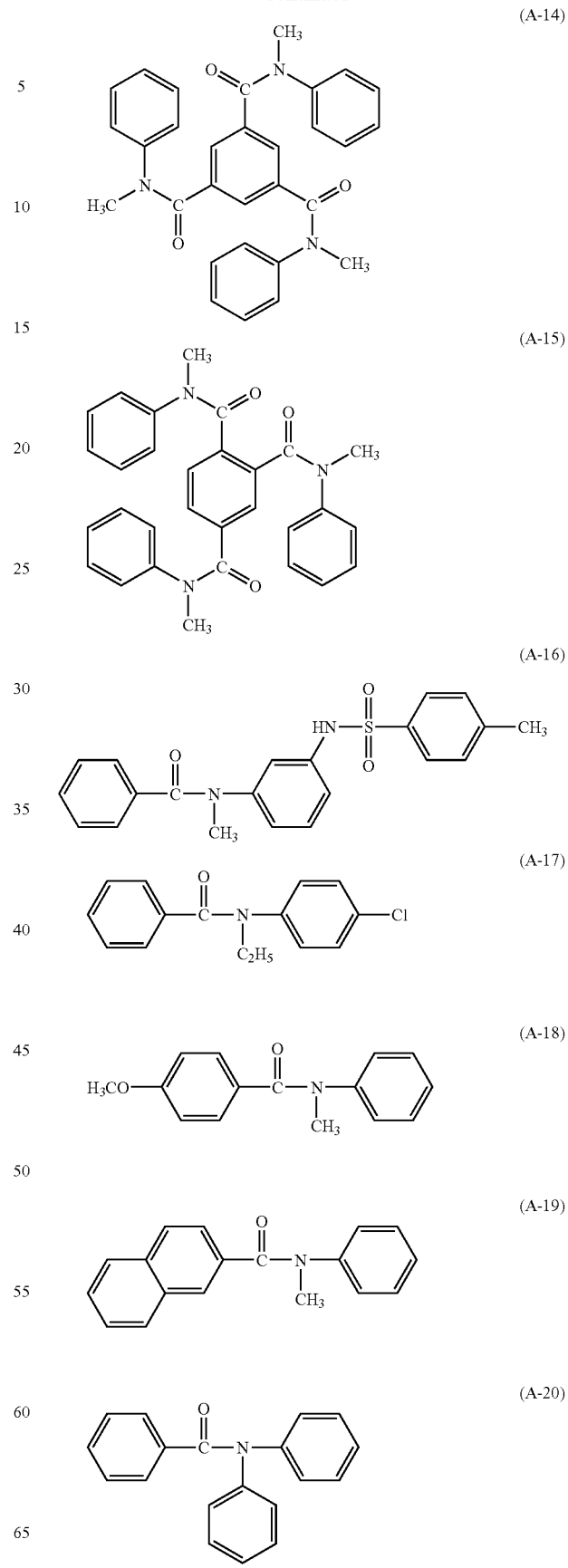

(A-21) 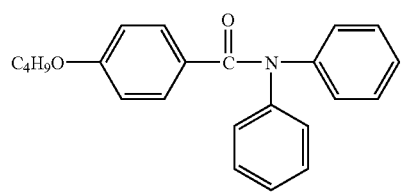
(A-22) 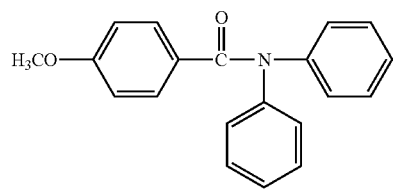
(A-23) 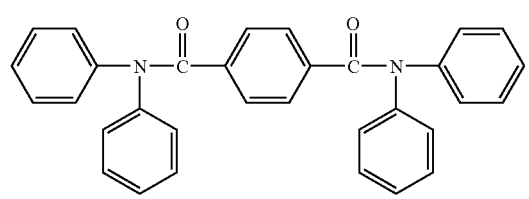
(A-24) 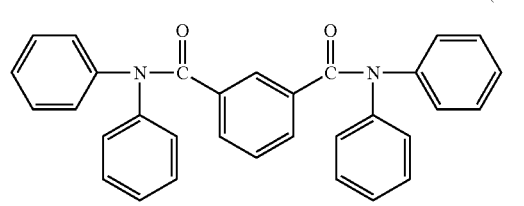
(A-25) 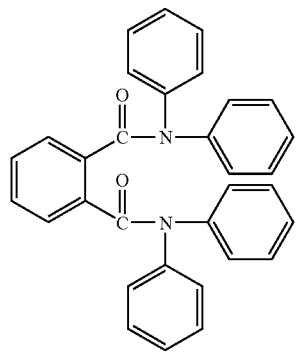
(A-26) 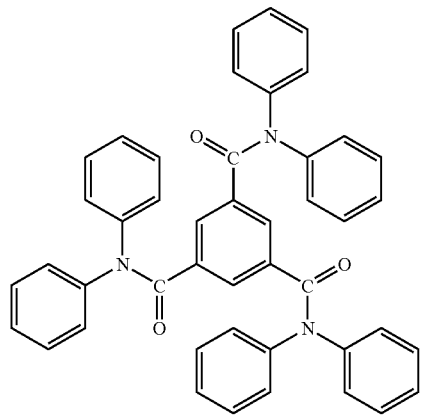
(A-27) 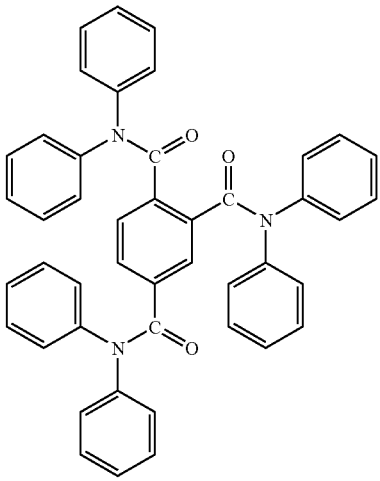
(A-28) 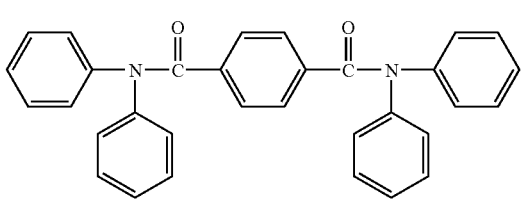
(B-1) 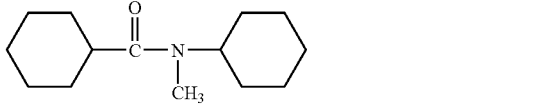
(B-2) 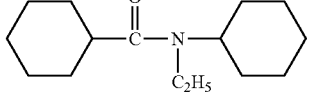
(B-3) 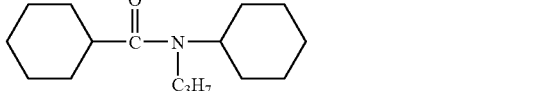
(B-4) 
(B-5) 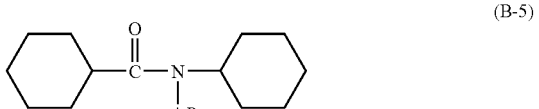
(B-6) 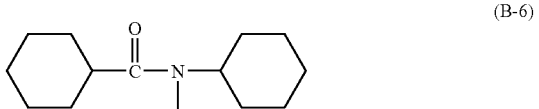
(B-7) 

-continued (B-8)
(B-9)
(B-10)
(B-11)
(B-12)
(B-13)
(B-14)

-continued (B-15)
(B-16)
(B-17)
(B-18)
(B-19)
(B-20)
(B-21)
(B-22)
(B-23)

(B-24)

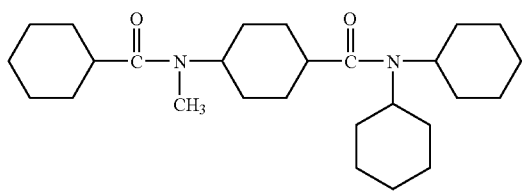

The above-described compounds can each be prepared by a known manner. The compounds represented by the formula (1) or (2) can be prepared by dehydrative condensation reaction between a carboxylic acid and an amine using a condensation agent {such as dicyclohexylcarbodiimide (DCC)} or substitution reaction between a carboxylic acid chloride derivative and an amine derivative.

The compound represented by the formula (3) will next be described.

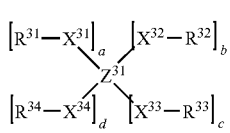

Formula (3)

In the formula (3), $R^{31}$, $R^{32}$, $R^{33}$ and $R^{34}$ each represents a hydrogen atom, a substituted or unsubstituted aliphatic group or a substituted or unsubstituted aromatic group. Of these, an aliphatic group is preferred. The aliphatic group may be any one of linear, branched and cyclic groups, with a cyclic group being more preferred. The aliphatic group and aromatic group may have, as a substituent, the below-described substituents, but unsubstituted ones are preferred.

$X^{31}$, $X^{32}$, $X^{33}$ and $X^{34}$ each represents a divalent linking group formed from at least one group selected from the class consisting of single bond, —CO— and NR$^{35}$—($R^{35}$ represents a substituted or unsubstituted aliphatic group or a substituted or unsubstituted aromatic group, with a unsubstituted one and/or aliphatic group being more preferred). Although no particular limitation is imposed on the combination of $X^{31}$, $X^{32}$, $X^{33}$ and $X^{34}$, these groups may be selected preferably from —CO— and —NR$^{35}$—. Alphabets a, b, c and d each stands for an integer of 0 or greater. It is preferably 0 or 1, while a+b+c+d is 2 or greater, preferably from 2 to 8, more preferably from 2 to 6, still more preferably from 2 to 4. $Z^{31}$ represents an organic group (except a cyclic one) having a valency of (a+b+c+d)}. The valency of $Z^{31}$ is preferably from 2 to 8, more preferably from 2 to 6, still more preferably from 2 to 4, most preferably 2 or 3. The organic group means a group composed of an organic compound.

The compound represented by the formula (3) is preferably a compound represented by the following formula (3-1):

R$^{311}$—X$^{311}$—Z$^{311}$—X$^{312}$—R$^{312}$    Formula (3-1):

In the formula (3-1), $R^{311}$ and $R^{312}$ each represents a substituted or unsubstituted aliphatic group or a substituted or unsubstituted aromatic group, of which the aliphatic group is preferred. The aliphatic group may be any one of linear, branched and cyclic groups, with the cyclic group being more preferred. The below-described substituent T may be used as the substituent which the aliphatic group or aromatic group may have, but the aliphatic group and aromatic group are preferably unsubstituted. $X^{311}$ and $X^{312}$ each independently represents —CONR$^{313}$— or —NR$^{314}$CO—, $R^{313}$ and $R^{314}$ each represents a substituted or unsubstituted aliphatic group or a substituted or unsubstituted aromatic group, of which the unsubstituted group and/or aliphatic group is preferred. $Z^{311}$ represents a divalent organic group (except a cyclic group) composed of at least one group selected from —O—, —S—, —SO—, —SO$_2$—, —CO—, —NR$^{315}$—, alkylene groups and arylene groups. Although no particular limitation is imposed on the combination of the groups constituting $Z^{311}$, they are selected preferably from —O—, —S—, —NR$^{315}$— and alkylene groups, more preferably from —O—, —S— and alkylene groups, most preferably from —O—, —S— and alkylene groups.

The compound represented by the formula (3-1) is preferably a compound represented by the below-described formulas (3-2) to (3-4):

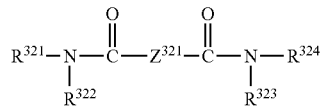

Formula (3-2)

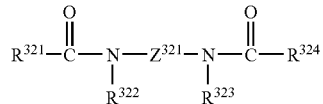

Formula (3-3)

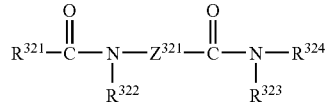

Formula (3-4)

In the formulas (3-2) to (3-4), $R^{321}$, $R^{322}$, $R^{323}$ and $R^{324}$ each represents a substituted or unsubstituted aliphatic group or a substituted or unsubstituted aromatic group, of which the aliphatic group is preferred. The aliphatic group may be any one of linear, branched and cyclic groups, with the cyclic group being more preferred. The below-described substituent T may be used as the substituent which the aliphatic group and aromatic group may have, but the aliphatic group and aromatic group are preferably unsubstituted. $Z^{321}$ represents a divalent organic group composed of at least one group selected from —O—, —S—, —SO—, —SO$_2$—, —CO—, —NR$^{325}$—($R^{325}$ represents a substituted or unsubstituted aliphatic group or a substituted or unsubstituted aromatic group, of which the unsubstituted group and/or aliphatic group is preferred), alkylene groups and arylene groups. Although no particular limitation is imposed on the combination of the groups constituting $Z^{321}$, they are selected preferably from —O—, —S—, —NR$^{325}$— and alkylene groups, more preferably from —O—, —S— and alkylene groups, most preferably from —O—, —S— and alkylene groups.

The above-described substituted or unsubstituted aliphatic group will next be described.

The aliphatic group may be linear, branched or cyclic. It has preferably from 1 to 25 carbon atoms, more preferably from 6 to 25 carbon atoms, especially preferably from 6 to 20 carbon atoms. Specific examples of the aliphatic group include methyl, ethyl, n-propyl, isopropyl, cyclopropyl, n-butyl, isobutyl, t-butyl, amyl, isoamyl, t-amyl, n-hexyl, cyclohexyl, n-heptyl, n-octyl, bicyclooctyl, adamantyl, n-decyl, t-octyl, dodecyl, hexadecyl, octadecyl and didecyl.

The above-described aromatic group will next be described.

The aromatic group may be either an aromatic hydrocarbon group or an aromatic heterocyclic group, but it is preferably an aromatic hydrocarbon group. The aromatic hydrocarbon group having from 6 to 24 carbon atom is preferred, with that having from 6 to 12 carbon atoms being more preferred. Specific examples of the ring of the aromatic hydrocarbon group include benzene, naphthalene, anthracene, biphenyl and terphenyl. As the aromatic hydrocarbon group, benzene, naphthalene and biphenyl are especially preferred. As the aromatic heterocyclic group, that having at least one of oxygen atom, nitrogen atom and sulfur atom is preferred. Specific examples of the heterocycle include furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, and tetrazaindene. As the aromatic heterocyclic group, pyridine, triazine and quinoline are especially preferred.

The above-described substituent T will next be described specifically.

Examples of the substituent T include alkyl groups (preferably those having from 1 to 20 carbon atoms, more preferably from 1 to 12 carbon atoms, especially preferably from 1 to 8 carbon atoms, for example, methyl, ethyl, isopropyl, t-butyl, n-octyl, n-decyl, n-hexadecyl, cyclopropyl, cyclopentyl, and cyclohexyl), alkenyl groups (preferably those having from 2 to 20 carbon atoms, more preferably from 2 to 12 carbon atoms, especially preferably from 2 to 8 carbon atoms, for example, vinyl, allyl, 2-butenyl, and 3-pentenyl), alkynyl groups (preferably those having from 2 to 20 carbon atoms, more preferably from 2 to 12 carbon atoms, especially preferably from 2 to 8 carbon atoms, for example, propargyl and 3-pentynyl), aryl groups (preferably those having from 6 to 30 carbon atoms, more preferably from 6 to 20 carbon atoms, especially preferably from 6 to 12 carbon atoms, for example, phenyl, biphenyl, and naphthyl), amino groups (preferably those having from 0 to 20 carbon atoms, more preferably from 0 to 10 carbon atoms, especially preferably from 0 to 6 carbon atoms, for example, amino, methylamino, dimethylamino, diethylamino, and dibenzylamino), alkoxy groups (preferably those having from 1 to 20 carbon atoms, more preferably from 1 to 12 carbon atoms, especially preferably from 1 to 8 carbon atoms, for example, methoxy, ethoxy, and butoxy), aryloxy groups (preferably those having from 6 to 20 carbon atoms, more preferably from 6 to 16 carbon atoms, and especially from 6 to 12 carbon atoms, for example, phenyloxy and 2-naphthyloxy), acyl groups (preferably those having from 1 to 20 carbon atoms, more preferably from 1 to 16 carbon atoms, especially preferably from 1 to 12 carbon atoms, for example, acetyl, benzoyl, formyl, and pivaloyl), alkoxycarbonyl groups (preferably those having from 2 to 20 carbon atoms, more preferably from 2 to 16 carbon atoms, especially preferably from 2 to 12 carbon atoms, for example, methoxycarbonyl and ethoxycarbonyl), aryloxycarbonyl groups (preferably those having from 7 to 20 carbon atoms, more preferably from 7 to 16 carbon atoms, especially preferably from 7 to 10 carbon atoms, for example, phenyloxycarbonyl), acyloxy groups (preferably those having from 2 to 20 carbon atoms, more preferably from 2 to 16 carbon atoms, especially preferably from 2 to 10 carbon atoms, for example, acetoxy and benzoyloxy), acylamino groups (preferably those having from 2 to 20 carbon atoms, more preferably from 2 to 16 carbon atoms, especially preferably from 2 to 10 carbon atoms, for example, acetylamino and benzoylamino), alkoxycarbonylamino groups (preferably those having from 2 to 20 carbon atoms, more preferably from 2 to 16 carbon atoms, especially preferably from 2 to 12 carbon atoms, for example, methoxycarbonylamino), aryloxycarbonylamino groups (preferably those having from 7 to 20 carbon atoms, more preferably from 7 to 16 carbon atoms, especially preferably from 7 to 12 carbon atoms, for example, phenyloxycarbonylamino), sulfonylamino groups (preferably those having from 1 to 20 carbon atoms, more preferably from 1 to 16 carbon atoms, especially preferably from 1 to 12 carbon atoms, for example, methanesulfonylamino and benzenesulfonylamino), sulfamoyl groups (preferably those having from 0 to 20 carbon atoms, more preferably from 0 to 16 carbon atoms, especially preferably from 0 to 12 carbon atoms, for example, sulfamoyl, methylsulfamoyl, dimethylsulfamoyl, and phenylsulfamoyl), carbamoyl groups (preferably those having from 1 to 20 carbon atoms, more preferably from 1 to 16 carbon atoms, especially preferably from 1 to 12 carbon atoms, for example, carbamoyl, methylcarbamoyl, diethylcarbamoyl, and phenylcabamoyl), alkylthio groups (preferably those having from 1 to 20 carbon atoms, more preferably from 1 to 16 carbon atoms, especially preferably from 1 to 12 carbon atoms, for example, methylthio and ethylthio), arylthio groups (preferably those having from 6 to 20 carbon atoms, more preferably from 6 to 16 carbon atoms, especially preferably from 6 to 12 carbon atoms, for example, phenylthio), sulfonyl groups (preferably those having from 1 to 20 carbon atoms, more preferably from 1 to 16 carbon atoms, especially preferably from 1 to 12 carbon atoms, for example, mesyl and tosyl), sulfinyl groups (preferably those having from 1 to 20 carbon atoms, more preferably from 1 to 16 carbon atoms, especially preferably from 1 to 12 carbon atoms, for example, methanesulfinyl and benzenesulfinyl), ureido groups (preferably those having from 1 to 20 carbon atoms, more preferably from 1 to 16 carbon atoms, especially preferably from 1 to 12 carbon atoms, for example, ureido, methylureido, and phenylureido), phosphoric acid amide groups (preferably those having from 1 to 20 carbon atoms, more preferably from 1 to 16 carbon atoms, especially preferably from 1 to 12 carbon atoms, for example, diethylphosphoric acid amide and phenylphosphoric acid amide), a hydroxyl group, a mercapto group, halogen atoms (for example, fluorine, chlorine, bromine, and iodine), a cyano group, a sulfo group, a carboxyl group, a nitro group, a hydroxamic acid group, a sulfino group, a hydrazino group, an imino group, heterocyclic groups (preferably those having from 1 to 30 carbon atoms, more preferably from 1 to 12 carbon atoms and those containing, as the hetero atom, nitrogen, oxygen or sulfur; and specific examples of the heterocyclic group include imidazolyl, pyridyl, quinolyl, furyl, piperidyl, morpholino, benzoxazolyl, benzimidazolyl, and benzothiazolyl), and silyl groups (preferably those having from 3 to 40 carbon atoms, more preferably from 3 to 30 carbon atoms, especially preferably from 3 to 24 carbon atoms, for example, trimethylsilyl and triphenylsilyl). These substituents may be substituted further. When two or more substituents are present, these substituents may be the same or different. Moreover, if possible, the substituents may be coupled together to form a ring.

Preferred examples of the compound represented by the formula (3) will next be shown, but the invention is not limited to these specific examples.

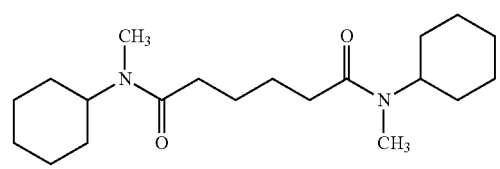

(CA-1)

(CA-2) 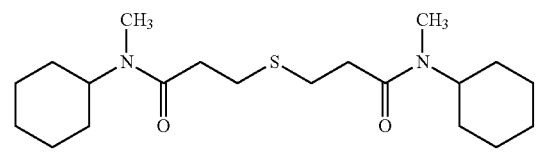
(CA-3) 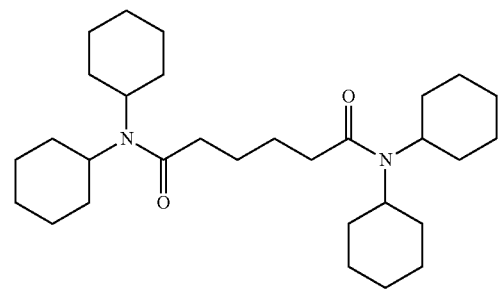
(CA-4) 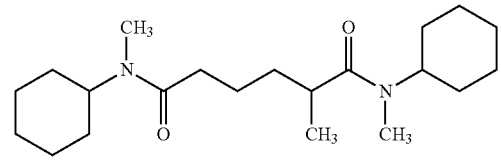
(CA-5) 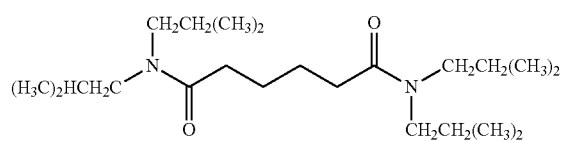
(CA-6) 
(CA-7) 
(CA-8) 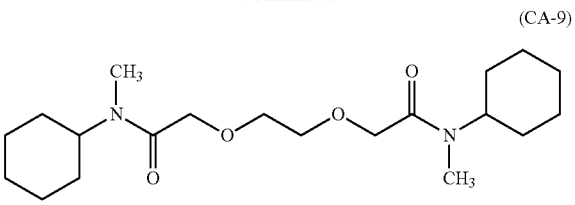
(CA-9) 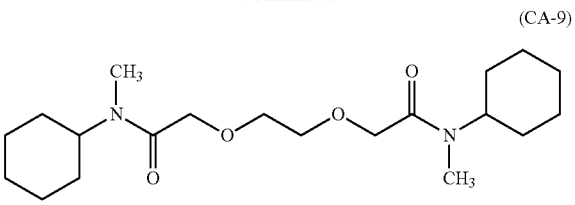
(CA-10) 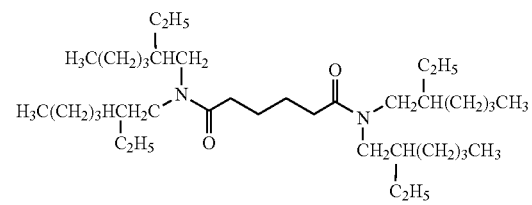
(CB-1) 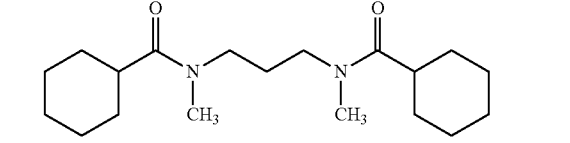
(CB-2) 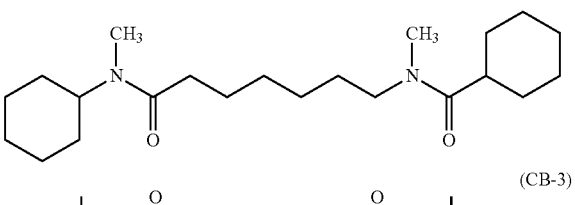
(CB-3) 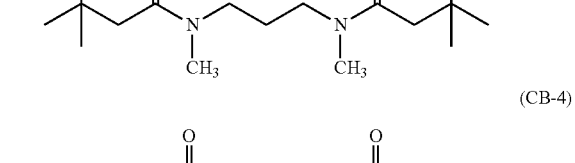
(CB-4) 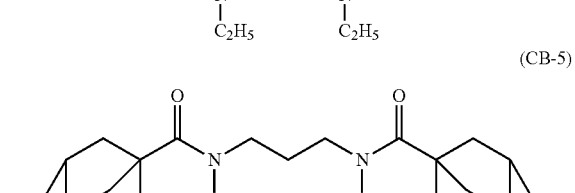
(CB-5) 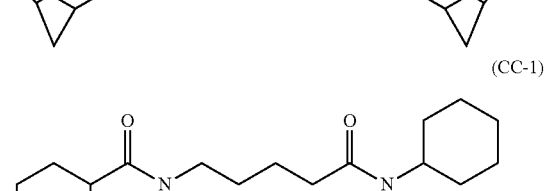
(CC-1) 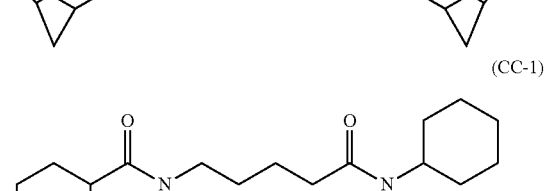
(CC-2) 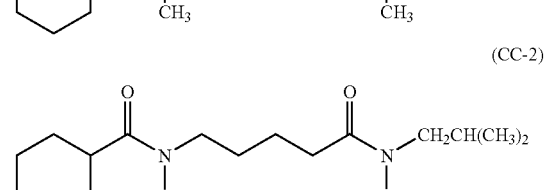

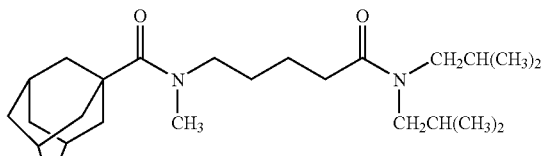
(CC-3)

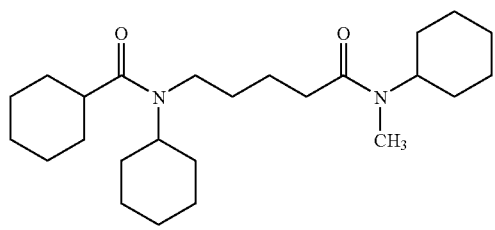
(CC-4)

Any of the compounds used in the invention can be prepared from known compounds. The compounds represented by any one of the formulas (3) and (3-1) to (3-4) can be prepared, for example, by the condensation reaction between carbonyl chloride and amine.

The compounds represented by the formulas (4) and (5) will be described.

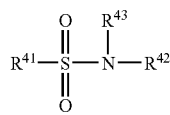
Formula (4)

In the formula (4), $R^{41}$ represents a substituted or unsubstituted alkyl or aryl group, and $R^{42}$ and $R^{43}$ each independently represents a hydrogen atom, an alkyl group or an aryl group, and the alkyl or aryl group may have a substituent. The total number of the carbon atoms of $R^{41}$, $R^{42}$ and $R^{43}$ is especially preferably 10 or greater.

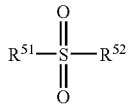
Formula (5)

In the formula (5), $R^{51}$ and $R^{52}$ each independently represents an alkyl or aryl group. The total number of carbon atoms of $R^{51}$ and $R^{52}$ is 10 or greater and the alkyl or aryl group may have a substituent.

As the substituent, fluorine atom, alkyl groups, aryl groups, alkoxy groups, sulfone group and sulfonamide group are preferred, of which the alkyl groups, aryl groups, alkoxy groups, sulfone group and sulfonamide group are especially preferred.

The alkyl group may be any one of linear, branched and cyclic ones and it preferably has from 1 to 25 carbon atoms, more preferably from 6 to 25 carbon atoms, especially preferably from 6 to 20 carbon atoms (such as methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl and didecyl).

The aryl group has preferably from 6 to 30 carbon atoms, more preferably from 6 to 24 carbon atoms (for example, phenyl, biphenyl, terphenyl, naphthyl, binaphthyl or triphenylphenyl).

The preferred examples of the compound represented by the formula (4) or (5) will be described below, but the invention is not limited to these specific examples.

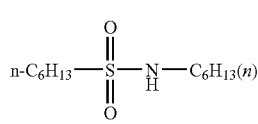
(SA-1)

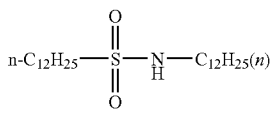
(SA-2)

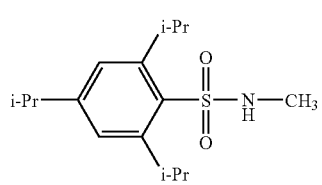
(SA-3)

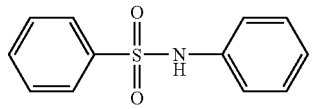
(SA-4)

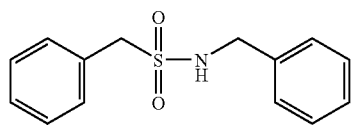
(SA-5)

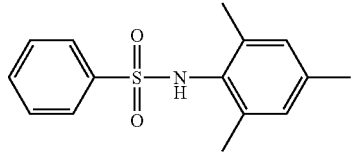
(SA-6)

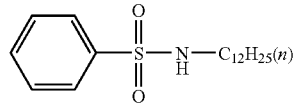
(SA-7)

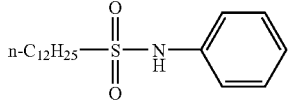
(SA-8)

-continued
(SA-9)
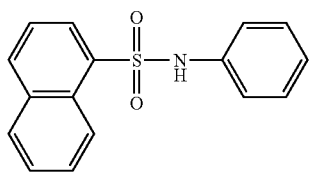
(SA-10)
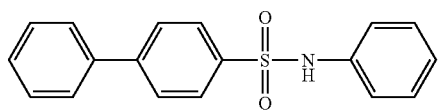
(SA-11)
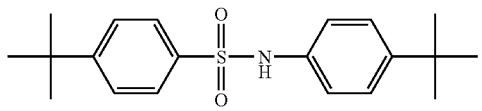
(SA-12)
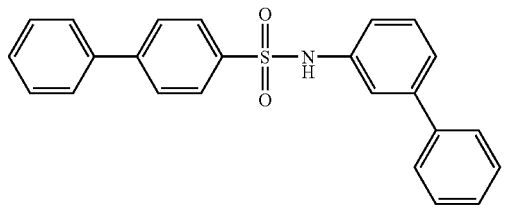
(SA-13)
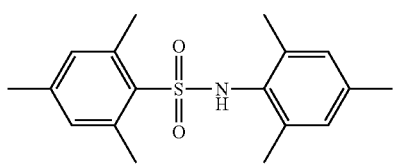
(SA-14)
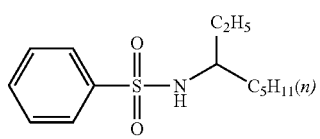
(SA-15)
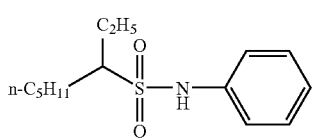
(SA-16)
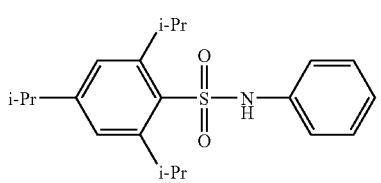
(SA-17)
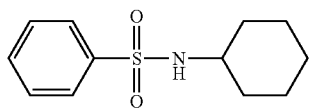
(SA-18)
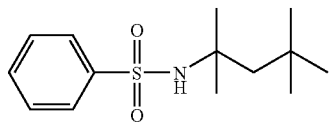
(SA-19)
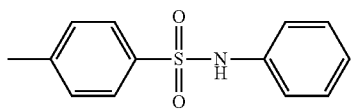
(SA-20)
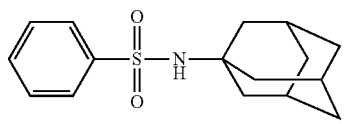
(SA-21)
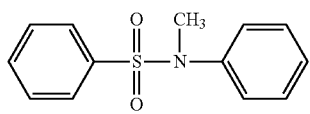
(SA-22)
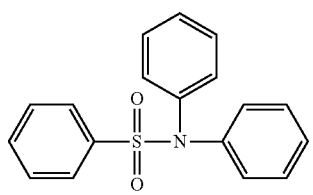
(SA-23)
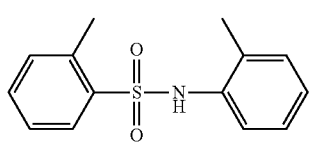
(SA-24)
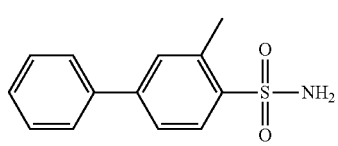
(SA-25)
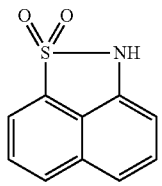
(SA-26)
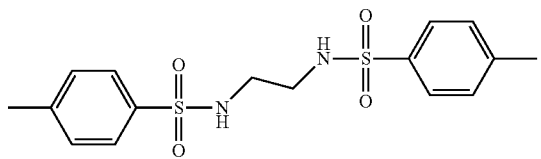

-continued
(SA-27)
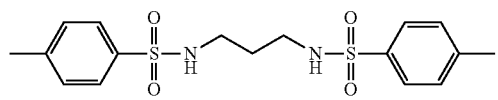
(SA-28)
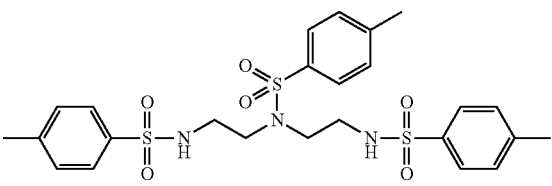
(SA-29)
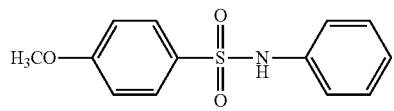
(SA-30)
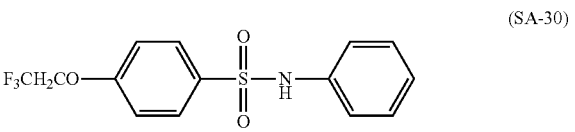
(SA-31)
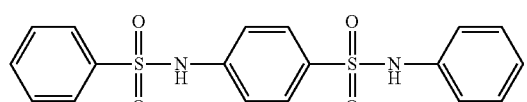
(SA-32)
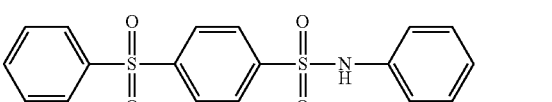
(SA-33)
(SA-34)
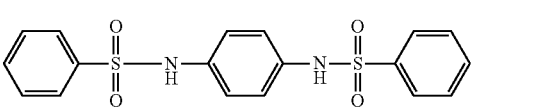
(SA-35)
(SA-36)
(SA-37)
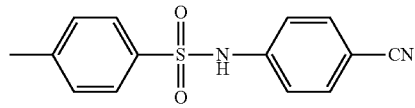
(SA-38)
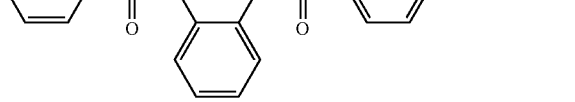
(SA-39)
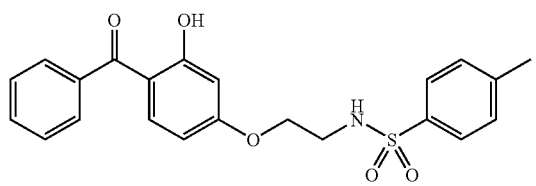
(SA-40)
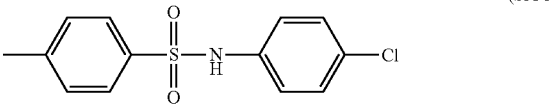
(SA-41)
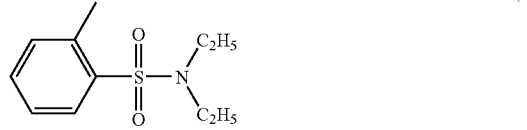
(SA-42)
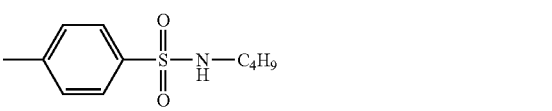
(SA-43)
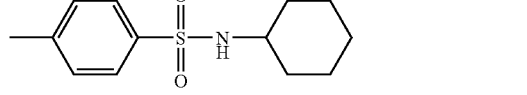
(SA-44)
(SA-45)
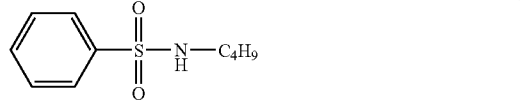
(SA-46)
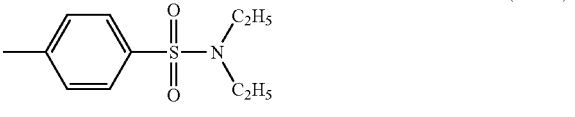

-continued (SA-47)
(SA-48)
(SA-49)
(SA-50)
(SA-51)
(SA-52)
(SA-53)
(SA-54)
(SB-1)
(SB-2)
(SB-3)
(SB-4)
(SB-5)
(SB-6)
(SB-7)
(SB-8)
(SB-9)
(SB-10)

-continued
(SB-11) 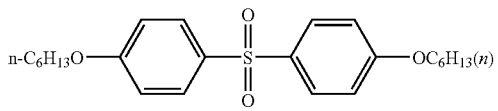
(SB-12) 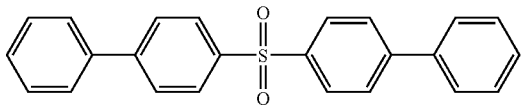
(SB-13) 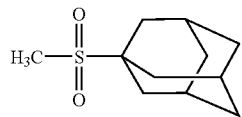
(SB-14) 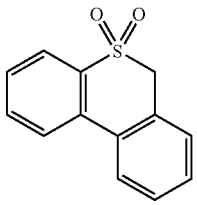
(SB-15) 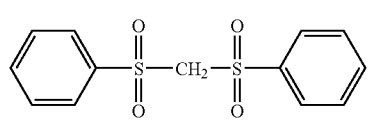
(SB-16) 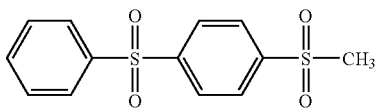
(SB-17) 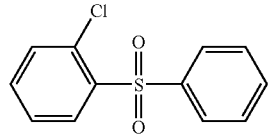
(SB-18) 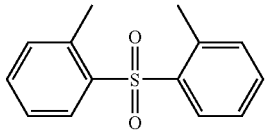
(SB-19) 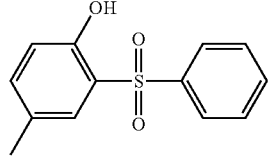
(SB-20) 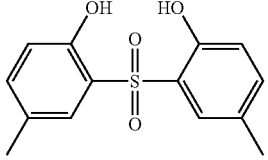
(SB-21) 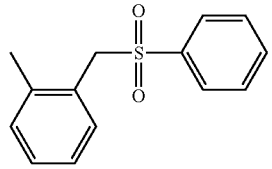
(SB-22) 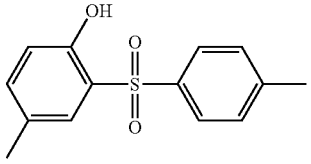
(SB-23) 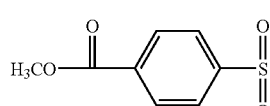
(SB-24) 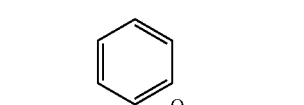
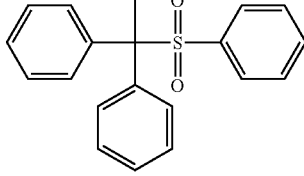
(SB-25) 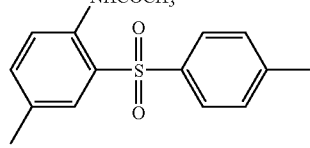
(SB-26) 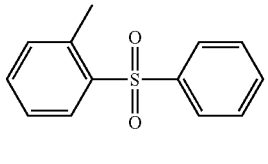
(SB-27) 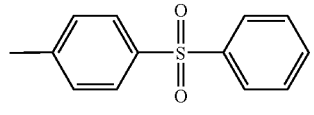
(SB-28) 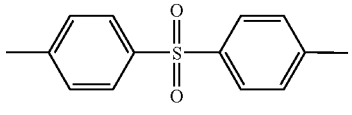

-continued

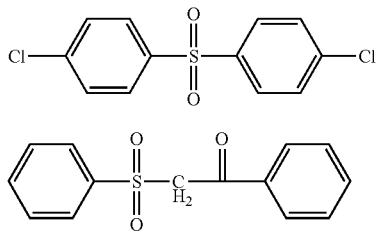

(SB-29)

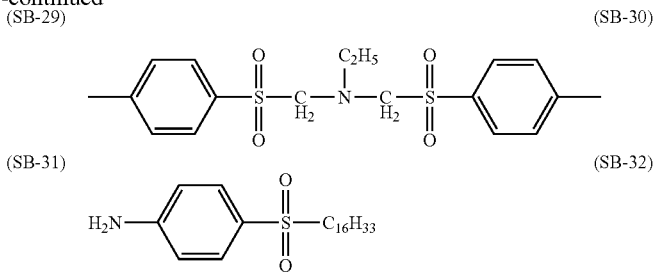

(SB-30)

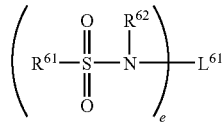

(SB-31)

(SB-32)

H$_2$N—⌬—S(=O)$_2$—C$_{16}$H$_{33}$

The compound of the invention represented by the formula (6) will next be described.

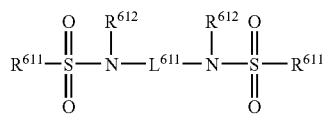

Formula (6)

In the formula (6), $R^{61}$ represents a substituted or unsubstituted aliphatic group or a substituted or unsubstituted aromatic group, $R^{62}$ represents a hydrogen atom, a substituted or unsubstituted aliphatic group or a substituted or unsubstituted aromatic group. As the substituent for them, the below-described substituent T can be used preferably. $L^{61}$ represents a divalent to hexavalent linking group. The valency of $L^{61}$ is preferably from 2 to 4, more preferably 2 or 3, and e stands for an integer of from 2 to 6 which depends on the valency of $L^{61}$, of which an integer of from 2 to 4 is more preferred with 2 or 3 being especially preferred.

When one compound contains two or more $L^{61}$ or $L^{62}$, they may be the same or different and preferably they may be the same.

The compound represented by the formula (6) is preferably a compound represented by the below-described formula (6-1).

Formula (6-1)

$R^{611}$—S(=O)$_2$—N($R^{612}$)—$L^{611}$—N($R^{612}$)—S(=O)$_2$—$R^{611}$

In the formula (6-1), $R^{611}$ represents a substituted or unsubstituted aliphatic group or a substituted or unsubstituted aromatic group. $R^{611}$ is preferably a substituted or unsubstituted aromatic group, more preferably an unsubstituted aromatic group. $R^{612}$ represents a hydrogen atom, a substituted or unsubstituted aliphatic group or a substituted or unsubstituted aromatic group. $R^{612}$ is preferably a hydrogen atom or a substituted or unsubstituted aliphatic group, more preferably a hydrogen atom. $L^{611}$ represents a divalent organic group composed of at least one group selected from —O—, —S—, —CO—, —NR$^{613}$— (R$^{613}$ represents a hydrogen atom, a substituted or unsubstituted aliphatic group or a substituted or unsubstituted aromatic group), alkylene groups and arylene groups. Although no particular limitation is imposed on the combination of the groups constituting the linking group, they are selected preferably from —O—, —S—, —NR$^{613}$— and alkylene groups, especially preferably from —O—, —S— and alkylene groups. The linking group is preferably a group composed of two or more groups selected from —O—, —S— and alkylene groups.

The above-described substituted or unsubstituted aliphatic group will next be described.

The aliphatic group may be any one of linear, branched and cyclic ones and it preferably has from 1 to 25 carbon atoms, more preferably from 6 to 25 carbon atoms, especially preferably from 6 to 20 carbon atoms. Specific examples of the aliphatic group include methyl, ethyl, n-propyl, isopropyl, cyclopropyl, n-butyl, isobutyl, t-butyl, amyl, isoamyl, t-amyl, n-hexyl, cyclohexyl, n-heptyl, n-octyl, bicyclooctyl, adamantyl, n-decyl, t-octyl, dodecyl, hexadecyl, octadecyl and didecyl.

The above-described aromatic group will next be described. The aromatic group may be either an aromatic hydrocarbon group or an aromatic heterocyclic group, but it is preferably an aromatic hydrocarbon group. The aromatic hydrocarbon group has preferably from 6 to 24 carbon atoms, more preferably from 6 to 12 carbon atoms. Specific examples of the ring of the aromatic hydrocarbon group include benzene, naphthalene, anthracene, biphenyl and terphenyl. As the aromatic hydrocarbon group, benzene, naphthalene and biphenyl are especially preferred. As the aromatic heterocyclic group, that having at least one of oxygen atom, nitrogen atom and sulfur atom is preferred. Specific examples of the heterocycle include furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, and tetrazaindene. As the aromatic heterocyclic group, pyridine, triazine and quinoline are especially preferred.

The substituent T has the same meaning as described in the formula (3).

The compound represented by the formula (6) is preferably a compound represented by the following formula (6-2).

Formula (6-2)

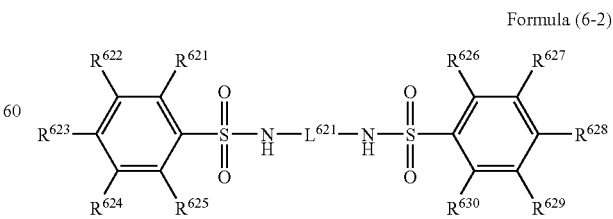

In the formula (3), $R^{621}$, $R^{622}$, $R^{623}$, $R^{624}$, $R^{625}$, $R^{626}$, $R^{627}$, $R^{628}$, $R^{629}$, and $R^{630}$ each independently represents a hydrogen atom or a substituent. As the substituent, the above-described substituent T can be used.

Preferred examples of $R^{621}$, $R^{622}$, $R^{623}$, $R^{624}$, $R^{625}$, $R^{626}$, $R^{627}$, $R^{628}$, $R^{629}$, and $R^{630}$ include alkyl groups, alkenyl groups, alkynyl groups, aryl groups, amino groups, alkoxy groups, aryloxy groups, acyl groups, alkoxycarbonyl groups, aryloxycarbonyl groups, acyloxy groups, acylamino groups, alkoxycarbonylamino groups, aryloxycarbonylamino groups, sulfonylamino groups, sulfamoyl groups, carbamoyl groups, alkylthio groups, arylthio groups, sulfonyl groups, sulfinyl groups, ureido groups, phosphoric acid amide groups, hydroxy group, mercapto group, halogen atoms (such as fluorine, chlorine, bromine and iodine), cyano group, sulfo group, carboxyl group, nitro group, hydroxamic acid group, sulfino group, hydrazino group, imino group, heterocyclic groups (preferably, those having from 1 to 30 carbon atoms, more preferably from 1 to 20 carbon atoms and containing, as the hetero atom, nitrogen, oxygen, sulfur or the like and specific examples include imidazolyl, pyridyl, quinolyl, furyl, piperidyl, morpholino, benzoxazolyl, benzimidazolyl, and benzothiazolyl), and silyl group. Of these, alkyl groups, aryl groups, aryloxycarbonylamino groups, alkoxy groups and aryloxy groups are more preferred, with alkyl groups, aryl groups and aryloxycarbonylamino groups are especially preferred. These substituents may be substituted further. When two or more substituents are present, they may be the same or different. If possible, they may be coupled to form a ring. $R^{621}$ and $R^{626}$, $R^{622}$ and $R^{627}$, $R^{623}$ and $R^{628}$, $R^{624}$ and $R^{629}$, $R^{625}$ and $R^{630}$ are each preferably the same. Moreover, $R^{621}$ to $R^{630}$ is more preferably a hydrogen atom.

$L^{621}$ represents a divalent organic group composed of at least one group selected from —O—, —S—, —CO—, —NR$^{631}$— ($R^{631}$ represents a hydrogen atom, an aliphatic group or an aromatic group), alkylene groups and arylene groups. Although no particular limitation is imposed on the combination of the groups constituting the linking group, they are selected preferably from —O—, —S—, —NR$^{631}$— and alkylene groups, especially preferably from —O—, —S— and alkylene groups. The linking group is preferably a group composed of two or more groups selected from —O—, —S— and alkylene groups.

Preferred examples of the compounds represented by the formula (6), (6-1) or (6-2) will be shown below, but the invention is not limited to these specific examples.

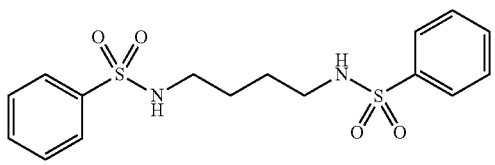
(SC-1)

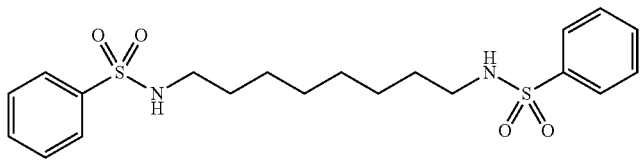
(SC-2)

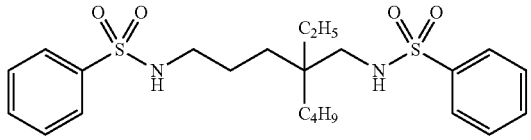
(SC-3)

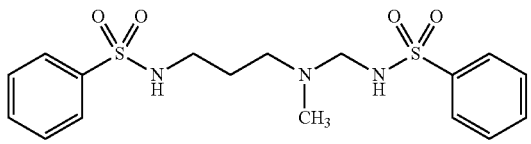
(SC-4)

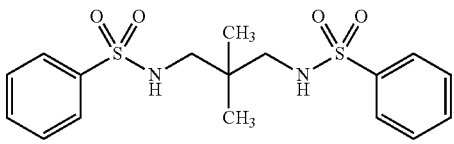
(SC-5)

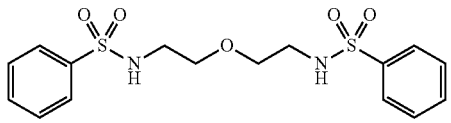
(SC-6)

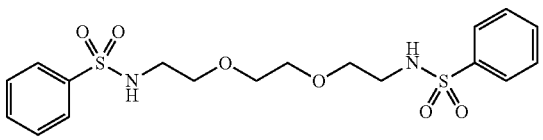
(SC-7)

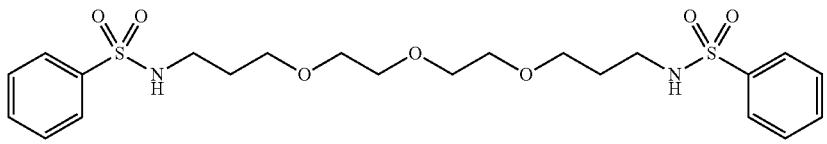
(SC-7)

-continued

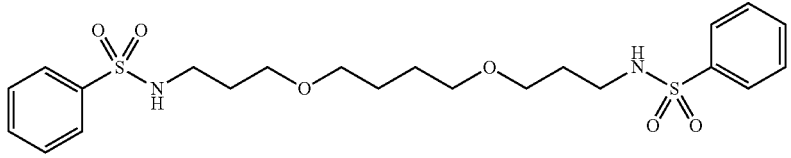
(SC-9)

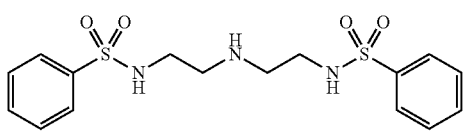
(SC-10)

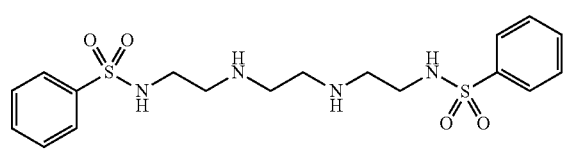
(SC-11)

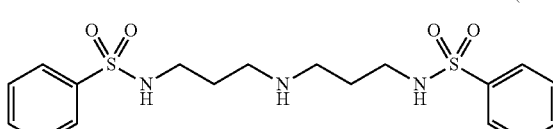
(SC-12)

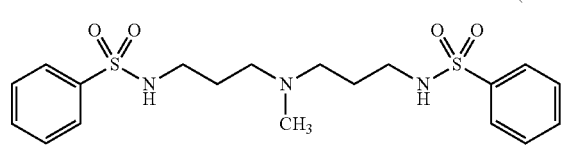
(SC-13)

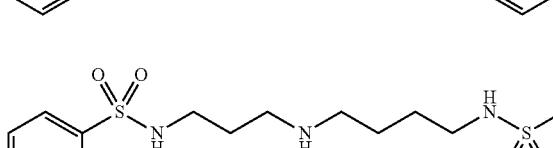
(SC-14)

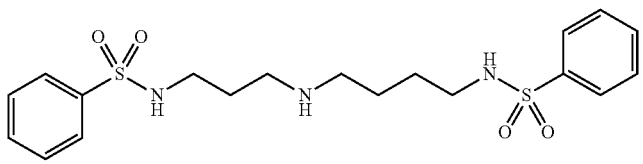
(SC-15)

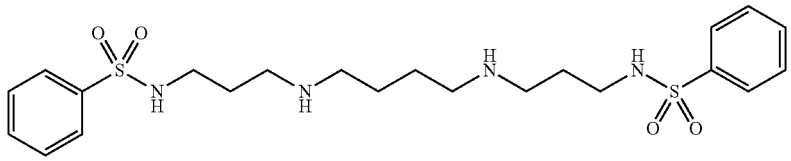
(SC-16)

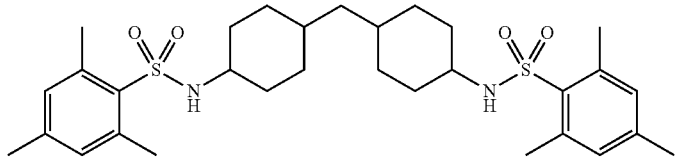
(SC-17)

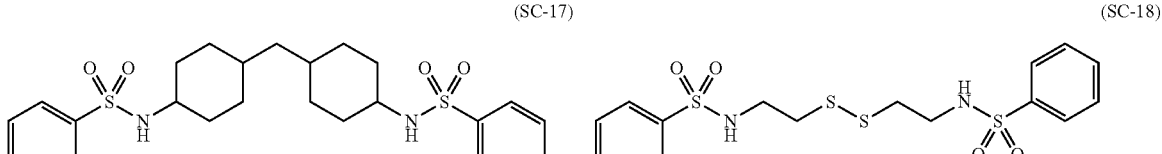
(SC-18)

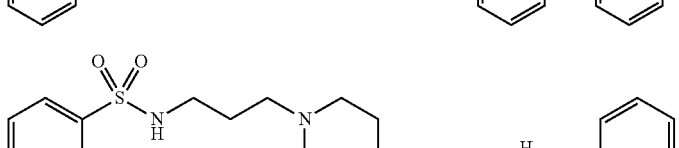
(SC-19)

Any of the compounds to be used in the invention can be prepared from known compounds.

The compounds represented by one or more of the formula (6), (6-1) and (6-2) are usually available by the condensation reaction between sulfonyl chloride and polyfunctional amine.

Of the compounds serving as a retardation regulator to be used in the invention and represented by any one of the formulas (1) to (6), the compounds represented by any one of the formulas (1) to (3) are preferred from the viewpoint of saponification resistance, with the compounds represented by the formula (2) being most preferred. Use of a retardation regulator having excellent saponification resistance enables to suppress a change in the retardation of a film before and after saponification treatment.

As a retardation regulator other than the compounds represented by the above-mentioned formulae (1) to (6), fatty acid esters mentioned in Japanese Patent Laid-Open No. 2006/030,937 (such as the compounds of the formulae (2) to

(12) mentioned in Japanese Patent Laid-Open No. 2006/030, 937), copolymers of ethylenic unsaturated monomers (such as acrylate polymers and oligomers mentioned in Japanese Patent Laid-Open No. 2003/012,859), copolymers of dibasic acids with glycols (such as adipic polyesters, succinic polyesters and phthalic polyesters) and the compounds represented by the following formula (7) may also be used preferably.

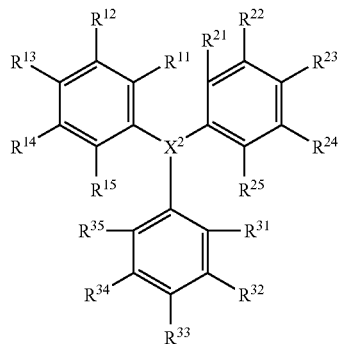

Formula (7)

(In the formula, $X^2$ is B, C—R (R is hydrogen atom or a substituent), N, P or P=O; and $R^{11}$, $R^{12}$, $R^{13}$, $R^{14}$, $R^{15}$, $R^{21}$, $R^{22}$, $R^{23}$, $R^{24}$, $R^{25}$, $R^{26}$, $R^{31}$, $R^{32}$, $R^{33}$, $R^{34}$ and $R^{35}$ each is hydrogen atom or a substituent).

$X^2$ is B, C—R (R is hydrogen atom or a substituent), N, P or P=O; preferably, $X^2$ is B, C—R (R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, hydroxyl group, mercapto group, halogen atom (such as fluorine atom, chlorine atom, bromine atom and iodine atom) or carboxyl group; more preferably, an aryl group, an alkoxy group, an aryloxy group, hydroxyl group or halogen atom; still more preferably, an alkoxy group or hydroxyl group; and, particularly preferably, hydroxyl group), N or P=O; more preferably, C—R or N; and, particularly preferably, C—R.

$R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ each is hydrogen atom or a substituent and, with regard to the substituent, a substituent T which will be mentioned later is able to be applied. Preferably, $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ each is an alkyl group, an alkenyl group, an alkynyl group, an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, a ureido group, a phosphoric acid amide group, hydroxyl group, mercapto group, halogen atom (such as fluorine atom, chlorine atom, bromine atom or iodine atom), cyano group, sulfo group, carboxyl group, nitro group, hydroxamic acid group, sulfino group, hydrazino group, imino group, heterocyclic group (preferably, carbon number(s) is/are 1 to 30 and, more preferably, 1 to 12; and examples of the hetero atom are nitrogen atom, oxygen atom and sulfur atom and specific examples thereof are imidazolyl, pyridyl, quinolyl, furyl, piperidyl, morpholino, benzoxazolyl, benzimidazolyl and benzthiazolyl) or silyl group; more preferably, an alkyl group, an aryl group, a substituted or unsubstituted amino group, an alkoxy group or an aryloxy group; and, still more preferably, an alkyl group, an aryl group or an alkoxy group.

The substituent as such may be further substituted and, when there are two or more substituents, they may be same or different. If it is possible, they may be connected each other to form a ring.

The aforementioned substituent T will be illustrated as follows. Examples of the substituent T are an alkyl group (having carbon atoms of preferably 1 to 20, more preferably 1 to 12 and, particularly preferably, 1 to 8 such as methyl, ethyl, isopropyl, tert-butyl, n-octyl, n-decyl, n-hexadecyl, cyclopropyl, cyclopentyl and cyclohexyl), an alkenyl group (having carbon atoms of preferably 2 to 20, more preferably 2 to 12 and, particularly preferably, 2 to 8 such as vinyl, allyl, 2-butenyl and 3-pentenyl), an alkynyl group (having carbon atoms of preferably 2 to 20, more preferably 2 to 12 and, particularly preferably, 2 to 8 such as propargyl and 3-pentynyl), an aryl group (having carbon atoms of preferably 6 to 30, more preferably 6 to 20 and, particularly preferably, 6 to 12 such as phenyl, p-methylphenyl and naphthyl), a substituted or unsubstituted amino group (having carbon atoms of preferably 0 to 20, more preferably 0 to 10 and, particularly preferably, 0 to 6 such as amino, methylamino, dimethylamino, diethylamino and dibenzylamino), an alkoxy group (having carbon atoms of preferably 1 to 20, more preferably 1 to 12 and, particularly preferably, 1 to 8 such as methoxy, ethoxy and butoxy), an aryloxy group (having carbon atoms of preferably 6 to 20, more preferably 6 to 16 and, particularly preferably, 6 to 12 such as phenyloxy and 2-naphthyloxy), an acyl group (having carbon atoms of preferably 1 to 20, more preferably 1 to 16 and, particularly preferably, 1 to 12 such as acetyl, benzoyl, formyl and pivaloyl), an alkoxycarbonyl group (having carbon atoms of preferably 2 to 20, more preferably 2 to 16 and, particularly preferably, 2 to 12 such as methoxycarbonyl and ethoxycarbonyl), an aryloxycarbonyl group (having carbon atoms of preferably 7 to 20, more preferably 7 to 16 and, particularly preferably, 7 to 12 such as phenyloxycarbonyl), an acyloxy group (having carbon atoms of preferably 2 to 20, more preferably 2 to 16 and, particularly preferably, 2 to 10 such as acetylamino and benzoylamino), an alkoxycarbonylamino group (having carbon atoms of preferably 2 to 20, more preferably 2 to 16 and, particularly preferably, 2 to 12 such as methoxycarbonylamino), an aryloxycarbonylamino group (having carbon atoms of preferably 7 to 20, more preferably 7 to 16 and, particularly preferably, 7 to 12 such as phenyloxycarbonylamino), a sulfonylamino group (having carbon atoms of preferably 1 to 20, more preferably 1 to 16 and, particularly preferably, 1 to 12 such as methanesulfonylamino and benzenesulfonylamino), a sulfamoyl group (having carbon atoms of preferably 0 to 20, more preferably 0 to 16 and, particularly preferably, 0 to 12 such as sulfamoyl, methylsulfamoyl, dimethylsulfamoyl and phenylsulfamoyl), a carbamoyl group (having carbon atoms of preferably 1 to 20, more preferably 1 to 16 and, particularly preferably, 1 to 12 such as carbamoyl, methylcarbamoyl, diethylcarbamoyl and phenylcarbamoyl), an alkylthio group (having carbon atoms of preferably 1 to 20, more preferably 1 to 16 and, particularly preferably, 1 to 12 such as methylthio and ethylthio), an arylthio group (having carbon atoms of preferably 6 to 20, more preferably 6 to 16 and, particularly preferably, 6 to 12 such as phenylthio), a sulfonyl group (having carbon atoms of preferably 1 to 20, more preferably 1 to 16 and, particularly preferably, 1 to 12 such as mesyl and tosyl), a sulfinyl group (having carbon atoms of preferably 1 to 20, more preferably 1 to 16 and, particularly preferably, 1 to 12 such as methanesulfinyl and benzenesulfinyl), a ureido group (having carbon atoms of preferably 1 to 20, more preferably 1 to 16 and, particularly preferably, 1 to 12 such as ureido, methylureido and phenylureido), a phosphoric acid amide group (having carbon atoms of preferably 1 to 20, more preferably 1 to 16 and, particularly preferably, 1 to 12 such as diethylphosphoric acid amide and phenylphosphoric acid amide), hydroxyl group, mercapto group, halogen atom (such as fluorine atom, chlorine atom, bromine atom and iodine atom), cyano group, sulfo group, carboxyl group, nitro group, hydroxamic acid group, sulfino group, hydrazine group, imino group, heterocyclic group (having carbon atoms of preferably 1 to 30 and more preferably 1 to 12 where examples of a hetero atom are nitrogen atom, oxygen atom and sulfur atom and specific examples are imidazolyl, pyridyl, furyl, piperidyl, morpholine, benzoxazolyl, benzimidazolyl and benzthiazolyl, a silyl group (having carbon atoms of preferably 3 to 40, more preferably 3 to 30 and, particularly preferably, 3 to 24 such as trimethylsilyl and triphenylsilyl), etc. The substituent as such may be further substituted and, when there are two or more substituents, they may be same or different. If it is possible, they may be connected each other to form a ring.

Specific examples of the compound represented by the formula (7) will be mentioned as hereunder although the present invention is not limited to the following specific examples at all.

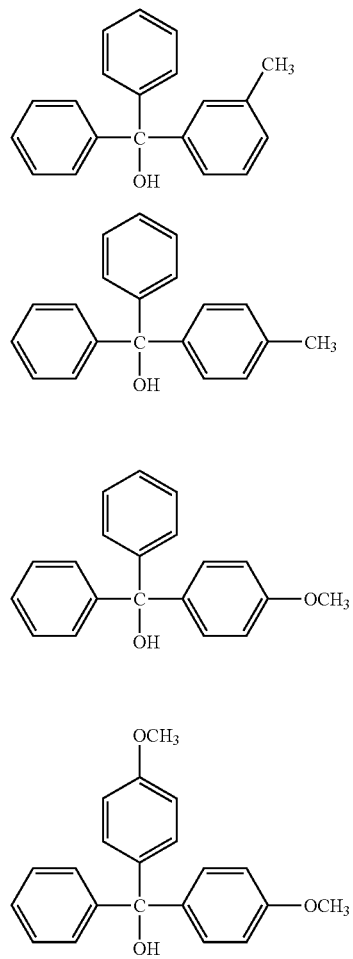
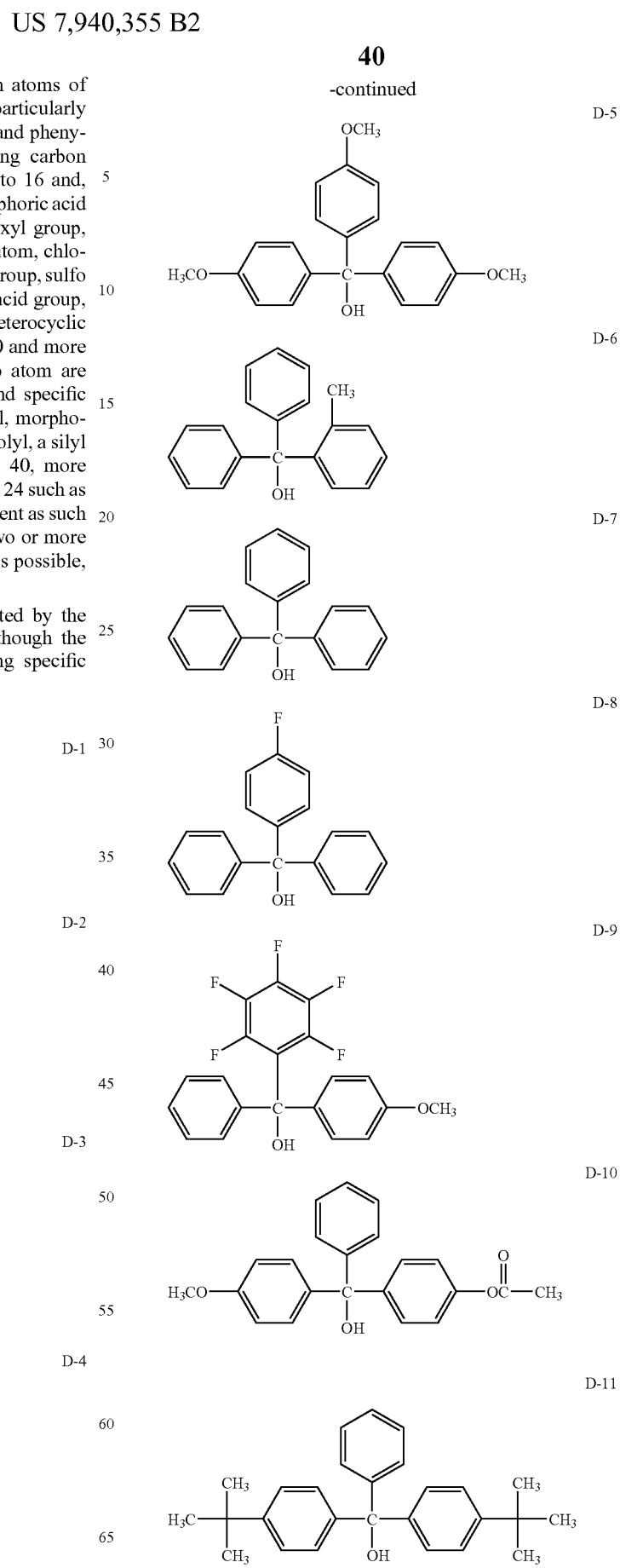

-continued
D-12
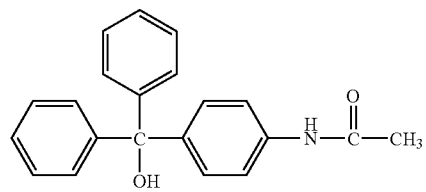
D-13
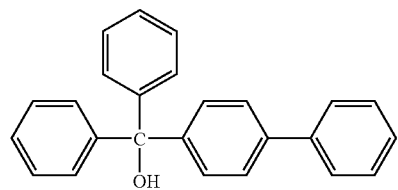
D-14
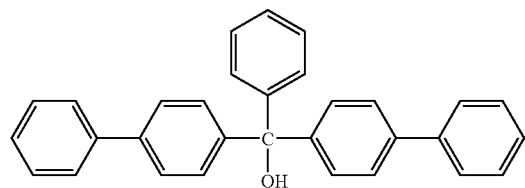
D-15
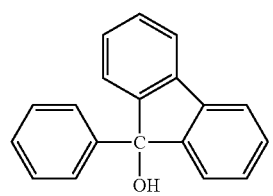
D-16
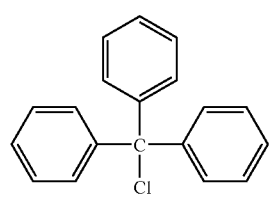
D-17
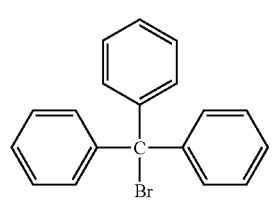
D-18
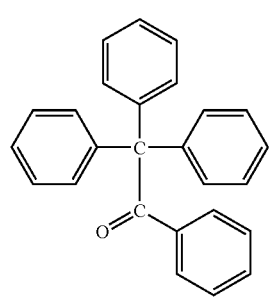
D-19
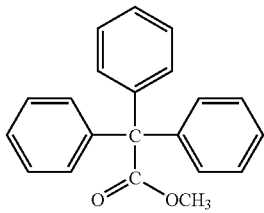
D-20
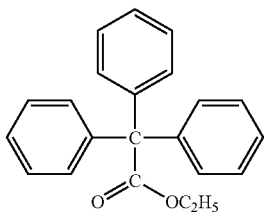
D-21
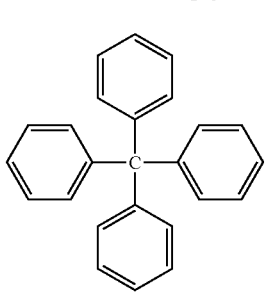
D-22
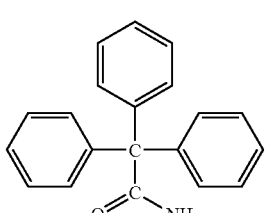
D-23
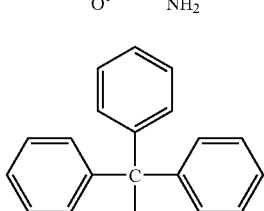
D-24
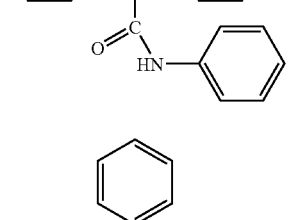
E-1
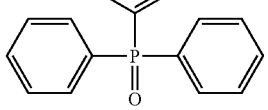

-continued
E-2
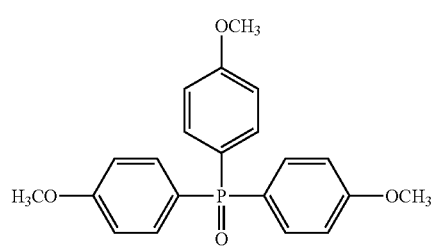
E-3
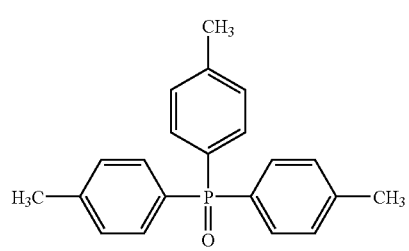
E-4
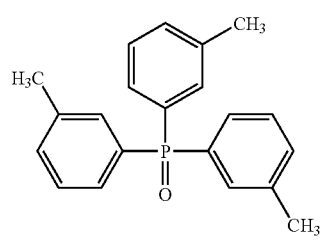
E-5
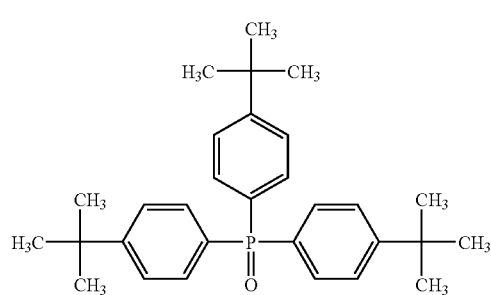
E-6
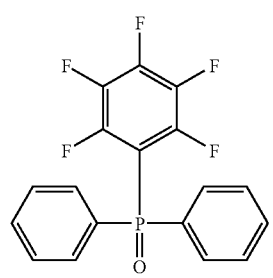
E-7
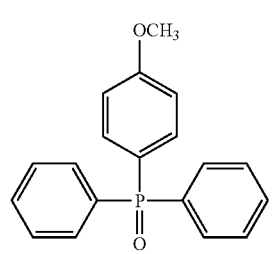
-continued
E-8
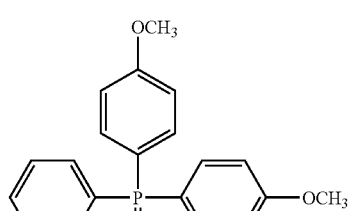
E-9
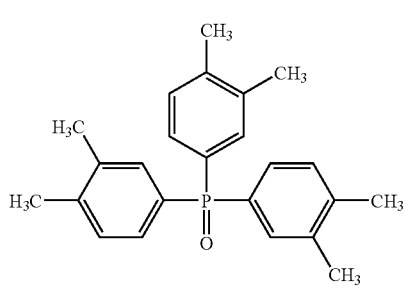
E-10
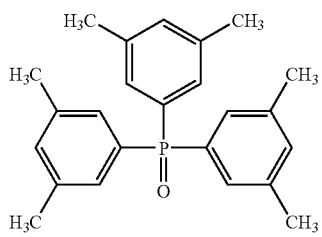
E-11
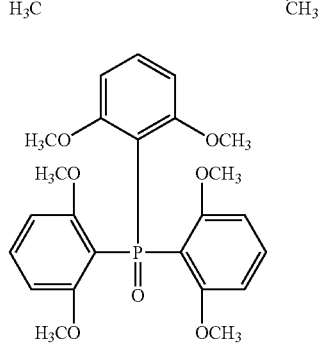
E-12
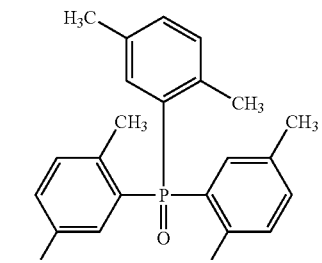
E-13
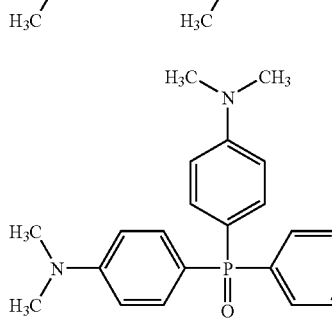

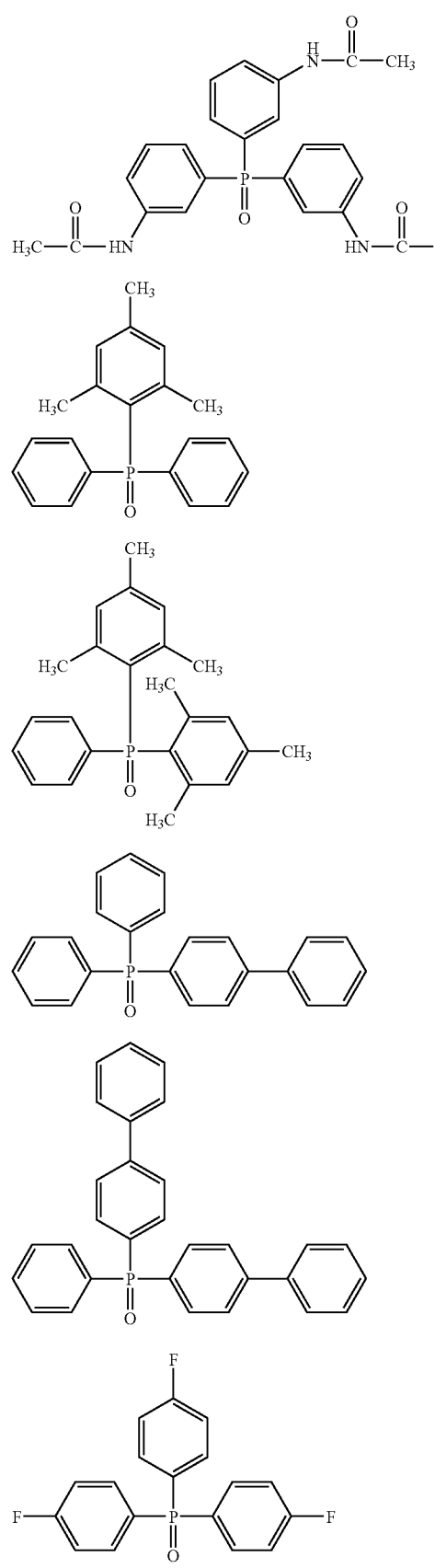
E-14
E-15
E-16
E-17
E-18
E-19
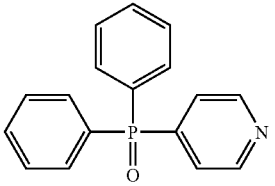
E-20
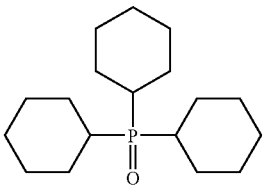
E-21
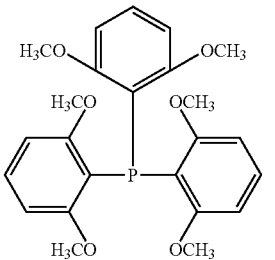
E-22
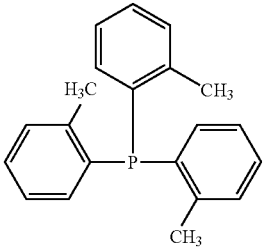
E-23
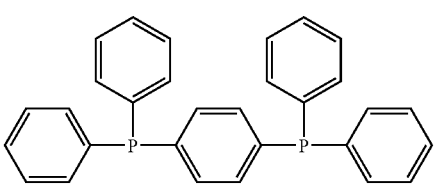
E-24
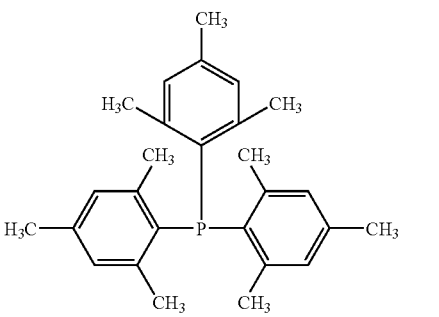
E-25
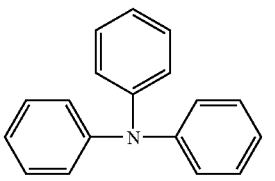
E-26

-continued

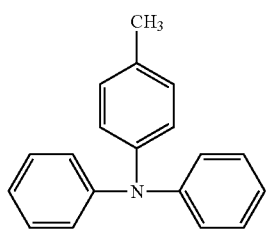
E-27

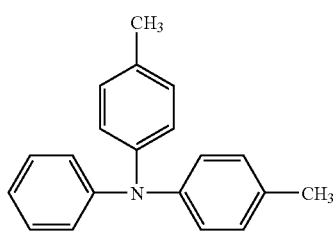
E-28

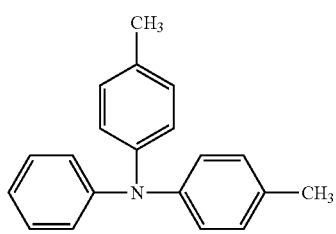
E-29

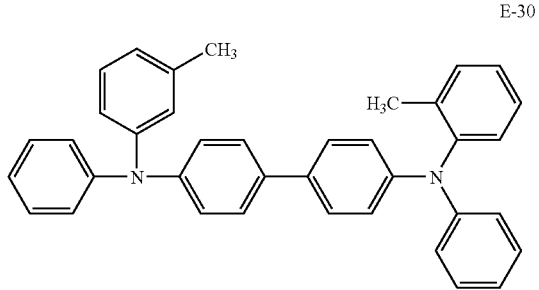
E-30

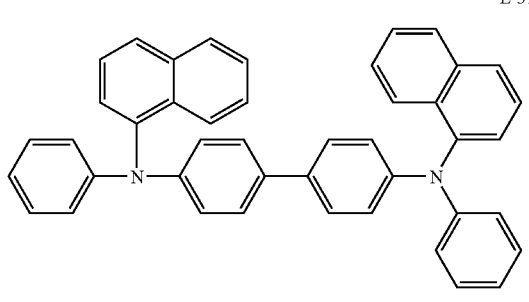
E-31

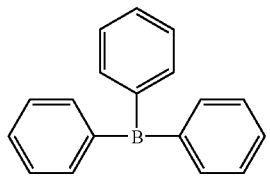
E-32

As retardation regulators which are other than the compounds represented by the above formulae (1) to (6), a polymer of an ethylenic unsaturated monomer(s) is also preferably used.

The ethylenic unsaturated monomers used in the present invention will be illustrated as follows.

The polymer of the ethylenic unsaturated monomer(s) used in the present invention is preferred when its weight-average molecular weight is from 500 to 10,000 and is that which is considered to be between oligomers to low-molecular polymers. When the weight-average molecular weight is not more than 10,000, miscibility with cellulose ester is good. When the weight-average molecular weight is more than 10,000, generation of bleeding-out increases. The weight-average molecular weight is more preferably from 800 to 8,000 and, still more preferably, from 1,000 to 5,000.

The monomer which is a monomer unit constituting the polymer of the present invention is listed below although they are non-limitative.

Examples of the ethylenic unsaturated monomer unit which constitutes the polymer prepared by polymerization of ethylenic unsaturated monomer are a vinyl ester such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexanecarboxylate, vinyl octylate, vinyl methacrylate, vinyl crotonate, vinyl sorbate, vinyl benzoate and vinyl cinnamate; an acrylate such as methyl acrylate, ethyl acrylate, propyl (iso- and n-) acrylate, butyl (n-, iso-, sec- and tert-) acrylate, pentyl (n-, iso- and sec-) acrylate, hexyl (n- and iso-) acrylate, heptyl (n- and iso-) acrylate, octyl (n- and iso-) acrylate, nonyl (n- and iso-) acrylate, myristyl (n- and iso-) acrylate, cyclohexyl acrylate, 2-ethylhexyl acrylate, benzyl acrylate, phenethyl acrylate, ∈-caprolactone acrylate, 2-hydroxyethyl acrylate, 2-hydroxypropyl acrylate, 3-hydroxypropyl acrylate, 4-hydroxybutyl acrylate, 2-hydroxybutyl acrylate, p-hydroxymethylphenyl acrylate and p-(2-hydroxyethyl)phenyl acrylate; a methacrylate such as those where the above-mentioned acrylate is changed to methacrylate; and an unsaturated acid such as acrylic acid, methacrylic acid, maleic acid anhydride, crotonic acid and itaconic acid. The polymer constituted by the above-mentioned monomers may be either copolymers or homopolymers and preferred ones are homopolymers of vinyl esters, copolymers of vinyl esters and copolymers of vinyl esters with acrylates or methacrylates. Acrylate polymers are particularly preferred.

In the present invention, acrylate polymers mean homopolymers or copolymers of alkyl acrylate or methacrylate having no monomer unit which has an aromatic ring or cyclohexyl group (hereafter, the acrylate polymer having such constitution is simply described as "acrylate polymer"). In the present invention, acrylate polymers having an aromatic ring on side chain stand for acrylate polymers which contain acrylate or methacrylate monomer unit having an aromatic ring at all times. In the present invention, acrylate polymers having a cyclohexyl group on side chain stand for acrylate polymers containing acrylate or methacrylate monomer unit having a cyclohexyl group.

Examples of acrylate monomer having no aromatic ring and cyclohexyl group are methyl acrylate, ethyl acrylate, propyl (iso- and n-) acrylate, butyl (n-, iso-, sec- and tert-) acrylate, pentyl (n-, iso- and sec-) acrylate, hexyl (n- and iso-) acrylate, heptyl (n- and iso-) acrylate, octyl (n- and iso-) acrylate, nonyl (n- and iso-) acrylate, myristyl (n- and iso-) acrylate, 2-ethylhexyl acrylate, ∈-caprolactone acrylate, 2-hydroxyethyl acrylate, 2-hydroxypropyl acrylate, 3-hydroxypropyl acrylate, 4-hydroxybutyl acrylate, 2-hydroxybutyl acrylate, 2-methoxyethyl acrylate and 2-ethoxyethyl acrylate as well as the compounds where the above-mentioned acrylates are changed to methacrylates.

The acrylate polymer is a homopolymer or a copolymer of the above-mentioned monomers. It is preferred to contain 30% by mass or more methyl acrylate monomer unit and it is also preferred to contain 40% by mass or more methyl methacrylate monomer unit. Homopolymer of methyl acrylate or methyl methacrylate is particularly preferred.

Examples of acrylate or methacrylate monomer having an aromatic ring are phenyl acrylate, phenyl methacrylate, 2- or 4-chlorophenyl acrylate, 2- or 4-chlorophenyl methacrylate, 2-, 3- or 4-ethoxycarbonylphenyl acrylate, 2-, 3- or 4-ethoxycarbonylphenyl methacrylate, o-, m- or p-tolyl acrylate, o-, m- or p-tolyl methacrylate, benzyl acrylate, benzyl methacrylate, phenethyl acrylate, phenethyl methacrylate and 2-naphthyl acrylate where benzyl acrylate, benzyl methacrylate, phenethyl acrylate or phenethyl methacrylate may be preferably used.

In the acrylate polymer having an aromatic ring on the side chain, that which has 20 to 40% by mass of acrylate or methacrylate monomer unit having an aromatic ring and has 50 to 80% by mass of methyl acrylate or methacrylate monomer is preferred. In said polymer, that which has 2 to 20% by mass of acrylate or methacrylate monomer unit having hydroxyl group is preferred.

Examples of the acrylate monomer having cyclohexyl group are cyclohexyl acrylate, cyclohexyl methacrylate, 4-methylcyclohexyl acrylate, 4-methylcyclohexyl methacrylate, 4-ethylcyclohexyl acrylate and 4-ethylcyclohexyl methacrylate. Cyclohexyl acrylate and cyclohexyl methacrylate may be used preferably.

In the acrylate polymer having cyclohexyl group on the side chain, it has 20 to 40% by mass of acrylate or methacrylate monomer unit having cyclohexyl group and may have 50 to 80% by mass of acrylate or methacrylate monomer unit. In said polymer, it is also possible to have preferably 2 to 20% by mass of acrylate or methacrylate monomer unit having hydroxyl group.

In the present invention, a polymer having a hydroxyl group on the side chain may be also used preferably. Although a monomer unit having a hydroxyl group is the same as the above-mentioned monomer, acrylate or methacrylate is preferred. Examples thereof are 2-hydroxyethyl acrylate, 2-hydroxypropyl acrylate, 3-hydroxypropyl acrylate, 4-hydroxybutyl acrylate, 2-hydroxybutyl acrylate, p-(hydroxymethyl)phenyl acrylate, p-(2-hydroxyethyl)phenyl acrylate and compounds where acrylic acid therein is changed to methacrylic acid and preferred ones are 2-hydroxyethyl acrylate and 2-hydroxyethyl methacrylate. With regard to the acrylate or methacrylate monomer unit having a hydroxyl group, it is contained preferably in an amount of 2 to 20% by mass or, more preferably, 2 to 10% by mass in the polymer.

With regard to the ethylenic unsaturated monomer having a functional group being useful for the polymer of the ethylenic unsaturated monomer(s) used in the present invention, it is also possible to use a compound having an ultraviolet absorptive group or an antistatic group on the side chain of the polymer. Anything may be used without limitation so far as it is a group giving Tg of not more than 50° C. as a copolymer. Examples of an ethylenic group of the ethylenic unsaturated monomer having a functional group are vinyl group, acryloyl group and methacryloyl group and they are used preferably.

Examples of the ultraviolet absorptive group for the ethylenic unsaturated monomer having an ultraviolet absorptive group useful in the present invention are benzotriazole group, salicylate group, benzophenone group, oxybenzophenone group and cyanoacrylate group and any of them may be preferably used in the present invention.

With regard to the ethylenic unsaturated monomer having an ultraviolet absorptive group, the ultraviolet absorptive monomer constituting the ultraviolet absorptive polymer mentioned in Japanese Patent Laid-Open No. 06/148,430 and the ultraviolet absorptive monomer mentioned in Japanese Patent Laid-Open No. 2002/020,410 may be used preferably.

With regard to an antistatic group of the ethylenic unsaturated monomer having an antistatic group, there may be listed quaternary ammonium group, sulfonate group, polyethylene oxide group, etc. and, in view of solubility and charging property, quaternary ammonium group is preferred. An ethylenic unsaturated monomer having an antistatic group mentioned in Japanese Patent Laid-Open No. 2002/020,410 may also be used preferably.

Specific examples of the polymer of the present invention are as follows although they are non-limitative.

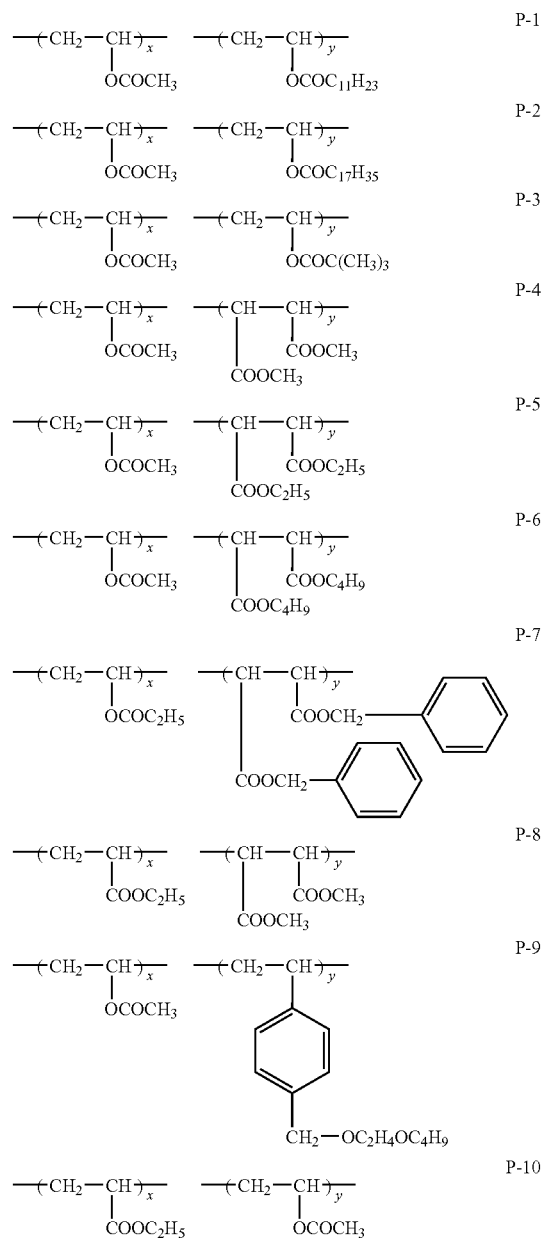

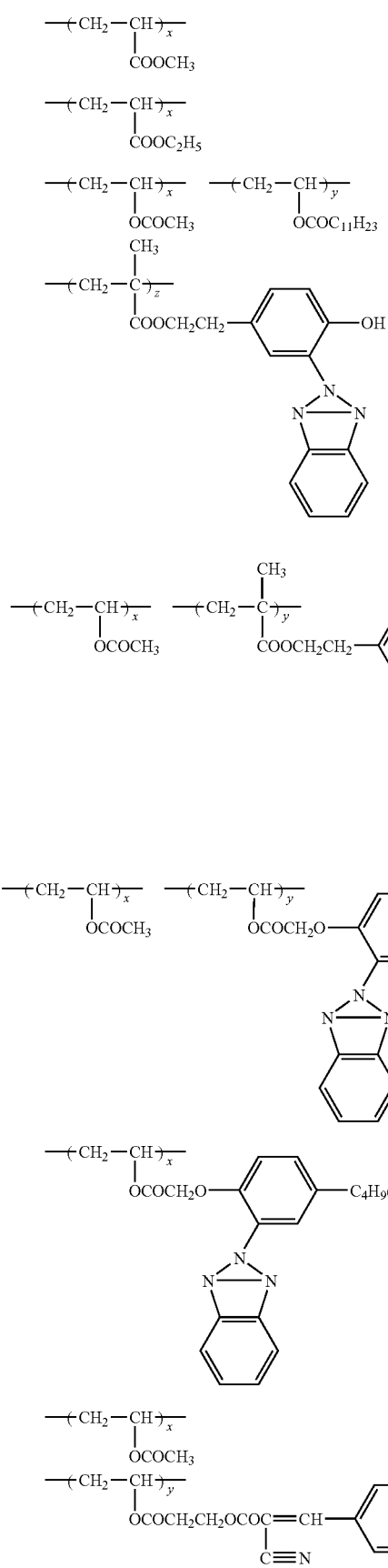
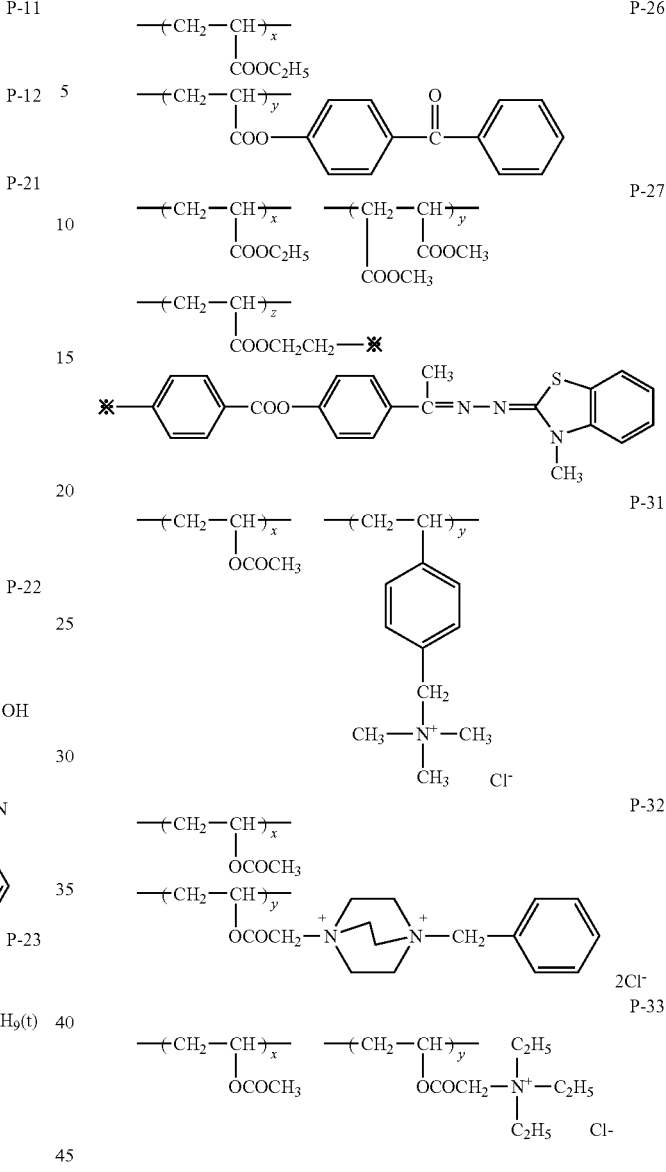

Examples of the method for the synthetic of the polymer of the present invention are a method where a peroxide polymerization initiator such as cumene peroxide and tert-butyl hydroperoxide is used, a method where a polymerization initiator is used in more amount than that in the common polymerization, a method where a chain transfer agent such as a mercapto compound or nitrobenzene is used in addition to a polymerization initiator, a method where bulk polymerization is carried out using a polymerization catalyst comprising a compound having one thiol group and secondary hydroxyl group mentioned in Japanese Patent Laid-Open No. 2000/128,911 or 2000/344,823 or said compound together with an organometallic compound and a method which is mentioned in Japanese Patent Laid-Open No. 2002/020,410 or 2003/012,859 and any of them is able to be preferably used in the present invention.

As the retardation regulator to be used in the invention, compounds having an octanol-water partition coefficient (log P) of from 0 to 7 are preferred. Of the compounds represented by any one of the formulas (1) to (6), those having an octanol-water partition coefficient (log P) of from 0 to 7 are preferred.

Compounds having a log P of 7 or less are preferred because they have excellent compatibility with cellulose acylate and do not cause problems such as turbidity or blooming of a film. Compounds having a log P of 0 or greater are preferred because they do not deteriorate the water resistance of a cellulose acylate film which will otherwise occur by excessive increase in hydrophilicity. The log P is more preferably from 1 to 6, especially preferably from 1.5 to 5.

The octanol-water partition coefficient (log P) can be measured by the shake flask method as described in JIS Z-7260-107 (2000). The octanol-water partition coefficient (log P) can also be estimated by computational chemistry or by empirical method instead of actual measurement.

As the computational method, the Crippen's fragmentation method {*J. Chem. Inf. Comput. Sci.,* 27, 21 (1987)}, the Viswanadhan's fragmentation method {*J. Chem. Inf. Comput. Sci.,* 29, 163 (1989)}, and the Broto's fragmentation method {*Eur. J. Med. Chem.—Chim. Theor.,* 19, 71 (1984)} are preferably employed, but the Crippen's fragmentation method is more preferred. When the log P of a certain compound differs, depending on the measuring method or computational method, the Crippen's fragmentation method is used for judging whether the log P of the compound falls within the above-described range.

The retardation regulator used in the present invention other than the compound represented by the formula (7) above preferably has a molecular mass of 150 or greater but not greater than 3000, more preferably 170 or greater but not greater than 2000, especially preferably 200 or greater but not greater than 1000. The retardation regulators having a molecular mass falling within the above-described range may have a specific monomer structure or an oligomer structure or polymer structure having a plurality of the monomer units bonded to each other.

The retardation regulator is preferably a liquid at 25° C. or a solid having a melting point of from 25 to 250° C., preferably a liquid at 25° C. or a solid having a melting point of from 25 to 200° C. The retardation regulator preferably does not volatilize during casting or drying of a dope for the preparation of a cellulose acylate film.

The retardation regulator is added preferably in an amount of from 0.01 to 30 mass %, more preferably from 1 to 25 mass %, especially preferably from 5 to 20 mass %, each relative to cellulose acylate.

The retardation regulators may be used either singly or in combination of two or more as a mixture mixed at a desired ratio.

The retardation regulator may be added at any stage during the preparation of a dope. It may be added at the final stage of the dope preparation.

An average content of the retardation regulator in at least a portion extending from the surface on one side of the cellulose acylate film to 10% of the total film thickness is preferably 80 to 99% of the average content of the compound at the center portion of the film. The amount of the compound to be used in the invention can be determined by measuring the amount of the compound in each of the surface portion and central portion by the method using, for example, infrared absorption spectrum as described in JP-A-8-57879.

[Near Infrared Absorber]

The cellulose acylate film of the invention contains at least one near infrared absorber having at least one maximum absorption wavelength at 700 nm or greater but not greater than 1200 nm.

The near infrared absorber to be used in the invention will next be described. It is known from the Kramers-Kronig's relational expression that with regard to the relation between the wavelength of light and a refractive index, a refractive index shows a large change in the proximity of the absorption maximum of a compound. A negative refractive index appears on the short wavelength side of the absorption maximum and a positive refractive index appears on the long wavelength side of the absorption maximum.

The near infrared absorber having the absorption maximum at from 700 to 1200 nm shows negative refractive index anisotropy in a visible region and can reduce the value of Rth when it suitably exists in the cellulose acylate film.

The near infrared absorber of the invention has at least one maximum absorption wavelength preferably at 700 nm or greater but not greater than 1200 nm, more preferably at 800 nm or greater but not greater than 950 nm, most preferably at 800 nm or greater but not greater than 900 nm. In the invention, when the maximum absorption wavelength differs with the measuring method, the maximum absorption wavelength as measured using dichloromethane as a solvent is adopted.

From the standpoint of transparency of the cellulose acylate film, the near infrared absorber of the invention has preferably an absorbance, in terms of a 1.0 g/liter solution in a good solvent, for example, dichloromethane, of 30.0 or less, more preferably 15.0 or less, still more preferably 5.0 or less, each for 1 cm path length in a wavelength region of 450 nm or greater but not greater than 800 nm.

Moreover, it has preferably an absorbance of 20.0 or less, more preferably 10.0 or less, still more preferably 5.0 or less in a wavelength region of 400 nm or greater but not greater than 700 nm.

Examples of the near infrared absorber to be used in the invention include organic compounds such as cyanine compounds, phthalocyanine compounds, naphthalocyanine compounds, polymethine compounds, thiol metal complex salts, aminothiophenolate metal complex salts, immonium compounds, diimmonium compounds, aminium salts, pyrylium compounds, squarylium compounds, croconium compounds, triallylmethane compounds, azulenium compounds, indophenol compounds and anthraquinone compounds and inorganic compounds such as aluminum salts.

Specific examples include various compounds as disclosed in JP-A-6-256564 and JP-A-2001-208913, phthalocyanines or naphthalocyanines as disclosed in JP-A-61-154888, JP-A-61-197281, JP-A-61-246091, JP-A-63-37991, JP-A-63-39388, JP-A-62-233288, JP-A-63-312889, JP-A-2-43269, JP-A-2-138382, JP-A-2-296885, JP-A-3-43461, JP-A-3-77840, JP-A-3-100066, JP-A-3-62878, JP-A-6-214113, and JP-A-10-78509, thiol metal complex salts as disclosed in JP-B-58-56533, JP-A-62-54143, JP-B-2-4881, JP-A-4-45546, JP-A-2003-221523, and JP-A-2003-327865, aminothiophenolate metal complex salts as disclosed in JP-A-63-112593 and JP-A-2001-89492, diimmonium compounds as disclosed in JP-A-2003-96040 and JP-A-2003-327865, pyrylium compounds, squarylium compounds or croconium compounds as disclosed in JP-A-2002-286931 and JP-A-2001-194522 and anthraquinones as disclosed in JP-A-61-291651, JP-A-61-291652, JP-A-62-15260, JP-A-62-132963, JP-A-1-129068 and JP-A-1-172458.

Preferred examples of the near infrared absorber to be used in the invention will be described below, but the invention is not limited to such specific examples of them.

Specific examples include "KAYASORB IRG-022" and "KAYASORB IRG-040" (each, trade name; product of Nippon Kayaku Co., Ltd.), "NIR-IM1", "NIR-IM2", "NIR-IM3" and "NIR-IM4" (each, trade name; product of Nagase Chemtex Corporation), "MIR-369" (trade name; product of Yamamoto Chemicals Inc.), "IR-301" (trade name; product of Yamada Chemical Co., Ltd.), "SDA4428", "SDA4927", "SDA5688", "SDA6104", "SDA7611", "SDA7775", "SDA9800" and "SDG7047" (each, trade name; product of H.W. SANDS), "Projet 830NP" and "Projet 900NP" (each, trade name; product of Avecia, Ltd.) and the below-described compounds IR-1, IR-2, and IR-3.

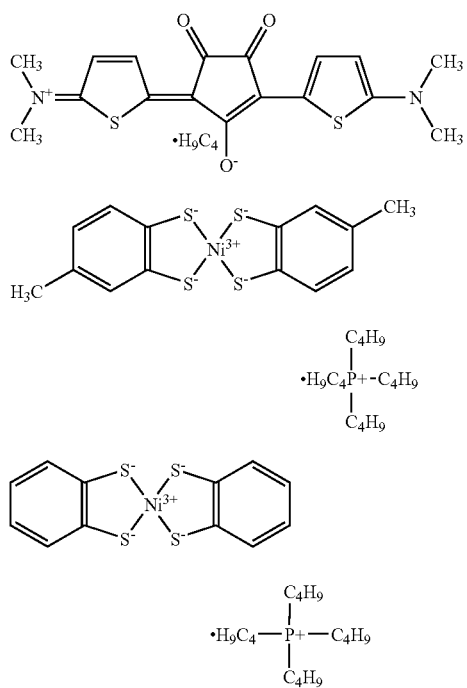

The near infrared absorber of the invention is added preferably in an amount of from 0.001 to 2 mass %, more preferably from 0.002 to 1 mass %, especially preferably from 0.01 to 0.5 mass %, each relative to cellulose acylate.

The near infrared absorbers of the invention may be used either singly or in combination of two or more as a mixture mixed at a desired ratio.

The near infrared absorber of the invention may be added in any stage during the preparation of a dope and it may be added at the final stage of the dope preparation.

[Cellulose Acylate]
[Cellulose Acylate Raw Material Cotton]

As a cellulose which is a raw material of the cellulose acylate to be used in the invention, cotton linter or wood pulp (hardwood pulp, softwood pulp) can be used. Cellulose acylate available from any raw material celluloses can be used and a mixture of them may be used in some cases. Celluloses as described in detail in, for example, *Plastic Zairyo Koza* (17): *Sen'isokei Jushi* (written by Marusawa and Uda, published by Nikkan Kogyo Shimbun, Ltd. in 1970) or in *Journal of Technical Disclosure Semimonthly* (No. 2001-1745, on pages 7 to 8) can be used as the raw material celluloses. No particular limitation is imposed on the cellulose acylate film of the invention.

[Substitution Degree of Cellulose Acylate]

Cellulose acylates prepared using the above-described cellulose as a raw material and preferred in the invention will next be described.

The cellulose acylate to be used in the invention is obtained by acylation of the hydroxyl group of a cellulose and as the substituent, an acyl group having from 2 carbon atoms, that is, acetyl group, to 22 carbon atoms can be used. Although, in the invention, no particular limitation is imposed on the substitution degree of the hydroxyl group of the cellulose in the cellulose acylate, the substitution degree can be determined by calculation based on the measured coupling degree of acetic acid and/or $C_{3-22}$ fatty acid to be substituted for the hydroxyl group of the cellulose. The measurement can be carried out in accordance with ASTM D-817-91.

As described above, no particular limitation is imposed on the degree of substitution for the hydroxyl group of the cellulose, but the substitution degree of an acyl group for the hydroxyl group of the cellulose is preferably from 2.50 to 3.00, more preferably from 2.75 to 3.00, still more preferably from 2.85 to 3.00.

Of the acetic acid and/or $C_{3-22}$ fatty acid to be substituted for the hydroxyl group of the cellulose, the $C_{2-22}$ acyl group is not particularly limited and it may be an aliphatic group or allyl group, or it may be a single compound or a mixture of two or more compounds. It may be, for example, an alkylcarbonyl ester, alkenylcarbonyl ester, aromatic carbonyl ester or aromatic alkylcarbonyl ester of the cellulose and it may have a group substituted further. Preferred examples of the acyl group include acetyl, propionyl, butanoyl, heptanoyl, hexanoyl, octanoyl, decanoyl, dodecanoyl, tridecanoyl, tetradecanoyl, hexadecanoyl, octadecanoyl, i-butanoyl, t-butanoyl, cyclohexanecarbonyl, oleoyl, benzoyl, naphthylcarbonyl and cinnamoyl groups. Of these, acetyl, propionyl, butanoyl, dodecanoyl, octadecanoyl, t-butanoyl, oleoyl, benzoyl, naphthylcarbonyl, and cinnamoyl groups are preferred, with acetyl, propionyl and butanoyl being more preferred.

When the acyl group substituted for the hydroxyl group of the cellulose is substantially composed of at least two groups selected from an acetyl group, a propionyl group and a butanoyl group, the optical anisotropy of the cellulose acylate film can be reduced preferably at the total substitution degree of from 2.50 to 3.00, more preferably from 2.60 to 3.00, still more preferably from 2.65 to 3.00.

When the acyl group serving as a substituent for the cellulose acylate is substantially composed only of an acetyl group, the optical anisotropy of the cellulose acylate film can be reduced preferably at the total substitution degree of from 2.50 to 2.95.

[Polymerization Degree of Cellulose Acylate]

The polymerization of the cellulose acylate to be used in the invention is preferably from 180 to 700, more preferably from 180 to 550, still more preferably from 180 to 400, especially preferably from 180 to 350, each in terms of a viscosity-average polymerization degree. When the polymerization degree does not exceed the above-described upper limit, the film can be prepared readily by casting because the viscosity of a dope solution of cellulose acylate does not become unduly high. The polymerization degree exceeding the lower limit is preferred because it does not cause conveniences such as reduction in the strength of the resulting film. The average polymerization degree can be measured by the intrinsic viscosity method of Uda, et al. (Kazuo Uda & Hideo Saito, *Journal of the Society of Fiber Science and Technology*, Japan, 18(1), 105-120 (1962)). This method is also described in detail in JP-A-9-95538.

The molecular mass distribution of the cellulose acylate to be preferably used in the invention is evaluated by gel permeation chromatography. The cellulose acylate having a small polydispersity index Mw/Mn (Mw: mass average molecular mass, Mn: number average molecular mass) and therefore having a narrow molecular mass distribution is preferred. More specifically, the Mw/Mn is preferably from 1.0 to 4.0, more preferably from 2.0 to 4.0, most preferably from 2.3 to 3.4.

Moreover, it is effective to remove low-molecular-mass components from the cellulose acylate because in spite of an increase in the average molecular mass (polymerization degree), the viscosity becomes lower than that of the ordinary cellulose acylate. The cellulose acylate having a small content of low-molecular-mass components can be prepared by removing the low-molecular-mass components from the cellulose acylate which has been synthesized in a conventional manner. The low-molecular-mass components can be removed by washing the cellulose acylate with a proper organic solvent.

When the cellulose acylate having a small content of low-molecular-mass components is prepared, the amount of a sulfuric acid catalyst in the acetification reaction is preferably adjusted to from 0.5 to 25 parts by mass based on 100 parts by mass of the cellulose. The adjustment of the amount of the sulfuric acid catalyst to fall within the above-described range also makes it possible to synthesize a desirable cellulose acylate (having a uniform molecular mass distribution) from the viewpoint of molecular mass distribution.

The water content of the cellulose acylate used for the preparation of the cellulose acylate film of the invention is preferably 2 mass % or less, more preferably 1 mass % or less, especially preferably 0.7 mass % or less. Cellulose acylates usually contain water and they are known to have a water content of about from 2.5 to 5 mass %. For adjusting the water content of the cellulose acylate to fall within a preferred range, drying is necessary. No particular limitation is imposed on the drying method insofar as the desired water content can be attained. A detailed description on the raw material cotton and synthesis method of the cellulose acylate can be found pages 7 to 12 of *Journal of Technical Disclosure Semimonthly* (No. 2001-1745, published by Japan Institute of Invention & Innovation on Mar. 15, 2001).

As the cellulose acylate in the invention, either a single cellulose acylate or a mixture of two or more different cellulose acylates may be used insofar as the substituent, substitution degree, polymerization degree and molecular mass distribution fall within the above-described ranges.

[Additive to Cellulose Acylate]

As well as the above-described retardation regulator and near infrared absorber, various additives (for example, ultraviolet absorber, plasticizer, deterioration preventive, fine particles and the like) can be added to a solution of the cellulose acylate to be used in the invention in each preparation step, depending on the using purpose. These additives will be described below specifically. They may be added in any stage of dope preparation. They may be added in the final stage of the dope preparation.

[Fine Particles of Matting Agent]

The cellulose acylate film of the invention preferably contains fine particles as a matting agent. Examples of the fine particles to be used in the invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate, and calcium phosphate. Of these fine particles, silicon-containing ones are preferred because they lower turbidity, of which silicon dioxide is especially preferred. The fine particles of silicon dioxide preferably have an average primary particle size of 20 nm or less and an apparent specific gravity of 70 g/L or greater. Those having an average primary particle size as small as from 5 to 16 nm are more preferred because they can reduce the haze of the resulting film. The apparent specific gravity is preferably from 90 to 200 g/L, more preferably from 100 to 200 g/L. A greater apparent specific gravity is preferred because it enables preparation of a highly concentrated dispersion and reduction of the haze and agglomerates.

These fine particles usually form secondary particles having an average particle of from 0.1 to 3.0 µm. They are present in the film as agglomerates and form irregularities of from 0.1 to 3.0 µm on the film surface. The average secondary particle size is preferably 0.2 µm or greater but not greater than 1.5 µm, more preferably 0.4 µm or greater but not greater than 1.2 µm, most preferably 0.6 µm or greater but not greater than 1.1 µm. With respect to the primary or secondary particle size, particles in the film were observed by a scanning electron microscope, and a circumscribed circle diameter of the particle was defined as the particle size. Furthermore, 200 particles present at respectively different positions are observed and an average of their diameters is defined as the average particle size.

As the fine particles of silicon dioxide, for example, commercially available products such as "Aerosil R972", "Aerosil R972V", "Aerosil R974", "Aerosil R812", "Aerosil 200", "Aerosil 200V", "Aerosil 300", "Aerosil R202", "Aerosil OX50", and "Aerosil TT600" (each, trade name; product of Nippon Aerosil Co., Ltd.) can be used. As the fine particles of zirconium oxide, for example, commercially available products such as "Aerosil R976" and "Aerosil R811" (each, trade name; product of Nippon Aerosil Co., Ltd.) can be used.

Of these, "Aerosil 200V" and "Aerosil R972V" are especially preferred because they are fine particles of silicon dioxide having an average primary particle size not greater than 20 nm and an apparent specific gravity of 70 g/L or greater and being highly effective for reducing a friction coefficient while keeping the turbidity of the optical film low.

There are several methods for preparing a dispersion of fine particles in order to obtain a cellulose acylate film containing particles having a small average secondary particle size. One of them is to prepare, in advance, a dispersion of fine particles in which a solvent and the fine particles have been mixed by stirring, adding the resulting fine-particle dispersion to a small amount of a cellulose acylate solution prepared separately, stirring them, and then mixing the resulting solution with a main dope solution of the cellulose acylate. This method is preferred because good dispersibility of the fine particles of silicon dioxide prevent re-agglomeration of them. Another method is to add a small amount of a cellulose ester to a solvent, dissolving the former in the latter by stirring, adding fine particles to the resulting solution, dispersing the resulting mixture in a dispersing machine to prepare a fine-particle-added dispersion, and then mixing the resulting fine-particle-added dispersion with a dope solution sufficiently in an in-line mixer. The invention is not limited to these methods. The concentration of silicon dioxide is preferably from 5 to 30 mass %, more preferably from 10 to 25 mass %, most preferably from 15 to 20 mass %. The higher the concentration of the dispersion is, the lower the liquid turbidity becomes relative to the addition amount, which results in improvement in haze and agglomerates. The amount of the matting agent added to a final dope solution of the cellulose acylate is preferably from 0.01 to 1.0 g, more preferably from 0.03 to 0.3 g, most preferably from 0.08 to 0.16 g, each per $m^2$.

Preferred examples of lower alcohols usable as the solvent for preparing the fine particle dispersion include methyl alcohol, ethyl alcohol, propyl alcohol, isopropyl alcohol and butyl alcohol. Although no particular limitation is imposed on the solvents other than the lower alcohols, solvents used for the film formation of a cellulose ester are preferred.

[Ultraviolet Absorber]

In the invention, the cellulose acylate may contain a ultraviolet absorber having an absorption in the ultraviolet region of from 200 nm to 400 nm. The range of the absorption band of the ultraviolet absorber to be used in the invention is preferably from 200 to 400 nm, more preferably from 220 to 395 nm, still more preferably from 240 to 390 nm. Moreover, it has at least one absorption maximum preferably within a wavelength range of 250 nm or greater but not greater than 360 nm, more preferably within a wavelength range of from 300 nm to 360 nm.

Specific structures of the ultraviolet absorber preferably employed in the invention include benzotriazole compounds, triazine compounds, benzophenone compounds, cyano-containing compounds, sulfo-containing compounds, oxybenzophenone compounds, salicylic ester compounds, and nickel complex salt compounds. The invention is not limited only to these compounds.

The ultraviolet absorber preferably employed in the invention has preferably a molecular mass of from 250 to 1000, more preferably from 260 to 800, still more preferably form 270 to 800, especially preferably from 300 to 800, from the viewpoint of volatility. When the molecular mass falls within the above-described range, the ultraviolet absorber may have a specific monomer structure or an oligomer or polymer structure having a plurality of the monomer units bound each other.

The ultraviolet absorber used in the present invention is preferably a compound represented by the following formula (8).

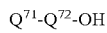
$$Q^{71}\text{-}Q^{72}\text{-}OH \qquad \text{Formula (8):}$$

In the formula, $Q^{71}$ is a triazine ring and $Q^{72}$ is an aromatic ring.

A triazine ring represented by $Q^{71}$ may be further substituted and a substituent T which will be mentioned later is applicable as the substituent. When there are plural substituents, each of them may fused to form another ring.

$Q^{72}$ is an aromatic ring. The aromatic ring represented by $Q^{72}$ may be an aromatic hydrocarbon ring or an aromatic hetero ring. That may be monocyclic or may form a fused ring with another ring. With regard to the aromatic hydrocarbon ring, it is preferably a $C_{6-30}$ monocyclic or bicyclic aromatic hydrocarbon ring (such as benzene ring and naphthalene ring), more preferably a $C_{6-20}$ aromatic hydrocarbon ring and, still more preferably, a $C_{6-12}$ aromatic hydrocarbon ring. Still further preferred one is a benzene ring.

With regard to the aromatic hetero ring, an aromatic hetero ring containing nitrogen atom or sulfur atom is preferred. Specific examples of the hetero ring are thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. Preferred aromatic hetero ring is pyridine, triazine or quinoline.

With regard to the aromatic ring represented by $Q^{72}$, preferred one is an aromatic hydrocarbon ring, more preferred one is naphthalene ring or benzene ring and particularly preferred one is benzene ring. $Q^{72}$ may be further substituted and the following substituent T is preferred.

Examples of the substituent T are an alkyl group (where carbon numbers are preferably 1 to 20, more preferably 1 to 12 and, particularly preferably, 1 to 8 and examples thereof are methyl group, ethyl group, isopropyl group, tert-butyl group, n-octyl group, n-decyl group, n-hexadecyl group, cyclopropyl group, cyclopentyl group and cyclohexyl group), an alkenyl group (where carbon numbers are preferably 2 to 20, more preferably 2 to 12 and, particularly preferably, 2 to 8 and examples thereof are vinyl group, allyl group, 2-butenyl group and 3-pentenyl group), an alkynyl group (where carbon numbers are preferably 2 to 20, more preferably 2 to 12 and, particularly preferably, 2 to 8 and examples thereof are propargyl group and 3-pentynyl group), an aryl group (where carbon numbers are preferably 6 to 30, more preferably 6 to 20 and, particularly preferably, 6 to 12 and examples thereof are phenyl group, biphenyl group and naphthyl group), an amino group (where carbon numbers are preferably 0 to 20, more preferably 0 to 10 and, particularly preferably, 0 to 6 and examples thereof are amino group, methylamino group, dimethylamino group, diethylamino group and dibenzylamino group), an alkoxy group (where carbon numbers are preferably 1 to 20, more preferably 1 to 12 and, particularly preferably, 1 to 8 and examples thereof are methoxy group, ethoxy group and butoxy group), an aryloxy group (where carbon numbers are preferably 6 to 20, more preferably 6 to 16 and, particularly preferably, 6 to 12 and examples thereof are phenyloxy group and 2-naphthyloxy group), an acyl group (where carbon numbers are preferably 1 to 20, more preferably 1 to 16 and, particularly preferably, 1 to 12 and examples thereof are acetyl group, benzoyl group, formyl group and pivaloyl group), an alkoxycarbonyl group (where carbon numbers are preferably 2 to 20, more preferably 2 to 16 and, particularly preferably, 2 to 12 and examples thereof are methoxycarbonyl group and ethoxycarbonyl group), an aryloxycarbonyl group (where carbon numbers are preferably 7 to 20, more preferably 7 to 16 and, particularly preferably, 7 to 10 and examples thereof are phenyloxycarbonyl group, etc.), an acyloxy group (where carbon numbers are preferably 2 to 20, more preferably 2 to 16 and, particularly preferably, 2 to 10 and examples thereof are acetoxy group and benzoyloxy group), an acylamino group (where carbon numbers are preferably 2 to 20, more preferably 2 to 16 and, particularly preferably, 2 to 10 and examples thereof are acetylamino group and benzoylamino group), an alkoxycarbonyl group (where carbon numbers are preferably 2 to 20, more preferably 2 to 16 and, particularly preferably, 2 to 12 and examples thereof are methoxycarbonylamino group, etc.), an aryloxycarbonylamino group (where carbon numbers are preferably 7 to 20, more preferably 7 to 16 and, particularly preferably, 7 to 12 and examples thereof are phenyloxycarbonylamino group, etc.), a sulfonylamino group (where carbon numbers are preferably 1 to 20, more preferably 1 to 16 and, particularly preferably, 1 to 12 and examples thereof are methanesulfonylamino group and benzenesulfonylamino group), a sulfamoyl group (where carbon numbers are preferably 0 to 20, more preferably 0 to 16 and, particularly preferably, 0 to 12 and examples thereof are sulfamoyl group, methylsulfamoyl group, dimethylsulfamoyl group and phenylsulfamoyl group), a carbamoyl group (where carbon numbers are preferably 1 to 20, more preferably 1 to 16 and, particularly preferably, 1 to 12 and examples thereof are carbamoyl group, methylcarbamoyl group, diethylcarbamoyl group and phenylcarbamoyl group), an alkylthio group (where carbon numbers are preferably 1 to 20, more preferably 1 to 16 and, particularly preferably, 1 to 12 and examples thereof are methylthio group and ethylthio group), an arylthio group (where carbon numbers are preferably 6 to 20, more preferably 6 to 16 and, particularly preferably, 6 to 12 and examples thereof are phenylthio group, etc.), a sulfonyl group (where carbon numbers are preferably 1 to 20, more preferably 1 to 16 and, particularly preferably, 1 to 12 and examples thereof are mesyl group and tosyl group), a sulfinyl group (where carbon numbers are preferably 1 to 20, more preferably 1 to 16 and, particularly preferably, 1 to 12 and examples thereof are methanesulfinyl group and benzenesulfinyl group), a ureido group (where carbon numbers are preferably 1 to 20, more preferably 1 to 16 and, particularly preferably, 1 to 12 and examples thereof are ureido group, methylureido group and phenylureido group), a phosphoric acid amide group (where carbon numbers are preferably 1 to 20, more preferably 1 to 16 and, particularly preferably, 1 to 12 and examples thereof are diethylphosphoric acid amide and phenylphosphoric acid amide),
hydroxyl group, mercapto group, halogen atom (such as fluorine atom, chlorine atom, bromine atom and iodine atom), cyano group, sulfo group, carboxyl group, nitro group, hydroxamic acid group, sulfino group, hydrazine group, imino group, heterocyclic group (where carbon numbers are preferably 1 to 30 and more preferably 1 to 20 in which examples of the hetero atom are nitrogen atom, oxygen atom and sulfur atom and specific examples are imidazolyl group, pyridyl group, quinolyl group, furyl group, piperidyl group, morpholino group, benzoxazolyl group, benzimidazolyl group and benzthiazolyl group) and a silyl group (where carbon numbers are preferably 3 to 40, more preferably 3 to 30 and, particularly preferably, 3 to 24 and examples thereof are trimethylsilyl group and triphenylsilyl group).

The substituent as such may be further substituted. When there are two or more substituents, they may be same or different. If it is possible, they may be connected each other to form a ring.

Specific examples of the compound represented by the formula (8) will be listed as follows although the present invention is not limited by those specific examples at all.

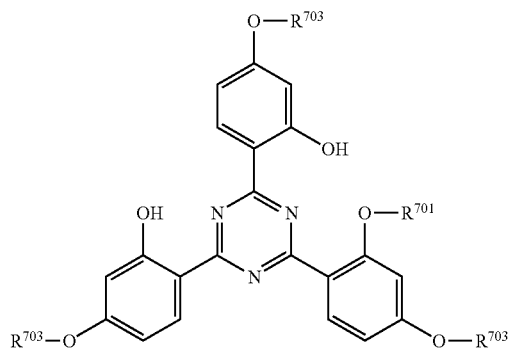

TABLE 1

| Compound No. | $R^{703}$ | $R^{701}$ |
|---|---|---|
| UV-1 | —CH$_2$CH(OH)CH$_2$OC$_4$H$_9$(-n) | —CH$_3$ |
| UV-2 | —CH$_2$CH(OH)CH$_2$OC$_4$H$_9$(-n) | —C$_2$H$_5$ |
| UV-3 | $R^{703}$=$R^{701}$: —CH$_2$CH(OH)CH$_2$OC$_4$H$_9$(-n) | |
| UV-4 | —CH(CH$_3$)—CO—O—C$_2$H$_5$ | —C$_2$H$_5$ |
| UV-5 | $R^{703}$=$R^{701}$: —CH(CH$_3$)—CO—C$_2$H$_5$ | |
| UV-6 | —C$_2$H$_5$ | —C$_2$H$_5$ |
| UV-7 | —CH$_2$CH(OH)CH$_2$OC$_4$H$_9$(-n) | —CH(CH$_3$)$_2$ |
| UV-8 | —CH$_2$CH(OH)CH$_2$OC$_4$H$_9$(-n) | —CH(CH$_3$)—C$_2$H$_5$ |
| UV-9 | $R^{703}$=$R^{701}$: —CH$_2$CH(C$_2$H$_5$)—C$_4$H$_9$(-n) | |
| UV-10 | —C$_8$H$_{17}$(-n) | —C$_8$H$_{17}$(-n) |
| UV-11 | —C$_3$H$_7$(-n) | —C$_3$H$_7$(-n) |
| UV-12 | —C$_3$H$_7$(-i) | —C$_2$H$_5$ |
| UV-13 | —C$_4$H$_9$(-n) | —CH$_3$ |

TABLE 1-continued

| Compound No. | $R^{703}$ | $R^{701}$ |
|---|---|---|
| UV-14 | —C$_4$H$_9$(-n) | —C$_2$H$_5$ |
| UV-15 | —C$_4$H$_9$(-n) | —C$_4$H$_9$(-n) |
| UV-16 | —CH$_2$CH(CH$_3$)$_2$ | —CH$_2$CH(CH$_3$)$_2$ |
| UV-17 | —C$_6$H$_{13}$(-n) | —C$_2$H$_5$ |
| UV-18 | —C$_8$H$_{17}$(-n) | —CH$_3$ |
| UV-19 | —CH$_2$CH$_2$CH(CH$_3$)$_2$ | —CH$_2$CH$_2$CH(CH$_3$)$_2$ |
| UV-20 | —C$_5$H$_{11}$(-n) | —C$_5$H$_{11}$(-n) |
| UV-21 | —CH$_2$—CO—O—C$_2$H$_5$ | —CH$_2$—CO—O—C$_2$H$_5$ |

The ultraviolet absorber preferably does not volatilize during casting or drying of a dope for the preparation of the cellulose acylate film.

(Amount of Ultraviolet Absorber)

The ultraviolet absorber to be preferably employed in the invention is added preferably in an amount of from 0.01 to 30 mass %, more preferably from 0.1 to 20 mass %, especially preferably from 0.2 to 10 mass %, each based on the amount of the cellulose acylate.

(Addition Method of Ultraviolet Absorber)

These ultraviolet absorbers may be used either singly or in combination of two or more as a mixture mixed at a desired ratio. The ultraviolet absorber may be added at any stage during the dope preparation and it may be added even at the final stage of the dope preparation.

[Plasticizer, Deterioration Preventive, Release Agent]

In addition to the above-described retardation regulator, near infrared absorber and ultraviolet absorber, various additives (such as plasticizer, deterioration preventive, release agent and infrared absorber) can be added to the cellulose acylate film of the invention in each preparation step depending on the using purpose of the film. They may be a solid or an oil.

Use of these additives is not limited by their melting point or boiling point. For example, ultraviolet absorbers having 20° C. or less and 20° C. or greater may be mixed each other or similarly, such plastiziers may be mixed each other, as described in JP-A-2001-15190. As the infrared absorber, those described, for example, in JP-A-2001-194522 can be used. Amounts of these materials are not particularly limited insofar as they can exhibit their function sufficiently. When a multilayer cellulose acylate film is prepared, the kinds or amounts of the additives may be different in each layer, which is described, for example, in JP-A-2001-151902 and such a technology is conventionally known. Materials described specifically on pages 16 to 22 of *Journal of Technical Disclosure Semimonthly* (No. 2001-1745, published by Japan Institute of Invention & Innovation on Mar. 15, 2001) can be preferably employed.

Although there is no particular limitation for a plasticizer which is able to be used in the film of the present invention, it is preferred to use a phosphate type such as triphenyl phosphate, tricresyl phosphate, cresyl diphenyl phosphate, octyl diphenyl phosphate, diphenyl biphenyl phosphate, trioctyl phosphate and tributyl phosphate; a phthalate type such as diethyl phthalate, dimethoxybutyl phthalate, dimethyl phthalate, dioctyl phthalate, dibutyl phthalate and di-2-ethylhexyl phthalate; a glycolate type such as triacetin, tributyrin, butyl phthalyl glycolate, ethyl phthalyl glycolate, methyl phthalyl ethyl glycolate and butyl phthalyl butyl glycolate; or polyhydric alcohol ester mentioned in Japanese Patent Laid-Open No. 2003/012,823 either solely or jointly. If necessary, two or more plasticizers may be used jointly.

(Proportion of Each Compound Added)

In the cellulose acylate film of the invention, the total amount of compounds having a molecular mass of 3000 or less is preferably from 5 to 45 mass %, more preferably from 10 to 40 mass %, still more preferably from 15 to 30 mass %, each based on the mass of the cellulose acylate. Such compounds include, as described above, retardation regulator, infrared absorber, ultraviolet absorber, ultraviolet preventive, plasticizer, deterioration preventive, fine particles and release agent. Their molecular mass is preferably 3000 or less, more preferably 2000 or less, still more preferably 1000 or less. The total amount of these compounds exceeding the lower limit prevents the excessive appearance of the properties of a single substance of the cellulose acylate so that problems such as easy alteration in optical performance or physical strength attributable to a temperature or humidity change do not occur. When the total amount of such compounds is not greater than the upper limit, turbidity of the cellulose acylate film (bleeding from the film) which will otherwise occur owing to the precipitation of the compounds present in the film in an amount exceeding the compatibility level does not occur. Therefore, these compounds are preferably used in a total amount within the above-described range. They may be added at any stage of the dope preparation. It is also possible to have an addition step of additives further as a final step of dope preparation.

In the invention, an average log P of all the low-molecular-mass compounds having the molecular mass of 3000 or less such as retardation regulator and near infrared absorber to be added to the cellulose acylate is preferably 2 or greater but not greater than 7, more preferably 2.5 or greater but not greater than 6, most preferably 3 or greater but not greater than 5. Average log P which is not unduly small does not cause a problem in the retention of the low-molecular-mass compounds, while average log P which is not unduly large does not lead to insufficient adjustment of chromatic dispersion.

The average log P can be defined by the following equation (6).

$$\text{average log } P = \Sigma(m_i \times \log P_i) \quad \text{Equation (6):}$$

wherein, $m_i$ is a mass fraction of the i-th low-molecular-mass compound relative to the total amount of low-molecular mass compounds, and log $P_i$ represents log P of the i-th lower-molecular-mass compound.

As the log P in the invention, not only the value of a water/butanol partition ratio obtained by actual measurement, a calculated value based on the retention time of liquid chromatograph, or a calculated value based on a commercially available calculation program.

[Organic Solvent for Cellulose Acylate Solution]

In the invention, the cellulose acylate film is preferably prepared by the solvent casting method. In the solvent casting method, the film is prepared using a solution (dope) having an cellulose acylate dissolved in an organic solvent. The organic solvent preferably employed in the invention as a main solvent is preferably selected from esters, ketones and ethers each having from 3 to 12 carbon atoms and halogenated hydrocarbons having from 1 to 7 carbon atoms. The esters, ketones and ethers may each have a cyclic structure. Compounds containing any two or more of functional groups of the ester, ketone and ether (that is, —O—, —CO—, and —COO—) can also be used as the main solvent. The organic solvent may contain another functional group such as an alcoholic hydroxyl group. When the main organic solvent contains two or more functional groups, the number of carbon atoms may fall within a prescribed range of the number of carbon atoms of a compound having any one of the functional groups.

For the cellulose acylate film of the invention, a chlorine type halogenated hydrocarbon may be used as a main solvent or a non-chlorine type solvent may be used as a main solvent as described in *Journal of Technical Disclosure Semimonthly* No. 2001-1745 (pages 12 to 16). Thus, no particular limitation is imposed on it. In the invention, it is also possible to use, in addition to the main solvent, a poor solvent for the cellulose acylate. The poor solvent may be used in an amount of from 5 to 50 mass %, more preferably from 5 to 30 mass %, relative to the main solvent. Examples of the poor solvent include methanol, ethanol and butanol.

Other solvents for the cellulose acylate solution and film and also a dissolving method in them are disclosed in the below-described patent documents and they constitute preferred embodiments, for example, JP-A-2000-95876, JP-A-12-95877, JP-A-10-324774, JP-A-8-152514, JP-A-10-330538, JP-A-9-95538, JP-A-9-95557, JP-A-10-235664, JP-A-12-63534, JP-A-JP-A-11-21379, JP-A-10-182853, JP-A-10-278056, JP-A-10-279702, JP-A-10-323853, JP-A-JP-A-10-237186, JP-A-11-60807, JP-A-11-152342, JP-A-11-292988, and JP-A-11-60752. These patent documents describe not only a solvent preferable for the cellulose acylate of the invention but also physical properties of a solution thereof and substances which can be caused to exist together, and constitute preferred embodiments also in the invention.

[Preparation Process of Cellulose Acylate Film]

[Dissolving Step]

In the invention, no particular limitation is imposed on the dissolving method in the preparation of a solution (dope) of the cellulose acylate. Any one of dissolving at room temperature, dissolving under cooling or dissolving at high temperature may be employed. These processes may also be used in combination. For the preparation of the cellulose acylate solution of the invention including concentrating and filtration steps of the solution associated with the dissolving step, a preparation process as described in detail on pages 22 to 25 of *Journal of Technical Disclosure Semimonthly* (No. 2001-1745, published by Japan Institute of Invention & Innovation on Mar. 15, 2001) is preferably employed.

(Transparency of Dope Solution)

The dope solution of the cellulose acylate of the invention has preferably a transparency of 85% or greater, more preferably 88% or greater, still more preferably 90% or greater. In the invention, sufficient dissolution of various additives in the dope solution of the cellulose acylate must be confirmed. Described specifically, the transparency of the dope was determined by injecting the dope solution in a glass cell of 1 cm square, measuring an absorbance at 550 nm by a spectrophotometer "UV-3150" (trade name; product of Shimadzu Ltd.) and calculating a ratio of the absorbance of the dope to the absorbance of a blank, which had been measured in advance by using only the solvent as the blank.

[Casting, Drying and Taking-up Steps]

A film forming process using the cellulose acylate solution (dope) in the invention will next be described. For the process and equipment utilized for the formation of the cellulose acylate film of the invention, a solution casting film-forming process and a solution casting film-forming apparatus used for the formation of a conventional cellulose triacetate film are preferably employed. A dope (cellulose acylate solution) prepared in a dissolver (pot) is stored in a storage pot for removing bubbles contained in the dope. The dope which has finished the final adjustment is then supplied from a dope exit, for example, through a pressurized constant-rate gear pump capable of feeding a constant amount of the dope at high precision to a pressurized die, while controlling the rotating speed. The dope is then uniformly cast through a nozzle (slit) of the pressurized die onto a metal support running endlessly in a casting area. At a peeling point after an approximate turn of the metal support, not-fully dried dope film (which will be also called "web") is released from the metal support. The web thus obtained is transported and dried in a tenter while maintaining its width by pinching it on both ends with clips. The film thus obtained is mechanically conveyed by rolls of a drying apparatus and, after completion of drying, taken up into a roll of a predetermined length by a take-up unit. A combination of the tenter and the rolls of the drying apparatus varies, depending on the using purpose. In a solution casting film-forming process to be employed for a functional protective film which is an optical member of an electronic display or for a silver halide photographic material, which are principal applications of the cellulose acylate film of the invention, the solution casting film-forming apparatus is often used together with a coater for the purpose of surface treatments such as formation of undercoat layer, antistatic layer, antihalation layer or protective layer. A detailed description on them can be found on pages 25 to 30 of *Journal of Technical Disclosure Semimonthly* (No. 2001-1745, published by Japan Institute of Invention & Innovation on Mar. 15, 2001), classified as casting (including co-casting), metal support, drying, release or the like and it is advantageously employed in the invention.

The residual solvent content in any stage during the casting film-forming step of the cellulose acylate film of the invention can be defined by the below-described expression (7):

$$(W_t - W_o) \times 100 / W_c$$

wherein, $W_t$: mass of the actually measured dope film, and $W_o$: mass of the film when it is dried further, after completion of drying, at 110° C. for three hours.

The residual solvent content preferably falls within a range of from 5 to 90 mass % at the stage of releasing the film and the content of the poor solvent in the residual solvent preferably falls within a range of from 10 to 95 mass %.

[Stretching]

The cellulose acylate film of the invention may be stretched. Either uniaxial stretching or biaxial stretching may be employed. Biaxial stretching includes simultaneous biaxial stretching or sequential biaxial stretching, but the sequential biaxial stretching is preferred from the standpoint of continuous preparation. After the dope is cast, the film is released from a band or drum, stretched in an axial direction and then stretched in a longer direction. It may be stretched in a width direction after stretched in a longer direction.

A method of stretching in the width direction is described, for example, in JP-A-62-115035, JP-A-4-152125, JP-A-4-284211, JP-A-4-298310, and JP-A-11-48271. The stretching of the film is carried out at the normal temperature or under heating conditions. The heating temperature is preferably not greater than the glass transition point of the film. The film can be stretched during drying and this is particularly effective when a solvent remains.

In stretching in the longer direction, the film can be stretched, for example, by adjusting the rate of conveyance rollers of the film to make a take-up rate of the film faster than a release rate. In stretching in the width direction, the film can be stretched by conveying the film while keeping its width by a tenter and gradually widening the width of the tenter. The film can also be stretched, after drying, by using a stretching machine (preferably by uniaxial stretching using a longitudinal stretching machine).

A stretch ratio (a ratio of an increased length by stretching to the original length) of the cellulose acylate film of the invention in the machine direction (longer direction) preferably falls within a range of from 1 to 100%, more preferably from 1 to 50%, most preferably from 1 to 35%. A stretch ratio in a direction (width direction) vertical to the machine direction preferably falls within a range of from 1 to 100%, more preferably from 5 to 50%, most preferably from 10 to 40%.

[Physical Properties of Cellulose Acylate Film]

[Film Thickness]

The cellulose acylate film of the invention has preferably a thickness of from 10 to 120 μm, more preferably from 20 to 100 μm, still more preferably from 30 to 90 μm. A difference between the maximum and minimum thicknesses of a 1-m-square film cut randomly from the cellulose acylate film of the invention is preferably 10% or less, more preferably 5% or less, each relative to the average thickness.

[Optical Performance]

The measuring method of the retardation was as described above.

In the invention, as the cellulose acylate film having small optical anisotropies (Re, Rth), it has an in-plane retardation Re and retardation Rth in a thickness-direction, each at a wavelength of 630 nm, preferably satisfying the equations (1A) and (2A), respectively.

$$-50 \text{ nm} \leq Rth_{630} \leq 25 \text{ nm} \quad \text{Equation (1A):}$$

$$0 \text{ nm} \leq Re_{630} \leq 10 \text{ nm} \quad \text{Equation (1B):}$$

More preferably, the retardation Rth and Re satisfy the following equations (1A-1) and (1B-1), especially preferably the following equations (1A-2) and (1B-2), respectively.

$$-30 \text{ nm} \leq Rth_{630} \leq 15 \text{ nm} \quad \text{Equation (1A-1):}$$

$$0 \text{ nm} \leq Re_{630} \leq 5 \text{ nm} \quad \text{Equation (1B-1:)}$$

$$-10 \text{ nm} \leq Rth_{630} \leq 10 \text{ nm} \quad \text{Equation (1A-2):}$$

$$0 \text{ nm} \leq Re_{630} \leq 2 \text{ nm} \quad \text{Equation (1B-2):}$$

When the in-plane retardation Re of the cellulose acylate film of the invention at a wavelength of 630 nm is 1 or greater, it preferably satisfies the relation of the following equation (2), in cooperation with the retardation Rth in a thickness-direction.

$$0.5 \leq |Rth_{630}/Re_{630}| \leq 50 \quad \text{Equation (2):}$$

(Fluctuations of Re and Rth within a Wavelength Range of 400 nm or greater but not greater than 700 nm)

A 30 mm×40 mm sample of the cellulose acylate film was subjected to humidity conditioning at 25° C. and 60% RH for 2 hours and light having a wavelength varied from 700 to 400 nm was made incident in the normal direction of the film by using ellipsometer "M-150" (trade name; product of JASCO Corporation), whereby Re at each wavelength was determined and fluctuations of Re associated with the wavelength were measured. Fluctuations of Rth, which vary depending on the wavelength, were calculated based on the retardation values measured in three directions in total, that is, the above-described Re, a retardation value measured, with an in-plane slow axis as an axis of tilt, by making light having a wavelength varied from 700 to 400 nm incident from a direction tilted by +40° relative to the normal direction of the film, and a retardation value measured, with an in-plane slow axis as an axis of tilt, by making light having a wavelength varied from 700 to 400 nm incident from a direction tilted by −40° relative to the normal direction of the film, while inputting an estimate of an average refractive index, that is, 1.48 and film thickness.

Within a wavelength range of 400 nm or greater but not greater than 700 nm, the fluctuations of Rh and Re fall preferably within a range of 50 nm or less and within a range of 10 nm or less; more preferably within a range of 30 nm or less and within a range of 5 nm or less; especially preferably within a range of 20 nm or less and within a range of 3 nm or less, respectively.

(Change in Optical Performance after High-humidity Treatment)

With regard to a change in the optical performance of the cellulose acylate film of the invention due to an environmental change, fluctuations of Re and Rth of the film at 630 nm after treatment at 60° C. and 90% RH for 240 hours preferably fall within a range of 15 nm or less, more preferably 12 nm or less, still more preferably 10 nm or less.

(Change in Optical Performance after High-temperature Treatment)

Fluctuations of Re and Rth of the film at 630 nm after treatment at 80° C. for 240 hours preferably fall within a range of 15 nm or less, more preferably 12 nm or less, still more preferably 10 nm or less.

(Humidity Dependency of Re and Rth of Film)

Fluctuations of the retardation Rth in a thickness-direction of the cellulose acylate film of the invention due to humidity are preferably small. More specifically, a difference ΔRth between the Rth at 25° C. and 10% RH and the Rth at 25° C. and 80% RH, which is given by the below-described equation (8), is preferably from 0 to 50 nm, more preferably from 0 to 40 nm, still more preferably from 0 to 35 nm.

$$\Delta Rth = Rth_{10\%RH} - Rth_{80\%RH} \quad \text{Equation (8)}$$

(Change in In-plane Retardation Before and After Stretching)

A 100×100 mm sample of the cellulose acylate film was prepared and stretched by a fixed uniaxial stretching machine in a machine direction (MD direction) or a direction (TD direction) vertical to the machine direction under the temperature condition of 140° C. The in-plane retardation values (Re) of each sample before and after stretching were measured using an automatic birefringence meter "KOBRA-21ADH" (trade name; product of Oji Scientific Instruments). The slow axis was determined from an orientation angle available during the measurement of the retardation.

Variations of the Re caused by stretching are preferably as small as possible. More specifically, supposing that $Re_{(n)}$ is an in-plane retardation (nm) of an n-(%) stretched film at 630 nm and $Re_{(o)}$ is an in-plane retardation (nm) of an unstretched film at 630 nm, they preferably satisfy the relation of the below-described equation (4), more preferably satisfy the relation of the below-described equation (4-1).

$$|Re_{(n)} - Re_{(o)}|/n \leq 1.0 \quad \text{Equation (4)}$$

$$|Re_{(n)} - Re_{(o)}|/n \leq 0.3 \quad \text{Equation (4-1)}$$

(In-plane Variations of Retardation of Cellulose Acylate Film)

The Re and Rth at 630 nm of the cellulose acylate film of the invention preferably satisfy the relations of the below-described equations (3A) and (3B), more preferably satisfy the relations of the below-described equations (3A-1) and (3A-2), respectively.

$$|Re_{630}(\max) - Re_{630}(\min)| \leq 5 \quad \text{Equation (3A)}$$

$$|Rth_{630}(\max) - Rth_{630}(\min)| \leq 10 \quad \text{Equation (3B)}$$

$$|Re_{630}(\max) - Re_{630}(\min)| \leq 3 \quad \text{Equation (3A-1)}$$

$$|Rth_{630}(\max) - Rth_{630}(\min)| \leq 5 \quad \text{Equation (3B-1)}$$

{wherein, $Re_{630}(\max)$ and $Rth_{630}(\max)$ are each the maximum retardation value at a wavelength of 630 nm, while $Re_{630}(\min)$ and $Rth_{630}(\min)$ are each the minimum retardation value at a wavelength of 630 nm, each of a 1-m-square film randomly cut out from the cellulose acylate film.

(Photoelasticity Coefficient)

The photoelasticity coefficient of the cellulose acylate film of the invention is preferably $50 \times 10^{-13}$ cm²/dyne or less, more preferably $30 \times 10^{-13}$ cm²/dyne or less, more preferably $20 \times 10^{-13}$ cm²/dyne or less. Retardations when tensile stresses were applied onto a 12 mm×12 mm sample of the cellulose acylate film in a long-axis direction were measured using an ellipsometer "M150" (trade name; product of JASCO) and a photoelasticity coefficient was calculated from the changes in the retardation depending on the stresses.

(Haze of Film)

The haze of the cellulose acylate film of the invention is preferably from 0.01 to 2.0%, more preferably from 0.05 to 1.5%, still more preferably from 0.1 to 1.0%. The transparency is an important factor of an optical film. The measurement of the haze was carried out using a 40 mm×80 mm sample of the cellulose acylate film of the invention under the conditions at 25° C. and 60% RH by using a haze meter "HGM-2DP" (trade name; product of Suga Test Instruments Co., Ltd.) according to JIS K-6714.

(Spectral Properties, Spectral Transmittance)

The transmittance of a 13 mm×40 mm sample of the cellulose acylate film at a wavelength of from 300 to 450 nm was measured using a spectrophotometer "U-3210" (trade name; product of Hitachi, Ltd.) under the conditions of 25° C. and 60% RH. The transition interval was set at from 72% wavelength to 5% wavelength. The transmittance limit wavelength was expressed by (transition interval/2)+5%, while an absorption edge is expressed by a wavelength at a transmittance of 0.4%. Based on them, the transmittance each at 380 nm and 350 nm was evaluated.

The cellulose acylate film of the invention has preferably a spectral transmittance, at 380 nm, of 45% or greater but not greater than 95% and at the same time, has a spectral transmittance at 350 nm of 10% or less.

(Physical Properties)

(Glass Transition Point Tg of Film)

The cellulose acylate film of the invention has preferably a glass transition point (Tg) of from 80 to 165° C. From the standpoint of heat resistance, Tg is more preferably from 100 to 165° C., especially preferably from 110 to 150° C. The glass transition point Tg was determined by calculation based on the calorie of 10 mg of a sample of the cellulose acylate film of the invention measured at a heating/cooling rate of 5° C./min from the normal temperature to 200° C. by using a differential scanning calorimeter "DSC2910" (trade name; product of T.A. Instruments).

(Equilibrium Water Content)

When the cellulose acylate film of the invention is used as a protective film of a polarizing plate, the equilibrium water content of the film at 25° C. and 80% RH is preferably from 0 to 4% irrespective of the film thickness. At the equilibrium water content within the above-described range, adhesion between the protective film and a water soluble polymer such as polyvinyl alcohol is not damaged. The equilibrium water content is more preferably from 0 to 3.2%, still more preferably from 0.1 to 3.2%, especially preferably from 1 to 3%. The equilibrium water content not greater than 4.0% is preferred because dependency of retardation on humidity does not become unduly large when the film is used as a support for an optically-compensatory film. The equilibrium water content not greater than 3.2% is more preferred because a change of retardation due to humidity is small.

The equilibrium water content is determined by measuring the mass (g) of water of a 7 mm×35 mm sample of the cellulose acylate film of the invention by using a water content measuring device and a sample drying device "CA-03" and "VA-05" (each, trade name; product of Mitsubishi Chemical) in accordance with the Karl Fisher's method and then dividing the mass (g) of water by the mass of the sample (g).

(Water Vapor Transmission of Film)

The water vapor transmission of the cellulose acylate film is measured under the conditions of 60° C. and 95% RH in accordance with JIS Z-0208 and then converted into that of a film having a film thickness of 80 µm.

The thicker the cellulose acylate film, the smaller the water vapor transmission. The thinner, the greater. It is therefore necessary to convert the thickness of a sample, whether it is thick or thin, into 80 µm. The film thickness can be converted in accordance with the following equation (9):

Water vapor transmission in terms of 80 µm=actually measured water vapor transmission×actual film thickness (µm)/80 (µm)   Equation (9):

To the measurement of the water vapor transmission, a method as described in "measurement of water vapor transmission (gravimetric method, method using a thermometer, vapor pressure method, adsorption method)" on pages 285 to 294 of *Kobunshi no Bussei II*, (*Kobunshi Jikken Koza* 4, published by Kyoritsu Shuppan Co., Ltd.) can be applied.

Described specifically, a 70 mm Ø sample of the cellulose acylate film of the invention was subjected to humidity conditioning at 25° C. and 90% RH and at 60° C. and 95% H, each for 24 hours. A water content of the sample per unit area (g/m²) was calculated in accordance with JIS Z-0208 by using a water vapor transmission measuring apparatus "KK-709007" (trade name; product of Toyo Seiki Seisakusho". Then, the water vapor transmission was determined in accordance with the following equation (10):

water vapor transmission=mass after humidity conditioning−mass before humidity conditioning   Equation (10):

The water vapor transmission of the cellulose acylate film of the invention is preferably from 400 to 2000 g/m²·24 h, more preferably from 500 to 1600 g/m²·24 h, especially preferably from 600 to 1200 g/m²·24 h. When the water vapor transmission is 2000 g/m²·24 h or less, inconveniences such as excess of an absolute value of the humidity-dependent Re or Rth over 0.5 nm/% RH do not occur. In addition, an absolute value of the humidity-dependent Re or Rth of an optically-compensatory film, which has been formed by stacking an optical anisotropic layer on the cellulose acetate film of the invention, does not exceed 0.5 nm/% RH. Moreover, when an optical compensatory sheet or polarizing plate prepared using such a film is loaded on a liquid crystal display device, it does not cause a change in tint or lowering in viewing angle. The water vapor transmission within 2000 g/m²·24 h or less is therefore preferred. When the water vapor transmission is 400 g/m²·24 h or greater, on the other hand, the cellulose acylate film adhered onto both sides of a polarizing film to prepare a polarizing plate does not disturb drying of the adhesive and exhibits excellent adhesion. The water vapor transmission of 400 g/m²·24 h or greater is therefore preferred.

(Dimensional Stability of Film)

With regard to dimensional stability of the cellulose acylate film of the invention, a rate of dimensional change (at high humidity) when the film is allowed to stand under the conditions of 60° C. and 90% RH for 24 hours and a rate of dimensional change (at high temperature) when the film is allowed to stand under the conditions of 90° C. and 5% RH are each preferably 0.5% or less, more preferably 0.3% or less, still more preferably 0.15% or less.

More specifically, the rate of dimensional change was determined in the following manner. Two 30 mm×120 mm samples of the cellulose acylate film were prepared and they were subjected to humidity conditioning at 25° C. and 60% RH for 24 hours. By an automatic pin gauge (product of Shinto Kagaku Co., Ltd.), 6-mm Ø holes were punched at intervals of 100 mm at both ends of the film, which were designated as the original size ($L_o$) of punch distance. The punch distance ($L_1$) after treating one of the resulting samples at 60° C. and 90% RH for 24 hours and the punch distance ($L_2$) after treating the other one at 90° C. and 5% RH for 24 hours were measured, respectively. Every distance was measured down to the minimum scale of 1/1000 mm and a rate of dimensional change was determined in accordance with the following equations (11) and (12).

Dimensional change at 60° C. and 90% RH (at high humidity)={|$L_0-L_1$|/$L_0$}×100   Equation (11):

Dimensional change at 90° C. and 5% RH (at high temperature)={|$L_0-L_2$|/$L_0$}×100   Equation (12):

(Elastic Modulus of Film)

The elastic modulus of the cellulose acylate film of the invention is preferably from 200 to 500 kgf/mm², more preferably from 240 to 470 kgf/mm², still more preferably from 270 to 440 kgf/mm². Described specifically, the elastic modulus was determined by measuring a stress at 0.5% elongation at a pulling rate of 10%/min in an atmosphere of 23° C. and 70% RH by using a general-purpose tensile tester "STM T50BP" (trade name; product of Toyo Baldwin).

(Appearance of Film Surface)

An arithmetic average roughness (Ra) of the surface of the cellulose acylate film of the invention is preferably 0.1 µm or less and the maximum height (Ry) is preferably 0.5 µm or less, each in accordance with JIS B-0601-1994. It is more preferred that the arithmetic average roughness (Ra) is 0.05 µm or less and the maximum height (Ry) is 0.2 µm or less. The convex and concave shapes on the film surface can be evaluated by an atomic force microscope (AFM).

(Retention of Compounds in Film)

The cellulose acylate film of the invention is required to have retention of various compounds such as retardation regulator and near infrared absorber added to the film.

(Amount of Compounds Volatilized from Film by Heat Treatment)

Each of the compounds such as retardation regulator and near infrared absorber incorporated in the cellulose acylate film of the invention is volatilized from the film preferably in an amount of 30 mass % or less, more preferably 25 mass % or less, still more preferably 20 mass % or less, by the treatment at 80° C. for 240 hours.

The amount of each compound volatilized from the film was determined by immersing each of the film treated at 80° C. for 240 hours and an untreated film in a solvent, analyzing the solvent after immersion by high performance liquid chromatography and calculating in accordance with the following equation (13), while regarding the peak area of the compound as an amount of the compound remaining in the film.

Amount volatilized (%)={(residual amount of a compound in the untreated film)−(residual amount of the compound in the treated film)}/{(residual amount of the compound in the untreated film)}×100   Equation (13):

(Retention of Compounds after High-temperature High-humidity Treatment of Film)

Retention of compounds such as retardation regulator and near infrared absorber added to the cellulose acylate film of the invention after high-temperature high-humidity treatment of the film, more specifically, a mass change of the cellulose acylate film of the invention when it is allowed to stand for 48 hours under the conditions of 80° C. and 90% RH is preferably from 0 to 5 mass %, more preferably from 0 to 3 mass %, still more preferably from 0 to 2%.

(Evaluation Method of Retention)

A 10 cm×10 cm sample was cut out from the cellulose acylate film. The sample was weighed after allowed to stand for 24 hours in an atmosphere of 23° C. and 55% RH. Then, it was allowed to stand for 48 hours under the conditions of 80±5° C. and 90±15% RH. The sample after treatment was rubbed lightly on the surface and it was weighed after allowed to stand for one day at 23° C. and 55% RH. The retention of the compounds after high-temperature and high-humidity treatment was calculated in accordance with the following equation (14).

Retention of compounds (mass %) after high-temperature high-humidity treatment={(mass of the film before it is allowed to stand−mass of the film after it is allowed to stand/mass of the film before it is allowed to stand)×100    Equation (14):

[Mechanical Properties of Film]
(Curl)

The curl value of the cellulose acylate film of the invention in a width direction is preferably −10/m to +10/m.

When the curl value in the width direction of the cellulose acylate film of the invention falls within the above-described range when surface treatment which will be described later, rubbing treatment upon application of an optically anisotropic layer, or application or adhesion of an oriented film or optical anisotropic layer in a continuous form is carried out, problems such as breakage of the film, which will otherwise occur owing to some handling troubles of the film caused by the curl, do not occur. In addition, the film having a curl within the above-described range can avoid such a problem that dusts generated by the strong contact of the film with a conveyer roll at the edge or center of the film tend to adhere onto the film as foreign matters and point defects of an optically-compensatory film or coating streaks occur beyond the allowance. Moreover, by adjusting the curl value within the above-described range, mottling which tends to occur in the film having an optical anisotropic layer applied thereon can be reduced and invasion of air bubbles during the lamination of a polarizing film can be prevented.

The curl value can be measured in accordance with the measuring method specified by the American National Standards Institute (ANSI/ASCPH 1.29-1985).

(Tear Strength)

The tear strength of the film is measured by a method (Elmendorf tear method) based on Determination of Tear Resistance specified in JIS K-7128-2: 1998. The tear strength of the cellulose acylate film of the invention is preferably 2 g or greater, more preferably 5 to 25 g, still more preferably from 6 to 25 g within a film thickness of from 20 to 80 μm. In terms of the film thickness of 60 μm, the tear strength is preferably 8 g or greater, more preferably from 8 to 15 g. Described specifically, a 50 mm×64 mm sample piece of the cellulose acylate film is subjected to humidity conditioning for 2 hours under the conditions of 25° C. and 65% RH, followed by measurement of the tear strength by a light-mass tear strength tester.

(Residual Solvent in Film)

When the cellulose acylate film of the invention is prepared, it is preferably dried under conditions permitting the residual solvent content to fall within a range of from 0.01 to 1.5 mass % relative to the amount of the film. The residual solvent content is more preferably from 0.01 to 1.0 mass %. When the cellulose acylate film of the invention is used as a transparent support for an antireflective film or optically-compensatory film, generation of curl can be suppressed by adjusting its residual solvent content to not greater than 1.5%. The residual solvent content not greater than 1.0 mass % is more preferred. The above-described effect is brought about mainly by a decrease of free volume owing to reduction of a residual solvent content at the time of film formation by solvent casting method using the above-described dope.

[Hygroscopic Expansion Coefficient of Film]

The hygroscopic expansion coefficient of the cellulose acylate film of the invention is preferably $30\times10^{-5}$/% RH or less, more preferably $15\times10^{-5}$/% RH or less, still more preferably $10\times10^{-5}$/% RH or less. The smaller hygroscopic expansion coefficient is preferred, but it is usually $1.0\times10^{-5}$/% RH or greater. The hygroscopic expansion coefficient is an amount of change in the length of a sample when a relative humidity is changed at a predetermined temperature. When the cellulose acylate film is used as a support for an optically-compensatory film, by adjusting this hygroscopic expansion coefficient, light leakage due to a picture-frame-like increase in transmittance, that is, distortion can be prevented without deteriorating the optical compensation function of the optically-compensatory film.

(Measurement of Hygroscopic Expansion Coefficient)

A 5 mm wide and 20 mm long sample cut out from the cellulose acylate film was fixed at one end and suspended in an atmosphere of 25° C. and 20% RH. A mass of 0.5 g was hung from the other end and the sample was allowed to stand for a predetermined time. An amount of change in length was measured by increasing the humidity to 80% RH without changing the temperature. The amount of change was measured with ten samples as one group and an average of them was employed.

[Surface Treatment]

The surface treatment of the cellulose acylate film, if necessary, can improve the adhesion between the cellulose acylate film and each functional layer (for example, undercoat layer or back coat layer). The surface treatment of the cellulose acylate film includes glow discharge treatment, exposure to ultraviolet ray, corona treatment, flame treatment, acid treatment and alkali treatment.

The glow discharge treatment may be conducted with low-temperature plasma which occurs under a low-pressure gas in a range of from $10^{-3}$ to 20 Torr or may be plasma treatment under atmospheric pressure. The plasma excitation gas means a gas to be excited by plasma under the above-described conditions and examples include argon, helium, neon, krypton, xenon, nitrogen, carbon dioxide and fluorocarbon such as tetrafluoromethane and mixtures thereof. A detailed description of them can be found on pages 30 to 32 of *Journal of Technical Disclosure Semimonthly* (No. 2001-1745, published by Japan Institute of Invention & Innovation on Mar. 15, 2001), which can be applied to the invention preferably.

(Saponification Treatment)

Alkaline saponification treatment is one of effective means as a surface treatment of the cellulose acylate film when it is used as a transparent protective film of a polarizing plate.

The alkaline saponification treatment will next be described specifically.

The alkaline saponification treatment of the cellulose acylate film is preferably carried out with a cycle of dipping the film surface in an alkaline solution, neutralizing with an acidic solution, washing with water, and drying. Examples of the alkaline solution include a potassium hydroxide solution and a sodium hydroxide solution. A hydroxide ion concentration is preferably within a range of from 0.1 to 5.0 mol/L, more preferably from 0.5 to 4.0 mol/L. The temperature of the alkaline solution is preferably within a range of from room temperature to 90° C., more preferably from 40 to 70° C.

In the above-described saponification treatment, the content of the additives in the cellulose acylate film preferably satisfies the relation of the below-described equation (15), more preferably the relation of the equation (15-1).

$$0.9 < Cm_s/Cm_0 \leq 1.0 \quad \text{Equation (15):}$$

$$0.95 < Cm_s/Cm_0 \leq 1.0 \quad \text{Equation (15-1):}$$

wherein, $Cm_o$ represents the content before saponification treatment, while $Cm_s$ represents the content after saponification.

In the cellulose acylate film of the invention, the contact angle of the film surface after alkaline saponification treatment is preferably 55° or less, more preferably 50° or less, still more preferably 45° or less. The contact angle can be evaluated in a conventional manner by putting water drops having a diameter of 3 mm on the film surface subjected to alkaline saponification treatment and finding the angle formed between the film surface and the water drops. It can be used for the evaluation of hydrophilicity or hydrophobicity.

The surface energy of a solid can usually be determined by the contact angle method, heat of wetting method and adsorption method as described in *Nure no Kiso to Oyo* (published by Realize Co., Ltd., on Dec. 10, 1989). Of these, the contact angle method is suited for the cellulose acylate film of the invention. Described specifically, two solutions whose surface energy are known are dropped to the cellulose acylate film; at the intersection between the surface of the liquid droplet and the film surface, the angle which has been formed by the tangent line to the droplet and the film surface and includes the droplet is defined as the contact angle; and the surface energy of the film can be determined by computation. (Change in Re and Rth Values Before and After Saponification Treatment of the Film Surface)

In the cellulose acylate film of the invention, changes in the Re and Rth values at a wavelength of 630 nm before and after the saponification treatment of the film surface with an alkaline solution satisfy preferably the relation of the below-described equation (16), more preferably the relation of the below-described equation (16-1), still more preferably the relation of the below-described equation (16-2).

$$|Re_{630(0)} - Re_{630(s)}| \leq 10 \text{ and } |Rth_{630(0)} - Rth_{630(s)}| \leq 20 \quad \text{Equation (16):}$$

$$|Re_{630(0)} - Re_{630(s)}| \leq 8 \text{ and } |Rth_{630(0)} - Rth_{630(s)}| \leq 15 \quad \text{Equation (16-1):}$$

$$|Re_{630(0)} - Re_{630(s)}| \leq 5 \text{ and } |Rth_{630(0)} - Rth_{630(s)}| \leq 10 \quad \text{Equation (16-2):}$$

In the above equations, $Re_{630(0)}$ represents Re at a wavelength of 630 nm before saponification with an alkaline solution, $Re_{630(s)}$ represents Re at a wavelength of 630 nm after saponification with the alkaline solution, $Rth_{630(0)}$ represents Rth at a wavelength of 630 nm before saponification with the alkaline solution, and $Rth_{630(s)}$ represents Rth at a wavelength of 630 nm after saponification with the alkaline solution.

Within the above-described ranges, the cellulose acylate film of the invention has adequate optical performance as a protective film so that it is usable as a polarizing plate, optically-compensatory film or liquid crystal display device without causing light leakage.

The term "alkaline treatment" as used herein means the procedure of dipping a 10 cm×10 cm film sample in a 1.5 mol/L aqueous solution of sodium hydroxide for 2 minutes at 55° C., neutralizing with a 0.05 mol/L solution of sulfuric acid at 30° C., washing in a water washing bath at room temperature and then drying at 100° C.

[Light Resistance]

As an index of light durability of the cellulose acylate film of the invention, a change of the Rth value of the film exposed to super xenon light for 200 hours were measured. Described specifically, a single substance of the cellulose acylate film was exposed to xenon light of 220000 luxes for 200 hours by using a super xenon weather meter "SX-75" (trade name; product of Suga Test Instruments, under conditions of 60° C. and 50% RH). After a predetermined time, the film was taken out from a temperature-controlled bath and humidity conditioning was performed in the above-described manner. The Rth value was then measured.

As an index of light durability, a color difference $\Delta E^*a^*b^*$ may be employed. The color difference $\Delta E^*a^*b^*$ before and after exposure to super xenon light under similar conditions to those described above is preferably 20 or less, more preferably 18 or less, still more preferably 15 or less.

The color difference was measured using "UV3100" (trade name; product of Shimadzu Corporation) in the following manner. After the film was subjected to humidity conditioning for 2 hours or more at 25° C. and 60% RH, colorimetry of the film before exposure to xenon light was conducted to determine an initial value ($L_o^*$, $a_0^*$, $b_0^*$). A single substance of the film was then exposed to xenon light under the conditions of 60° C. and 50% RH and after a predetermined time, the film was taken out from a temperature-controlled bath. After humidity conditioning for 2 hours at 25° C. and 60% RH, colorimetry was conducted again, whereby ($L_1^*$, $a_1^*$, $b_1^*$), that is, a value a certain time after exposure was determined. Based on these values, color difference $\Delta E^*a^*b^*$ was determined in accordance with the equation (17). Light durability test may be performed by exposure to carbon arc, which is a similar acceleration test.

$$\Delta E^*a^*b^* = [(L_o^* - L_1^*)^2 + (a_0^* - a_1^*)^2 + (b_0^* - b_1^*)^2]^{1/2} \quad \text{Equation (17):}$$

<Applications of Cellulose Acylate Film>

The cellulose acylate film of the invention can be applied, for example, to optical purposes and photosensitive materials. Particularly in optical uses, it is preferably used for a liquid crystal display device. The liquid crystal cell device has a liquid crystal cell having liquid crystals supported between two electrodes, and two polarizing plates disposed on both sides of the liquid crystal cell. It is more preferred to use the cellulose acylate film of the invention for the liquid crystal device as a protective film of a polarizing plate or a film imparted with a functional layer which will be described below. Preferred examples of the liquid crystal display device include TN, IPS, FLC, AFLC, OCB, STN, ECB, VA and HAN.

[Functional Layer]

When the cellulose acylate film is used for optical purposes, various functional layers are added thereto. Examples of them include antistatic layer, hardened resin layer (transparent hard coat layer), antireflective layer, easy adhesion layer, anti-glare layer, optical compensation layer, orientation layer and liquid crystal layer.

Examples of the functional layers and materials thereof which can be used for the cellulose acylate film of the invention include surfactant, lubricant, matting agent, antistatic layer, and hard coat layer. They are described in detail on pages 32 to 45 of *Journal of Technical Disclosure Semimonthly* (No. 2001-1745, published by Japan Institute of Invention & Innovation on Mar. 15, 2001). The description in it can be used preferably.

[Application (Polarizing Plate)]

Applications of the cellulose acylate film of the invention will next be described.

The cellulose acylate film of the invention is particularly useful as a protective film of a polarizing plate. When it is used as a protective film of a polarizing plate, the preparation process of the polarizing plate is not particularly limited and can be prepared in an ordinary manner. For example, it can be prepared by subjecting the surface of the cellulose acylate film thus obtained to alkaline treatment, and laminating it to both sides of a polarizer, which has been obtained by dipping a polyvinyl alcohol film in an iodine solution and stretching the film, with an aqueous solution of completely saponified polyvinyl alcohol or the like. Easy adhesion treatment as described in JP-A-6-94915 or JP-A-6-118232 may be replaced for the alkaline treatment.

Examples of the adhesive to be used for laminating the alkaline-treated surface of the protective film with the polarizer include polyvinyl alcohol adhesives such as polyvinyl alcohol and polyvinyl butyral, and vinyl latexes such as butyl acrylate.

The polarizing plate has a polarizer and a protective film for protecting both sides thereof. In addition, the polarizing plate has a protecting film on one side thereof and a separate film adhered on the other side. The protecting film and separate film are each used for the purpose of protecting the polarizing plate when it is shipped or it is inspected. The protecting film is adhered to protect the surface of the polarizing plate and used on a side opposite to the surface of the polarizing plate to be laminated with the liquid crystal plate, while the separate film is used for covering the adhesion layer to be laminated with the a liquid crystal cell and is used on the side of the polarizing plate to be laminated with the liquid crystal plate.

The liquid crystal display device usually has, between two polarizing plates, a substrate containing liquid crystals. The protective film of the polarizing plate to which the cellulose acylate film of the invention has been applied exhibits excellent display properties wherever it is disposed. It is however particularly preferred to use the protective film of the polarizing plate for the outermost surface on the display side of the liquid display device where a transparent hard coat layer, anti-glare layer, antireflective layer and the like are disposed.

[Application (Optically-compensatory Film)]

The cellulose acylate film of the invention can be used for various purposes. It is particularly effective when used as an optically-compensatory film of a liquid crystal display device. The optically-compensatory film is an optical material used for a liquid crystal display device in order to compensate for a phase difference. It has the same meaning as a wave plate or optical compensation sheet. The optically-compensatory film has birefringence and is used for the purpose of removing the coloring from a display screen of a liquid crystal display device or improving the viewing angle characteristic.

When the cellulose acylate film of the invention is used as an optically-compensatory film of a liquid crystal display device, the Re and |Rth| of an optically anisotropic layer to be used in combination therewith are preferably from 0 to 200 nm and from 0 to 400 nm. Any optically anisotropic layer may be used insofar as they fall within the above-described ranges.

No particular limitation is imposed on the optical performance or driving system of liquid crystal cells of a liquid crystal display device for which the cellulose acylate film of the invention is used. Any optically anisotropic layer may be used in combination insofar as it has properties which the optically compensatory film is required to have. The optically anisotropic layer to be used in combination may be composed of a composition containing a liquid crystal compound or a polymer film having birefringence.

(Optically Anisotropic Layer Containing Liquid Crystal Compound)

When an optically anisotropic layer containing a liquid crystal compound is used, a discotic liquid crystal compound or rod-like liquid crystal compound is preferred as the liquid crystal compound.

(Discotic Liquid Crystal Compound)

Examples of the discotic liquid-crystal compound usable in the invention include those described in various literatures such as C. Destrade et al., *Mol. Crysr. Liq. Cryst.*, 71, 111 (1981); *Quarterly Chemistry Survey, No. 22, The Chemistry of Liquid Crystals*, Chapter 5, Chapter 10, Section 2 (1994), ed. by Japan Chem. Soc.; B. Kohne et al., Angew. *Chem. Soc. Chem. Comm.*, 1794 (1985); and J. Zhang et al., *J. Am. Chem. Soc.*, 116, 2,655 (1994).

In the optically anisotropic layer, the molecules of the discotic liquid crystal compound are preferably fixed in an aligned form, most preferably are fixed by the polymerization reaction. The polymerization of the discotic liquid-crystal compound is described in JP-A-8-27284. It is necessary to bond a polymerizable group as a substituent to the disk-shaped core of the discotic liquid crystal compound to fix it by polymerization. When the polymerizable group is directly bonded to the disk-shaped core, it becomes difficult to maintain alignment during the polymerization reaction. Accordingly, a linking group is introduced between the disk-shaped core and polymerizable group. The discotic liquid-crystal compound having a polymerizable group is disclosed in JP-A-2001-4387.

(Rod-Like Liquid Crystal Compound)

Examples of the rod-like liquid crystal compound usable in the invention include azomethines, azoxy compounds, cyanobiphenyls, cyanophenyl esters, benzoic esters, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles. Not only such low-molecular-mass liquid crystal compounds but also high-molecular-mass liquid crystal compounds can be used.

In the optically anisotropic layer, the molecules of the rod-like liquid crystal compound are preferably fixed in an aligned form, most preferably fixed by the polymerization reaction. Examples of the polymerizable rod-like liquid crystal compound usable in the invention include compounds as described, for example, in *Makromol. Chem.*, 190, 2255 (1989), *Advanced Materials*, 5, 107 (1993), U.S. Pat. Nos. 4,683,327, 5,622,648 and 5,770,107, WO95/22586, WO95/24455, WO97/00600, WO98/23580, WO98/52905, JP-A-1-272551, JP-A-6-16616, JP-A-7-110469, JP-A-11-80081 and JP-A-2001-328973.

(Optically Anisotropic Layer Composed of Polymer Film)

As described above, the optically anisotropic layer of the invention may be composed of a polymer film. The polymer film is made of a polymer capable of exhibiting optical anisotropy. Examples of such a polymer include polyolefins (such as polyethylene, polypropylene, norbornene polymers), polycarbonates, polyacrylates, polysulfones, polyvinyl alcohols, polymethacrylates, polyacrylates and cellulose esters (such as cellulose triacetate and cellulose diacetate). Copolymers or mixtures of such a polymer may also be used.

Optical anisotropy of the polymer film may be attained by stretching. Stretching is preferably uniaxial stretching or biaxial stretching. More specifically, longitudinal uniaxial stretching making use of a difference in peripheral speed between two or more rolls, tenter stretching for stretching a polymer film in a width direction while gripping both sides thereof, and biaxial stretching using these two in combination are preferred. It is also possible to use two or more polymer films to adjust the whole optical properties of them to satisfy the above-described conditions. The polymer film is preferably prepared by the solvent casting method to reduce the unevenness of birefringence. The polymer film has a thickness of preferably from 20 to 500 μm, most preferably from 40 to 100 μm.

For the formation of the optically anisotropic layer, it is also preferred to employ a process of using, as the polymer film forming the optically anisotropic layer, at least one polymer material selected from polyamide, polyimide, polyester, polyether ketone, polyamideimide, polyesterimide, and polyarylether ketone, dissolving it in a solvent, applying the resulting solution to a base material, and then drying the solvent to form a film. A method of stretching the polymer film and base material to develop optical anisotropy and using them as an optically anisotropic layer is also preferred. The cellulose acylate film of the invention can be preferably used as the above-described base material. It is also preferred to prepare the polymer film in advance on another base material and after release of the polymer film from the base material, laminate the polymer film with the cellulose acylate film of the invention, and use the laminate as an optically anisotropic layer. This method enables to thin the polymer film. Its thickness is preferably 50 μm or less, more preferably from 1 to 20 μm.

[Constitution of Ordinary Liquid Crystal Display Device]

When the cellulose acylate film is used as an optically-compensatory film, a transmission axis of a polarizer and a slow axis of the optically-compensatory film made of the cellulose acylate film may be arranged at any angle. A liquid crystal display device has a liquid cell having liquid crystals supported between electrode substrates, two polarizers disposed on both sides of the liquid crystal cell, and at least one optically-compensatory film disposed between the liquid cell and the polarizer.

The liquid crystal layer of the liquid crystal cell is usually formed by enclosing liquid crystals in a space formed by sandwiching a spacer between two substrates. A transparent electrode layer is formed on a substrate as a transparent film containing a conductive substance. The liquid crystal cell may further have a gas barrier layer, hard coat layer or undercoat layer (used for adhesion of the transparent electrode layer). These layers are usually laid over a substrate. The substrate of the liquid crystal cell has usually a thickness of from 50 μm to 2 mm.

(Kinds of Liquid Crystal Devices)

The cellulose acylate film of the invention can be used for liquid crystal cells of various modes. Examples of the display modes proposed now include TN (twisted nematic), IPS (in-plane switching), FLC (ferroelectric liquid crystal), AFLC (anti-ferroelectric liquid crystal), OCB (optically compensatory bend), STN (super twisted nematic), VA (vertically aligned), ECB (electrically controlled birefringence) and HAN (hybrid aligned nematic). A multi-domain display mode is also proposed. The cellulose acylate film of the invention is effective in a liquid crystal display device of any display mode. It is also effective for any of transmissive, reflective and semi-transmissive liquid display devices.

The cellulose acylate film of the invention may be used as a support of an optically-compensatory film or a protective film for a polarizing plate, each of a TN type liquid crystal display device having a TN liquid crystal cell. The TN liquid crystal cell and TN liquid crystal display device are known for years. A description on an optically-compensatory film to be used for the TN liquid crystal display device can be found in JP-A-3-9325, JP-A-6-148429, JP-A-8-50206, and JP-A-9-26572. In addition, it is also described in a paper of Mori, et al. (*Jpn. J. Appl. Phys.*, 36, 143 and 1068 (1997)).

(STN Liquid Crystal Display Device)

The cellulose acylate film of the invention may be used as a support of an optically-compensatory film or a protective film of a polarizing plate, each of an STN liquid crystal display device having an STN liquid crystal cell. In an STN liquid crystal display device, molecules of a rod-like liquid crystal compound in the liquid crystal cell is twisted in a range of 90 to 360°, and the product ($\Delta \cdot d$) of a refractive-index anisotropy ($\Delta n$) and cell gap (d) of the rod-like liquid crystal compound is in a range of from 300 to 1,500 nm. A description on an optically-compensatory film to be used for the STN liquid crystal display device can be found in JP-A-2000-105316.

(VA Liquid Crystal Display Device)

The cellulose acylate film of the invention may be used as a support of an optically-compensatory film or a protective film of a polarizing plate used in a VA liquid crystal display device having a VA liquid crystal cell. It is preferred that the retardation value Re and the retardation value Rth of an optically-compensatory film to be used for the VA liquid crystal display device are controlled to fall within a range of from 0 to 150 nm and a range of from 70 to 400 nm, respectively. The retardation value Re within a range of from 20 to 70 nm is more preferred. When two optically anisotropic polymer films are used in the VA liquid crystal display device, the retardation value Rth of the film is preferably within a range of from 70 to 250 nm. When one optically anisotropic polymer film is used in the VA liquid crystal display device, the retardation value Rth preferably falls within a range of from 150 to 400 nm. The VA liquid crystal display device may adopt a multi-domain system as described, for example, in JP-A-10-123576.

(IPS Liquid Crystal Display Device and ECB Liquid Crystal Display Device)

The cellulose acylate film of the invention is particularly advantageously used as a support of an optically-compensatory film or a protective film of a polarizing plate in an IPS liquid crystal display device having an IPS crystal cell or an ECB liquid crystal display device having an ECB liquid crystal cell. In the IPS or ECP mode, liquid crystal materials are aligned in substantially parallel to each other when black is displayed. Under no application of voltage, liquid crystal molecules are aligned in parallel to the substrate surface, whereby black is displayed. In such embodiments, a polarizing plate using the cellulose acylate film of the invention contributes to improvement of tint, enlargement of viewing angle and enhancement of contrast. In these embodiments, it is preferred to dispose, on at least one side of the liquid crystal cell, a polarizing plate, which uses the cellulose acylate film of the invention as a protective film (protective film on the side of the cell) disposed between the liquid crystal cell and polarizing plate, of the protective films of the two polarizing plates having the liquid crystal sandwiched therebetween. It is more preferred to place an optical anisotropic layer between the protective film of the polarizing plate and the liquid crystal cell and set the retardation value of the optical anisotropic layer at twice or less of the Δ·n of the liquid crystal layer.

(CCB Liquid Crystal Device and HAN Liquid Crystal Device)

The cellulose acylate film of the invention can be advantageously used as a support of an optically-compensatory film or a protective film of a polarizing plate for an OCB liquid crystal display device having an OCB liquid crystal cell, or for a HAN liquid crystal display device having a HAN liquid crystal cell. It is preferred that, in the optically-compensatory film used for the OCB liquid crystal display device or HAN liquid crystal display device, the direction where the absolute retardation value becomes a minimum value exists neither in the plane of the optically-compensatory film nor in its normal direction. Optical properties of the optically-compensatory film for use in the OCB liquid crystal display device or the HAN liquid crystal display device are also determined by the optical properties of the optical anisotropy layer, the optical properties of the support, and the arrangement of the optical anisotropy layer and the support. A description on the optically-compensatory film for use in the OCB liquid crystal display device or HAN liquid crystal display device can be found in JP-A-9-197397. A description on it can also be found in a paper by Mori et al. (*Jpn. J. Appl. Phys.*, 38, 2837 (1999).

(Reflective Liquid Crystal Display Device)

The cellulose acylate film of the invention may be used as an optically-compensatory film or a protective film of a polarizing plate for reflective TN, STN, HAN, or GH (Guest-host) liquid crystal display device. These display modes are well known for long years. The reflective TN liquid crystal display device is described in, for example, JP-A-10-123478, WO 98/48320, and Japanese Patent No. 3022477. An optically-compensatory film for use in the reflective liquid crystal display device is described, for example, in WO 00/65384.

(Other Liquid Crystal Display Devices)

The cellulose acylate film of the invention may be used as a support of an optically-compensatory film or a protective film for an ASM (axially symmetric aligned microcell) liquid crystal display device having an ASM liquid crystal cell. The ASM liquid crystal cell is characterized in that the thickness of the cell is maintained by a position-adjustable resin spacer. Other properties of the ASM liquid crystal cell are similar to those of the TN liquid crystal cell. A description on the ASM liquid crystal cell and ASM liquid crystal display device can be found in a paper of Kume et al. (Kume et al, *SID98 Digest* 1089, (1998)).

[Hard Coat Film, Anti-Glare Film, Antireflective Film]

The cellulose acylate film of the invention can preferably applied to a hard coat film, anti-glare film or antireflective film. In order to improve the visibility of a flat panel display such as LCD, PDP, CRT or EL, either one or any of the hard coat layer, anti-glare layer and antireflective layer can be added to one side or both sides of the cellulose acylate film of the invention. Preferred embodiments as such an anti-glare film or antireflective film are described in detail on pages 54 to 57 of *Journal of Technical Disclosure Semimonthly* (No. 2001-1745, published by Japan Institute of Invention & Innovation on Mar. 15, 2001). The cellulose acylate film of the invention can be preferably employed.

(Support of Photographic Film)

The cellulose acylate film of the invention can also be used as a support of a silver halide photosensitive material. Various raw materials, formulations and treating methods as described in the patent specification of the photosensitive materials are applicable to it. With regard to the technology of them, a detailed description on color negative can be found in JP-A-2000-105445 and the cellulose acylate film of the invention can be preferably used for it. The cellulose acylate film is also preferred as a support of a color-reversal silver halide photosensitive material. Various raw materials, formulation and treating method as described in JP-A-11-282119 are applicable to it.

[Transparent Substrate of Liquid Crystal Cell]

The cellulose acylate film of the invention exhibits virtually zero optical anisotropy and therefore has excellent transparency so that it can also be used as a substitute for the glass substrate of a liquid crystal cell of a liquid crystal display device, that is, a transparent substrate for enclosing therein liquid crystals.

The transparent substrate having liquid crystals enclosed therein must have excellent gas barrier properties so that a gas barrier layer may be disposed on the surface of the cellulose acylate film of the invention as needed. Although no particular limitation is imposed on the form or material of the gas barrier layer, it is possible to adopt a method of depositing $SiO_2$ or the like or disposing a coat layer of a polymer such as polyvinylidene chloride or polyvinyl alcohol having relatively high gas barrier properties on at least one side of the cellulose acylate film of the invention. Any one of the above-described methods can be employed as needed.

When the cellulose acylate film is used as a transparent substrate having liquid crystals enclosed therein, a transparent electrode for applying a voltage to orient liquid crystals may be provided. Although no particular limitation is imposed on the transparent electrode, it can be formed by stacking a metal film or a metal oxide film on at least one surface of the cellulose acylate film of the invention. From the viewpoints of transparency, electric conductivity and mechanical properties, the metal oxide film is preferred, with a thin film of indium oxide composed mainly of tin oxide and containing from 2 to 15 mass % of zinc oxide being especially preferred. Details of this technology are disclosed, for example, in JP-A-2001-125079 or JP-2000-227603.

EXAMPLES

The invention will next be described by Examples. It should however be borne in mind that the invention is not limited to or by them.

Example 1

Preparation of Cellulose Acylate Film 1

Preparation of Cellulose Acylate Stock Solution (Cal-1

A stock solution of cellulose acylate was prepared by charging the below-described composition in a mixing tank and dissolving these components by stirring. As the cellulose acylate, that having an acylation degree of (Ac:OH=2.86: 0.14) and average polymerization degree of 310 was employed. In the parenthesis, Ac represents an acetyl substituent, OH represents an unsubstituted hydroxyl group, and a ratio is a ratio of acylation degree.

[Composition of cellulose acylate stock solution (CAL-1)]

| | |
|---|---|
| Cellulose acylate (acylation degree Ac = 2.86) | 100.0 parts by mass |
| Methylene chloride (first solvent) | 402.0 parts by mass |
| Methanol (second solvent) | 60.0 parts by mass |

Preparation of Matting Agent Solution (ML-1)

After 20 parts by mass of silica particles {"Aerosil R972", trade name; product of Nippon Aerosil Co., Ltd.} having an average particle size of 16 nm and 80 parts by mass of methanol were mixed sufficiently for 30 minutes under stirring to prepare a dispersion of silica particles. The resulting dispersion and the below-described composition were charged together in a disperser. The mixture was stirred for 30 minutes or more to dissolve the components, whereby a matting agent solution (ML-1) was prepared.

| {Composition of matting agent solution (ML-1)} | |
|---|---|
| Dispersion of silica particles (average particle size of 16 nm) | 10.0 parts by mass |
| Methylene chloride (first solvent) | 76.3 parts by mass |
| Methanol (second solvent) | 3.4 parts by mass |
| Stock solution of cellulose acetate (CAL-1) | 10.3 parts by mass |

Preparation of Additive Solution (AD-1)

The below-described composition was charged in a mixing tank. The components were dissolved by stirring under heating, whereby an additive solution (AD-1) was prepared.

| {Composition of additive solution (AD-1)} | |
|---|---|
| Retardation regulator (Compound SA-19 described herein) | 66.3 parts by mass |
| Near infrared absorber (Compound "SDA5688" manufactured by H. W. SANDS Corp.) | 0.55 part by mass |
| Methylene chloride (first solvent) | 58.4 parts by mass |
| Methanol (second solvent) | 8.7 parts by mass |
| Stock solution of cellulose acylate (CAL-1) | 12.8 parts by mass |

Preparation of Cellulose Acylate Film Sample 1

The stock solution of cellulose acylate (CAL-1, 94.6 parts by mass), 1.3 parts by mass of the matting agent solution (ML-1) and 3.9 parts by mass of the additive solution (AD-1) were mixed after they were respectively filtered. The resulting mixture was then cast using a band casting machine. The addition amount of the additive solution (AD-1) were prepared so that the mass ratios of the retardation regulator (SA-19) and near infrared absorber (Compound SDA5688) relative to the cellulose acylate were 12 mass % and 0.2 mass %, respectively. At a residual solvent content of 30 mass %, the film was released from the band, followed by drying at 138° C. for 30 minutes, whereby a cellulose acylate film sample 1 was prepared. The residual solvent content in the cellulose acylate film 1 thus obtained was less than 0.1 mass % and the film thickness was 80 μm.

Preparation of Cellulose Acylate Film Samples 2 to 15

In a similar manner to Example 1 except that the kinds (compounds described in this specification) and amounts of the near infrared absorber and retardation regulator were changed as described in the below-described Table 2, cellulose acylate film samples 2 to 15 were prepared. Ethyl phthalyl ethyl glycolate in Table 2 is not a retardation regulator but a known plasticizer. All the he retardation regulators shown in Table 2 have an absorbance of 0.01 or less, in terms of a 1.0 g/liter solution for a 1 cm cell length, within a wavelength region of 450 nm or greater but not greater than 800 nm (measurement solution: Dichloromethane). A weight average molecular weight of polymer P-11 (described herein) used in cellulose acylate film sample No. 14 was 5,000.

TABLE 2

| Sample No. of cellulose acylate film | Retardation regulator (g/100 g of film) | Near infrared absorber Amount (g/100 g of film) | Maximum wavelength | Maximum absorbance in a visible region *2 | ΔRth *3 | ΔRe *4 | Rh (630 nm) | Re (630 nm) | \|Rth/Re\| | Tint of film | Frequency of surface troubles | Remarks |
|---|---|---|---|---|---|---|---|---|---|---|---|---|
| 1 | SA-19 (12) | SDA5688 (0.1) | 841 | 23 | 24 | 3 | −7 | 3 | 2.3 | B | A | Invention |
| 2 | None | SDA5688 (0.1) | 841 | 23 | 31 | 3 | 35 | 3 | 12 | B | C | Comp. Ex. |
| 3 | SA-19 (12) | None | — | — | 38 | 3 | 4 | 2 | 2 | AA | A | Comp. Ex. |
| 4 | Ethyl phthalyl ethyl glycolate (12) | SDA5688 (0.1) | 841 | 23 | 31 | 3 | 37 | 2 | 18.5 | B | C | Comp. Ex. |
| 5 | Ethyl phthalyl ethyl glycolate (12) | None | — | — | 41 | 4 | 40 | 2 | 20 | AA | A | Comp. Ex. |
| 6 | SA-19 (12) | IR-2 (1.0) | 888 | 8 | 25 | 3 | −2 | 3 | 0.7 | B | A | Invention |
| 7 | SB-5 (12) | IR-2 (1.0) | 888 | 8 | 26 | 4 | −3 | 3 | 1.0 | B | A | Invention |
| 8 | SC-7 (12) | IR-2 (1.0) | 888 | 8 | 26 | 3 | −2 | 3 | 0.7 | B | A | Invention |
| 9 | A-11 (12) | SDA5688 (0.1) | 841 | 23 | 28 | 4 | −8 | 3 | 2.7 | B | A | Invention |
| 10 | B-3 (12) | SDA5688 (0.1) | 841 | 23 | 28 | 3 | −7 | 2 | 3.5 | B | A | Invention |
| 11 | CA-5 (12) | SDA5688 (0.1) | 841 | 23 | 28 | 2 | −18 | 3 | 6.0 | B | A | Invention |
| 12 | SA-19 (12) | NIR-IM2 (0.2) | 1075 | 3 | 35 | 2 | 1 | 3 | 0.3 | A | A | Invention |
| 13 | SA-19 (12) | KAYASORB CY-17 *1 (0.2) | 782 | 50 or greater | Not measured because of excessive coloring of film | | | | | C | B | Comp. Ex. |
| 14 | P-11 (20) | None | — | — | 40 | 2 | 5 | 3 | 1.7 | AA | A | Comp. Ex. |
| 15 | P-11 (20) | SDA5688 (0.1) | 841 | 23 | 26 | 2 | −6 | 3 | 2.0 | B | A | Invention |

*1 KAYASORB CY-17: Example compound in JP-A-2004-325523
*2 Maximum absorbance in visible region: maximum absorbance within a wavelength of 400 to 650 (in terms of 1 g/l in dichloromethane)
*3 ΔRth: fluctuations of Rth within a wavelength range of 400 to 700 nm
*4 ΔRe: fluctuations of Re within a wavelength range of 400 to 700 nm Further, the calculated values by the following mathematical formula (I) of the retardation regulators of Table 2 were calculated by substitution of the same weight of the compound for the cellulose acylate film sample 3.

$$(Rth(A)-Rth(0))/A \leqq -1.0 \qquad \text{Mathematical Formula (I):}$$

Wherein Rth (A): Rth (nm) of a film containing A % of retardation regulator; Rth (0): Rth (nm) of a film not containing retardation regulator; and A: mass (%) of retardation regulator assuming that mass of raw polymer of a film is 100 (measurement wavelength: 630 nm).

The values of the mathematical formula (I) are as shown below.

| | |
|---|---|
| SA-19 | −2.5 |
| SB-5 | −2.3 |
| SC-7 | −2.3 |
| A-11 | −2.4 |
| B-3 | −2.6 |
| CA-5 | −3.3 |
| P-11 | −1.5 |

The cellulose acylate film samples 1 to 15 each had a film thickness falling within a range of from 79.5 to 80.5 μm. A difference between the maximum thickness and minimum thickness of a 1-m-square film cut randomly from each of the samples 1 to 15 was 5% or less of the average film thickness.

In each of the cellulose acylate film samples 1 to 15, the fluctuations of the Re and Rth within a 1-m-square film satisfy $|Re_{630(max)} - Re_{630(min)}| \leqq 3$ nm and $|Rth_{630(max)} - Rth_{630(min)}| \leqq 5$ nm. Thus they have achieved good results.

Tint of Film

The sample of the cellulose acylate film prepared in Example 1 was placed on a sheet of white paper and coloring of the film was organoleptically evaluated.
AA: excellent transparency without coloring
A: good transparency with a little coloring
B: usable in spite of some coloring
C: unusable because of marked coloring

Surface Evaluation

The sample of the cellulose acylate film prepared in Example 1 was sandwiched between two polarizing plates arranged in the cross-Nicol configuration and frequency of surface troubles was confirmed. Evaluation was made based on the following criteria:
A: from 0 to 2 troubles
B: from 3 to 10 troubles
C: 11 troubles or greater It has been found from the results of Table 2 that it is possible to reduce both the Rth and fluctuations of the Rth within a wavelength range of from 400 to 700 nm by using the near infrared absorber and retardation regulator represented by any one of the formulas (1) to (6) of the present invention in combination, compared with those of the cellulose acylate film using ethyl phthalyl ethyl glycolate, that is, a known plasticizer. The near infrared absorber serves well in the presence of the retardation regulator. The mechanism of it is not known but presumed to be the contribution of the retardation regulator to induce an excellent Rth regulating effect from the near infrared absorber. In addition, the frequency of surface troubles of the near infrared absorber of the invention decreases greatly in the presence of the retardation regulator, which reveals that the near infrared absorber shows excellent results in the preparation of the film.

Example 2

Preparation of Cellulose Acylate Film 21

Preparation of Cellulose Acylate Solution

A cellulose acylate solution CAL-2 was prepared by charging the below-described composition in a tank and then stirring to dissolve these components.

| {Composition of cellulose acylate solution CAL-2} | |
|---|---|
| Cellulose acetate having an acetylation degree of 2.94 | 100.0 parts by mass |
| Plasticizer: triphenyl phosphate | 4.0 parts by mass |
| Plasticizer: diphenyl biphenyl phosphate | 4.0 parts by mass |
| Retardation regulator: CA-5 | 4.0 parts by mass |
| Methylene chloride (first solvent) | 402.0 parts by mass |
| Methanol (second solvent) | 60.0 parts by mass |

Preparation of Matting Agent Solution ML-2

A matting agent solution (ML-2) was prepared by charging the below-described composition in a disperser and stirring to dissolve these components.

| {Composition of matting agent solution ML-2} | |
|---|---|
| Silica particles having an average particle size of 20 nm ("Aerosil R972", product of Nippon Aerosil Co., Ltd.) | 2.0 parts by mass |
| Methylene chloride (first solvent) | 75.0 parts by mass |
| Methanol (second solvent) | 12.7 parts by mass |
| Cellulose acetate solution (CAL-2) | 10.3 parts by mass |

Preparation of Additive Solution (AD-2)

An additive solution (AD-2) was prepared by charging the below-described composition in a mixing tank and then dissolving these components by stirring under heating.

| {Composition of additive solution AD-2} | |
|---|---|
| Near infrared absorber (compound MIR-369 manufactured by Yamamoto Chemicals Inc.), maximum absorption wavelength = 862 nm, maximum absorbance in a visible region (450 to 650 nm) = 12 | 0.7 part by mass |
| Retardation regulator (Compound CA-5 described herein) | 6.0 parts by mass |
| Methylene chloride (first solvent) | 58.4 parts by mass |
| Methanol (second solvent) | 8.7 parts by mass |
| Cellulose acylate solution (CAL-2) | 12.8 parts by mass |

The cellulose acylate solution (CAL-2, 93.9 parts by mass), 1.3 parts by mass of the matting agent solution (ML-2) and 4.8 parts by mass of the additive solution (AD-2) were mixed after they were respectively filtered. The resulting mixture was then cast using a band casting machine. At a residual solvent content of 35%, the film was released from the band. The film having a residual solvent content of 21% and film surface temperature of 68° C. was fixed, at both ends thereof in the width direction, with a pin tenter (the pin tenter as described in FIG. 3 of JP-A-4-1009), followed by stretching in a width direction at a draw ratio of 8% by using the tenter. The stretched film cut at both ends thereof was caused to pass through a drying zone of 140° C. for 20 minutes. The cellulose acylate film thus obtained had a residual solvent content of 0.2% and film thickness of 85 μm.

The cellulose acylate film sample 21 thus formed was evaluated in a similar manner to that employed in Example 1 and the results of it are shown in Table 3. Each of the Rth, chromatic dispersion of Rth within a range of from 400 to 700 nm, tint of the film and surface troubles show good results in evaluation. A change ratio of the Re due to the stretching of the cellulose acylate film sample 21, that is, $(|Re_{(n)}-Re_{(0)}|/n$ is 0.38, suggesting that a change in the Re before and after stretching is preferably small.

TABLE 3

| Cellulose acylate film sample No. | ΔRth | ΔRe | Rth (630 nm) | Re (630 nm) | \|Rth/Re\| | Tint of film | Frequency of surface troubles | Remarks |
|---|---|---|---|---|---|---|---|---|
| 21 | 25 | 2 | −45 | 4 | 11 | A | A | Invention |

Example 3

Evaluation of IPS Liquid Crystal Display Device Having a Polarizing Plate Mounted Thereon Manufacture of Polarizing Plate The cellulose acetate film sample 1 of the invention obtained in Example 1 was dipped in a 1.5 mol/L aqueous solution of sodium hydroxide at 55° C. for 2 minutes. The sample was then washed in a water washing bath of room temperature, followed by neutralization with a 0.05 mol/L sulfuric acid at 30° C., washing again in a water washing bath of room temperature, and drying with hot wind of 100° C. The surface of the cellulose acylate film was thus saponified.

A rolled polyvinyl alcohol film of 80 μm thick was then stretched continuously to five times its original length in an aqueous iodine solution and then dried, whereby a polarization film was obtained. With a 3% aqueous solution of polyvinyl alcohol ("PVA-117H", trade name; product of Kuraray Co., Ltd.) as an adhesive, two sheets of the cellulose acylate film sample 1 subjected to alkaline saponification treatment were adhered to the polarization film, while disposing the latter one between the former two sheets, whereby a polarizing plate 1 having both sides protected by the cellulose acylate film 1 was obtained.

Evaluation of Liquid Crystal Display Device Having Polarizing Plate Mounted Thereon The polarizing plate 1 was imparted with an optical compensation function by laminating therewith an optically compensatory film obtained by uniaxially stretching "ARTON FILM" (trade name; product of JSR). By crossing the in-plane slow axis of the optically compensatory film with the transmission axis of the polarizing plate to each other at right angles, viewing characteristics can be improved without changing the in-plane characteristics. The optically compensatory film used here had in-plane retardation Re of 270 nm, retardation in a thickness-direction of 0 nm and an Nz factor of 0.5.

Two laminates of the polarizing plate 1 and optically compensatory film were prepared. A display device was fabricated by stacking the laminate of the polarizing plate 1 and optically compensatory film, an IPS liquid cell and the other laminate of the polarizing plate 1 and optically compensatory film one after another in the order of mention, while disposing each of the optically compensatory films on the side of the liquid cell. Upon fabrication, the transmission axis of the upper and lower polarizing plates were crossed at right angles, while the transmission axis of the upper polarizing plate was made parallel to the longer axis direction of the molecules of the liquid crystal cell (this means that the slow axis of the optically compensatory layer is crossed at right angles with the long axis direction of the molecules of the liquid crystal cell). The liquid crystal cell and electrode substrate conventionally used for IPS can be used here as are. The liquid crystal cell is horizontally aligned. As liquid crystals, commercially available liquid crystals having positive dielectric anisotropy and developed for IPS liquid crystals can be used. The liquid crystal cell has the following physical properties: Δn of liquid crystals: 0.099, cell gap of liquid crystal layer: 3.0 μm, pretilt angle: 5°, and rubbing direction: 75 degree for each of top and bottom substrates.

In the liquid crystal display device thus fabricated, a light leakage ratio in a black display state was 0.1% or less when measured at 45 degree in an azimuth angle direction and 70 degree in a polar angle direction, each from the front side of the device. It has been elucidated that the optically compensatory film and polarizing plate prepared using the cellulose acylate film of the invention is desirable with a sufficiently small light leakage ratio and a wide contrast-viewing angle.

INDUSTRIAL APPLICABILITY

The invention makes it possible to prepare an excellent acylate film having small optical anisotropy (especially Rth), moreover having small optical anisotropy (especially Rth) over a wide wavelength range; an optical material such as optically-compensatory film or polarizing plate by using the cellulose acylate film; and a liquid crystal display device by using them.

The entire disclosure of each and every foreign patent application from which the benefit of foreign priority has been claimed in the present application is incorporated herein by reference, as if fully set forth.

The invention claimed is:
1. A cellulose acylate film comprising:
(A) at least one retardation regulator that has an absorbance, in terms of a 1.0 g/liter solution, of 0.1 or less for a 1 cm path length within a wavelength region of 450 nm or greater but not greater than 800 nm; and
(B) at least one near infrared absorber that has at least one maximum absorption wavelength at 700 nm or greater but not greater than 1200 nm and has an absorbance, in terms of a 1.0 g/liter solution, of 30.0 or less for a 1 cm path length within a wavelength region of 450 nm or greater but not greater than 650 nm, wherein the at least one retardation regulator is a polymer of at least one ethylenic unsaturated monomer, wherein the polymer of at least one ethylenic unsaturated monomer is an acrylate polymer which does not have an aromatic ring at a side chain thereof.

2. The cellulose acylate film according to claim 1, wherein the at least one near infrared absorber has an absorbance, in terms of a 1.0 g/liter solution, of 10.0 or less for a 1 cm path length within a wavelength region of 400 nm or greater but not greater than 650 nm.

3. The cellulose acylate film according to claim 1, wherein the at least one near infrared absorber has at least one maximum absorption wavelength at 800 nm or greater but not greater than 950 nm.

4. The cellulose acylate film according to claim 1, wherein Rth and Re of the cellulose acylate film at a wavelength of 630 nm satisfy ranges of equations (1A) and (1B), respectively:

$$-50 \text{ nm} \leq Rth_{630} \leq 25 \text{ nm} \qquad \text{Equation (1A):}$$

$$0 \text{ nm} \leq Re_{630} \leq 10 \text{ nm.} \qquad \text{Equation (1B):}$$

5. The cellulose acylate film according to claim 1, wherein in a wavelength range of 400 nm or greater but not greater than 700 nm, a fluctuation of Rth of the cellulose acylate film is 50 nm or less and a fluctuation of Re of the cellulose acylate film is 10 nm or less.

6. The cellulose acylate film according to claim 1, wherein Re and Rth of the cellulose acylate film at a wavelength of 630 nm satisfy a relation of equation (2):

$$0.5 \leq |Rth_{630}/Re_{630}| \leq 50, \text{ provided that } Re_{630} \leq 1. \qquad \text{Equation (2):}$$

7. The cellulose acylate film according to claim 1, wherein Re and Rth of the cellulose acylate film at a wavelength of 630 nm satisfy relations of equations (3A) and (3B), respectively:

$$|Re_{630(max)} - Re_{630(min)}| \leq 5 \qquad \text{Equation (3A):}$$

$$|Rth_{630(max)} - Rth_{630(min)}| \leq 10 \qquad \text{Equation (3B):}$$

wherein $Re_{630(max)}$ and $Rth_{630(max)}$ are the maximum retardation values at a wavelength of 630 nm of a 1-m square film which is cut out randomly from the cellulose acylate film; and $Re_{630}(min)$ and $Rth_{630}(min)$ are the minimum retardation values at a wavelength of 630 nm of the 1-m square film.

8. The cellulose acylate film according to claim 1, wherein a cellulose acylate constituting the cellulose acylate film has an acyl substitution degree of from 2.50 to 3.00 and has an average polymerization degree of from 180 to 700.

9. The cellulose acylate film according to claim 1, wherein an acyl substituent of a cellulose acylate constituting the cellulose acylate film is substantially composed only of an acetyl group, and wherein the cellulose acylate has a total substitution degree of from 2.50 to 2.95 and has an average polymerization degree of from 180 to 550.

10. The cellulose acylate film according to claim 1, which has a thickness of from 10 to 120 µm.

11. The cellulose acylate film according to claim 1, which is obtained by stretching at a stretch ratio of 1% or greater but not greater than 100% in a direction vertical (width direction) to a machine direction.

12. The cellulose acylate film according to claim 11, wherein the cellulose acylate film obtained by stretching has Re satisfying a relation of equation (4):

$$|Re_{(n)} - Re_{(o)}|/n \leq 1.0 \qquad \text{Equation (4):}$$

wherein $Re_{(n)}$ represents Re at 630 nm of a film stretched by n(%); and $Re_{(O)}$ represents Re at 630 nm of an unstretched film.

13. A polarizing plate comprising:

a polarizer; and at least two protective films laminated on both sides of the polarizer, wherein at least one of the at least two protective films is a cellulose acylate film according to claim 1.

14. A liquid crystal display device comprising:

a liquid crystal cell; and at least two polarizing plates placed on both sides of the liquid crystal cell, wherein at least one of the at least two polarizing plates is a polarizing plate according to claim 13.

15. A liquid crystal display device according to claim 14, which is an IPS mode.

* * * * *

UNITED STATES PATENT AND TRADEMARK OFFICE
CERTIFICATE OF CORRECTION

| | | |
|---|---|---|
| PATENT NO. | : 7,940,355 B2 | Page 1 of 1 |
| APPLICATION NO. | : 11/922596 | |
| DATED | : May 10, 2011 | |
| INVENTOR(S) | : Mamoru Sakurazawa | |

It is certified that error appears in the above-identified patent and that said Letters Patent is hereby corrected as shown below:

Title Page, Item (12) Change "Sakarazawa et al." to -- Sakurazawa et al. --

Title Page, Item (75) Inventors: Change "Sakarazawa" to -- Sakurazawa --

Signed and Sealed this
Fourth Day of October, 2011

David J. Kappos
*Director of the United States Patent and Trademark Office*